Jan. 23, 1934.  J. R. PEIRCE  1,944,667
TABULATING MACHINE
Filed May 24, 1930  32 Sheets-Sheet 9

Inventor
J. R. Peirce
By his Attorney
W. M. Wilson

Jan. 23, 1934.  J. R. PEIRCE  1,944,667
TABULATING MACHINE
Filed May 24, 1930   32 Sheets-Sheet 10

Inventor
J. R. Peirce
By his Attorney
W. M. Wilson

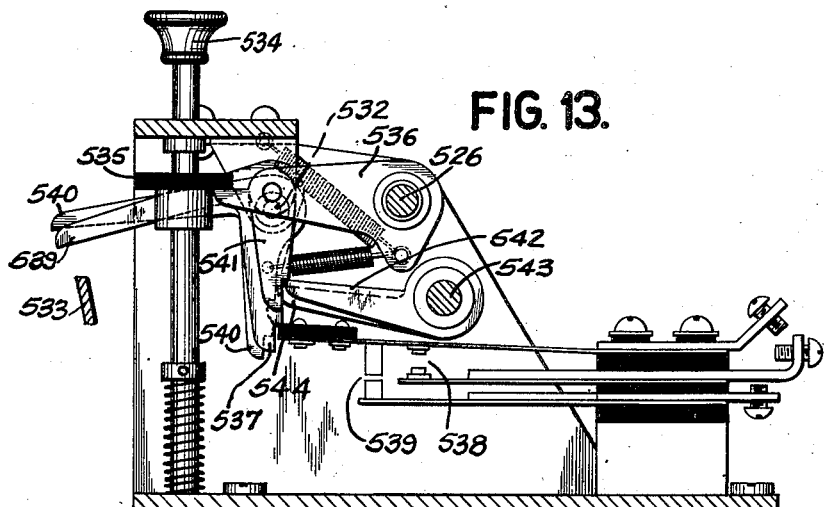
FIG. 13.
FIG. 14.
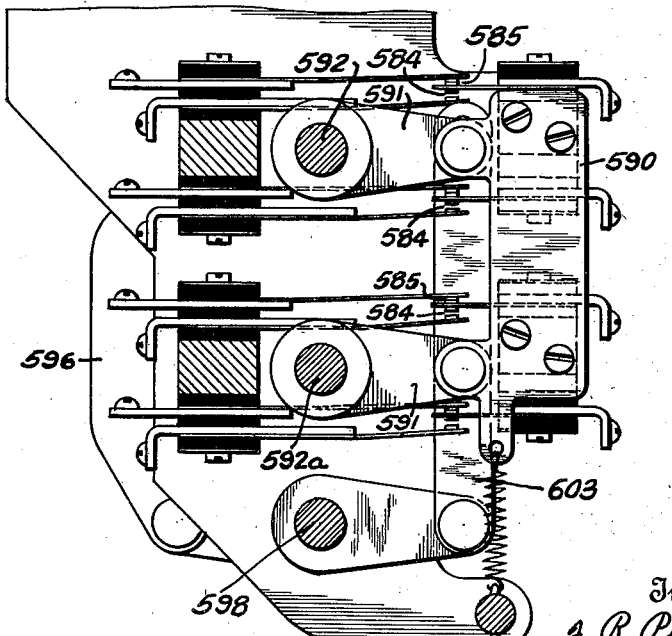

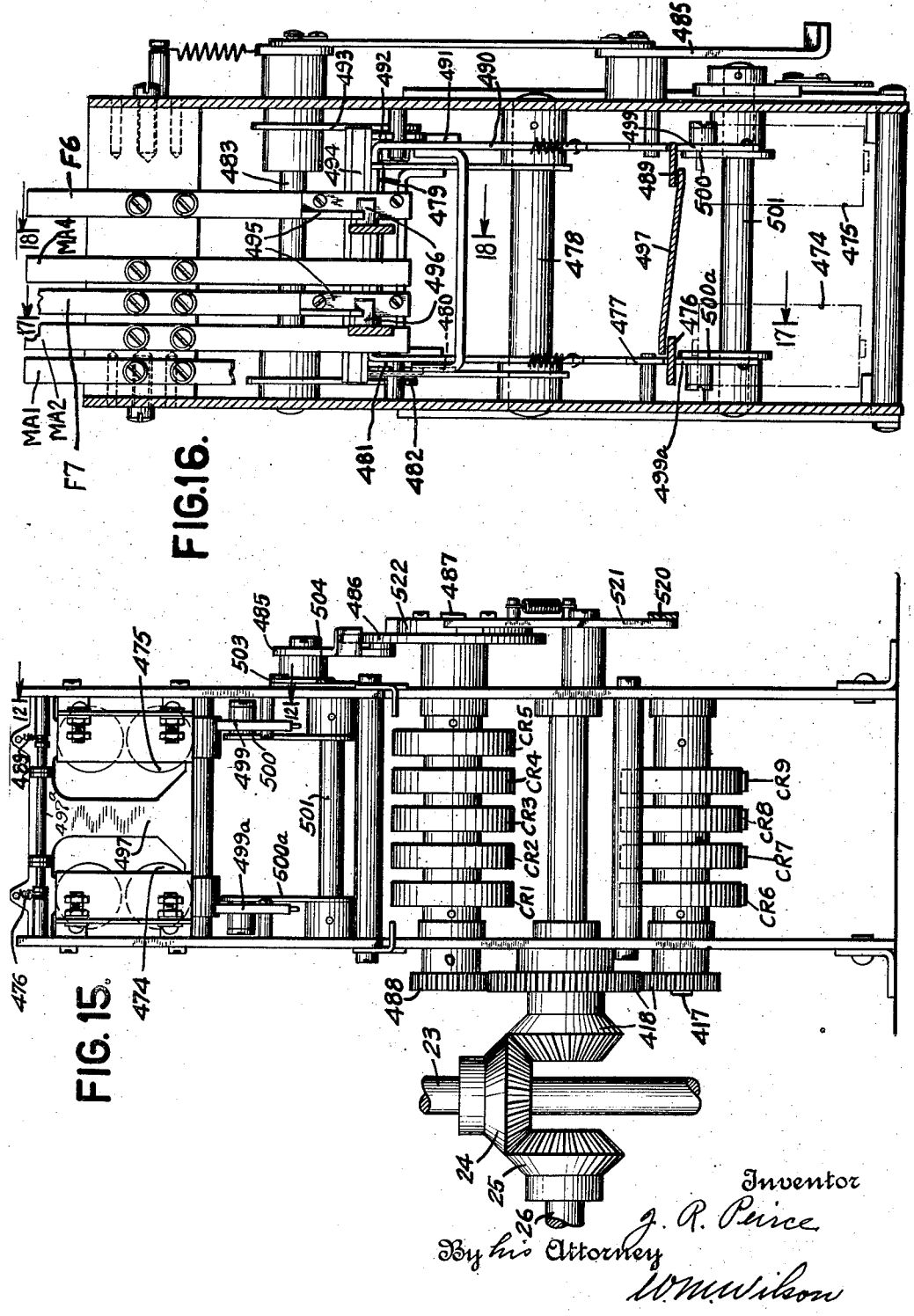

Jan. 23, 1934.   J. R. PEIRCE   1,944,667
TABULATING MACHINE
Filed May 24, 1930   32 Sheets-Sheet 13
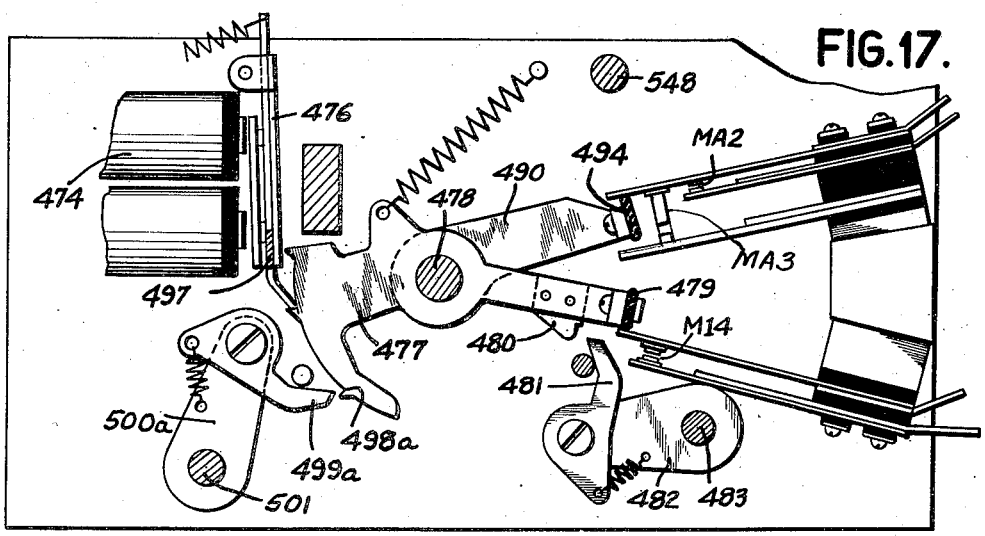
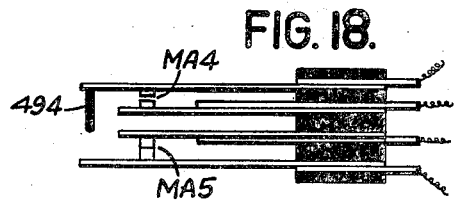
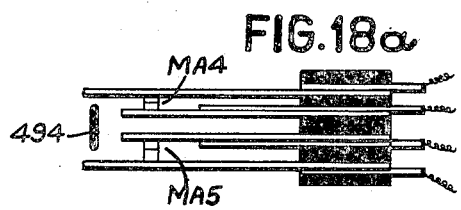
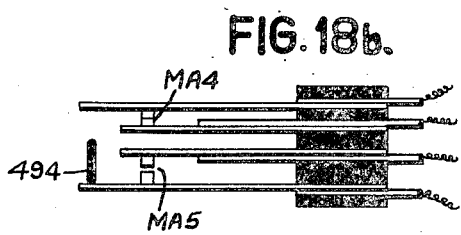
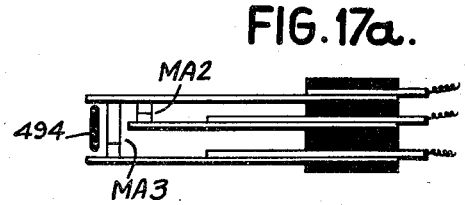
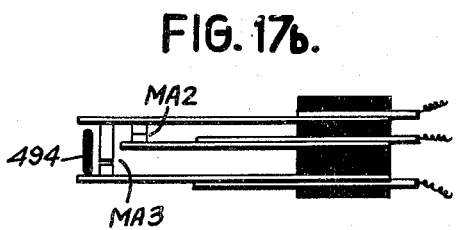

Jan. 23, 1934.  J. R. PEIRCE  1,944,667
TABULATING MACHINE
Filed May 24, 1930   32 Sheets-Sheet 14
FIG. 19.
FIG. 20.
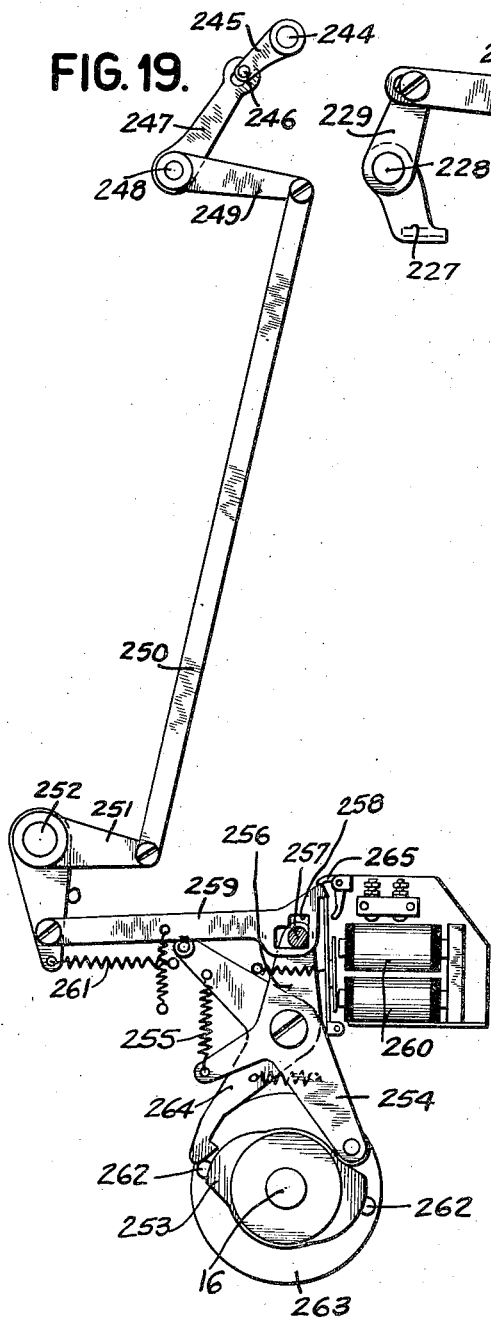
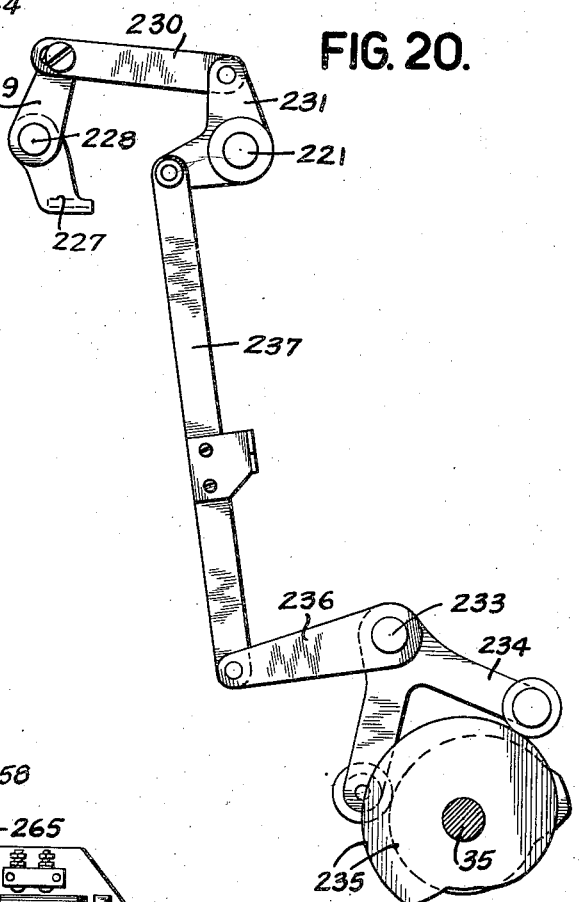
Inventor
J. R. Peirce
By his Attorney
W. M. Wilson Jan. 23, 1934.  J. R. PEIRCE  1,944,667
TABULATING MACHINE
Filed May 24, 1930  32 Sheets-Sheet 15
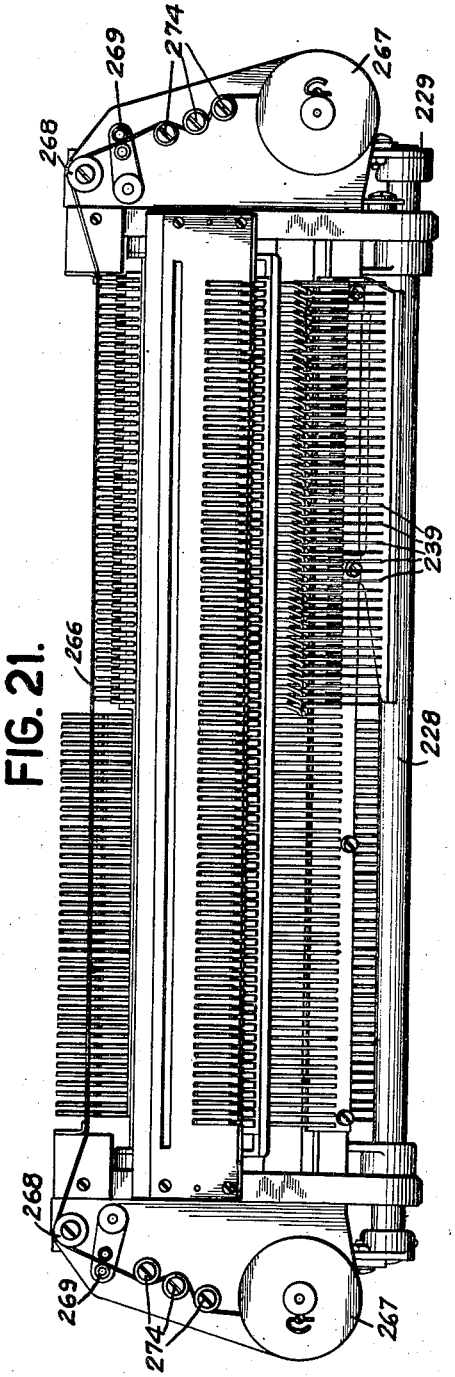
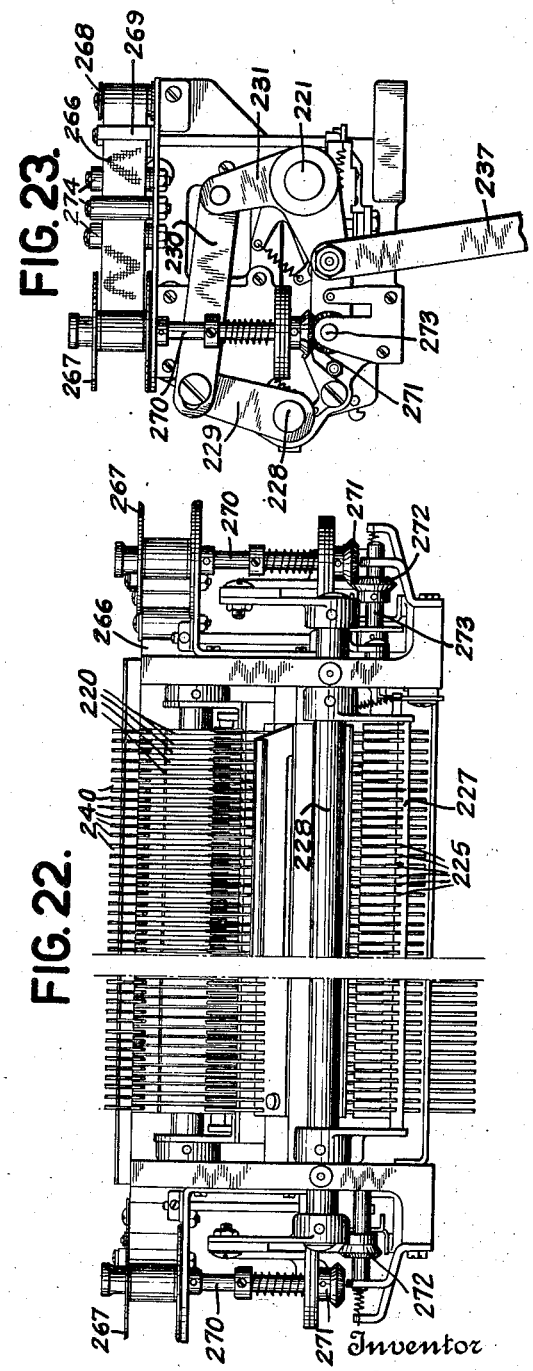
Inventor
J. R. Peirce
By his Attorney
W. M. Wilson Jan. 23, 1934.  J. R. PEIRCE  1,944,667
TABULATING MACHINE
Filed May 24, 1930  32 Sheets-Sheet 16

Inventor
J. R. Peirce
By his Attorney
W. M. Wilson

Jan. 23, 1934.    J. R. PEIRCE    1,944,667
TABULATING MACHINE
Filed May 24, 1930    32 Sheets-Sheet 17

Inventor
J. R. Peirce
By his Attorney

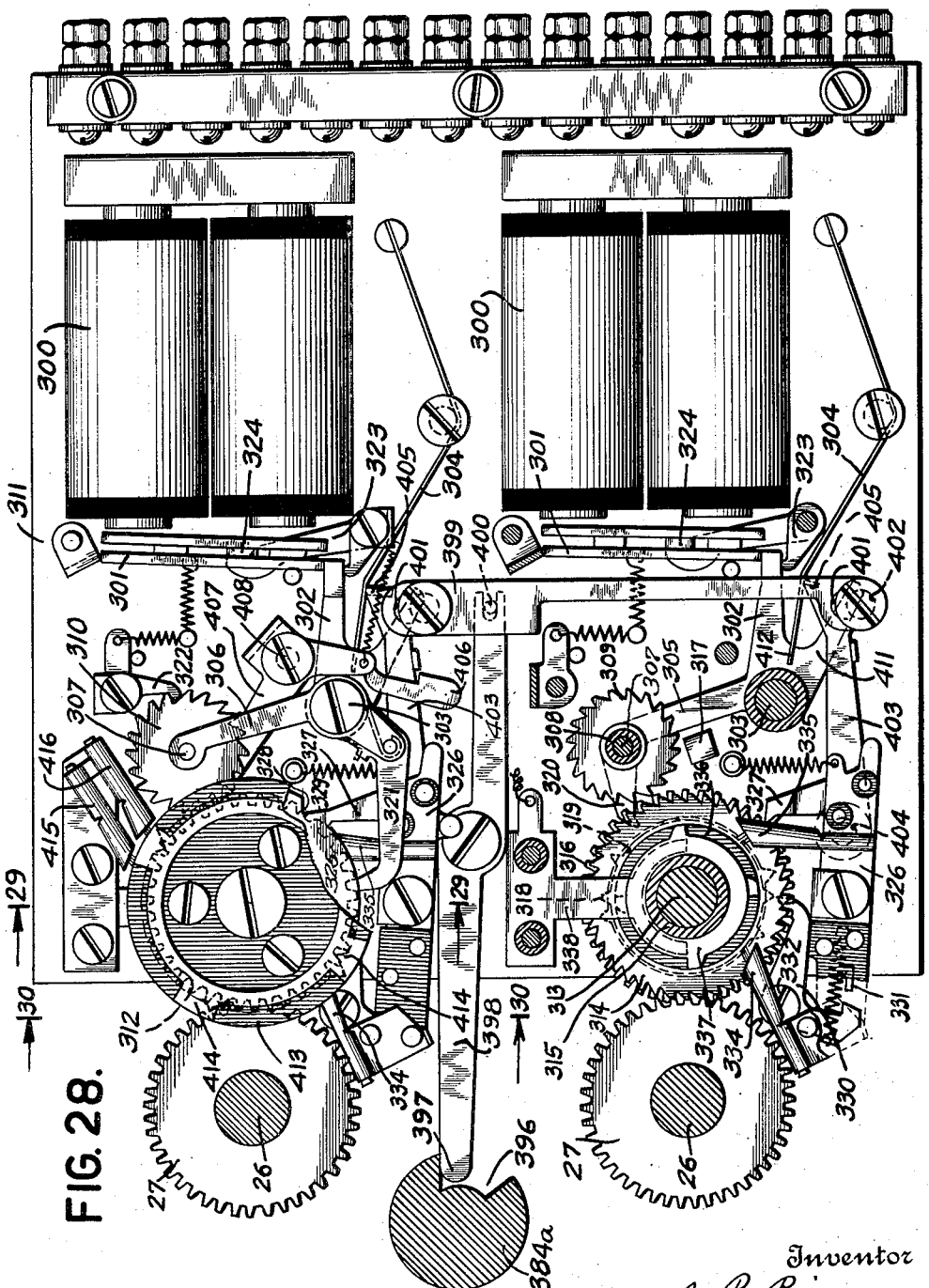

Jan. 23, 1934.    J. R. PEIRCE    1,944,667
TABULATING MACHINE
Filed May 24, 1930    32 Sheets-Sheet 19
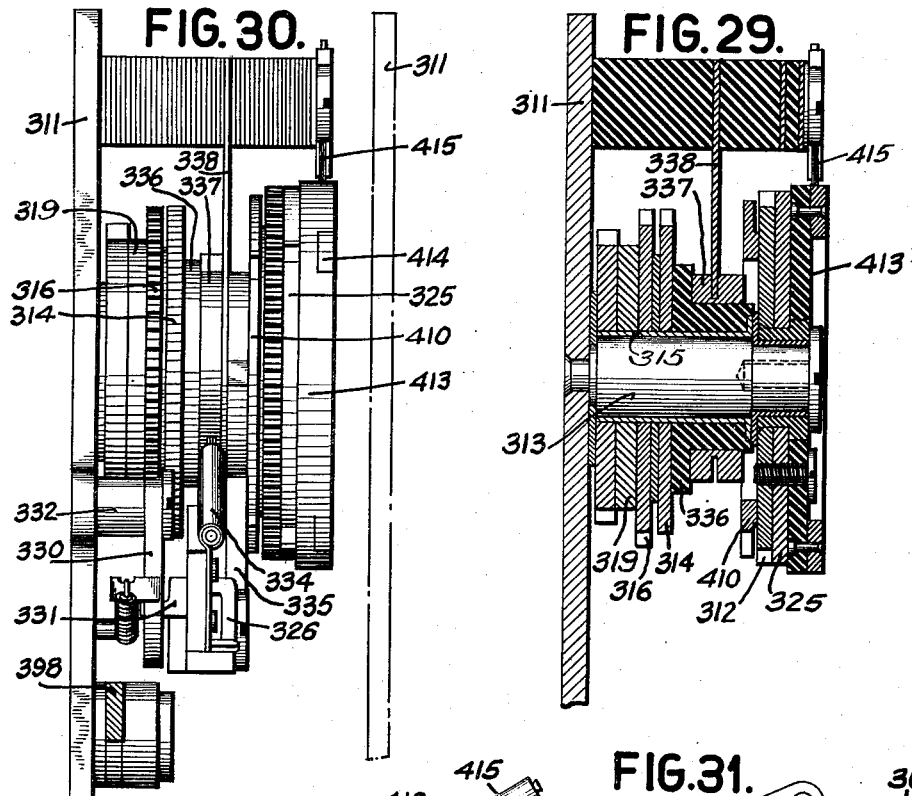
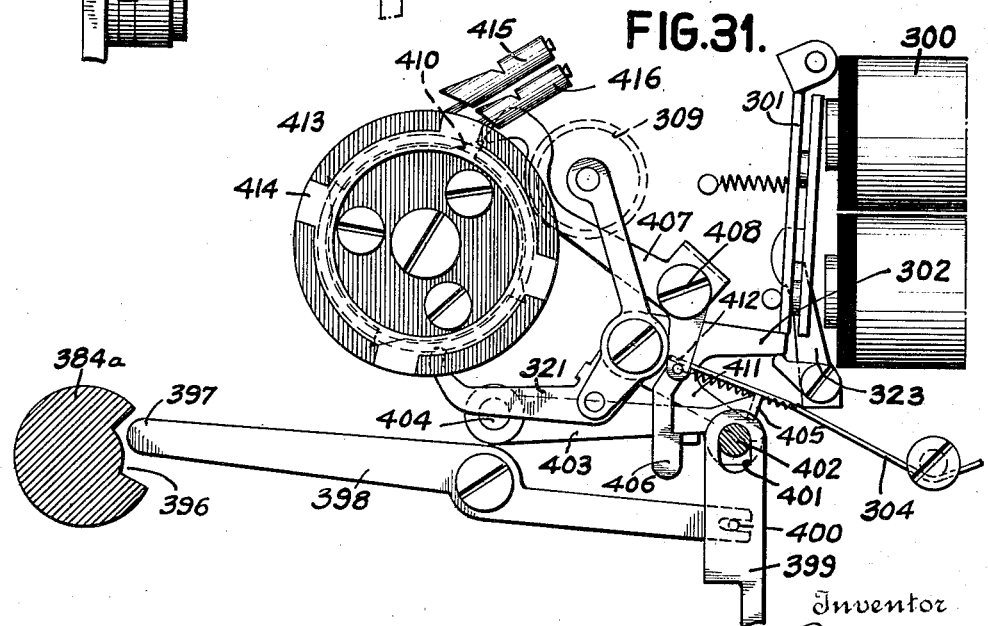

Jan. 23, 1934.  J. R. PEIRCE  1,944,667
TABULATING MACHINE
Filed May 24, 1930  32 Sheets-Sheet 20

Inventor
J. R. Peirce
By his Attorney
W M Wilson

Jan. 23, 1934.   J. R. PEIRCE   1,944,667
TABULATING MACHINE
Filed May 24, 1930   32 Sheets-Sheet 22

Inventor
J. R. Peirce
By his Attorney
WM Wilson

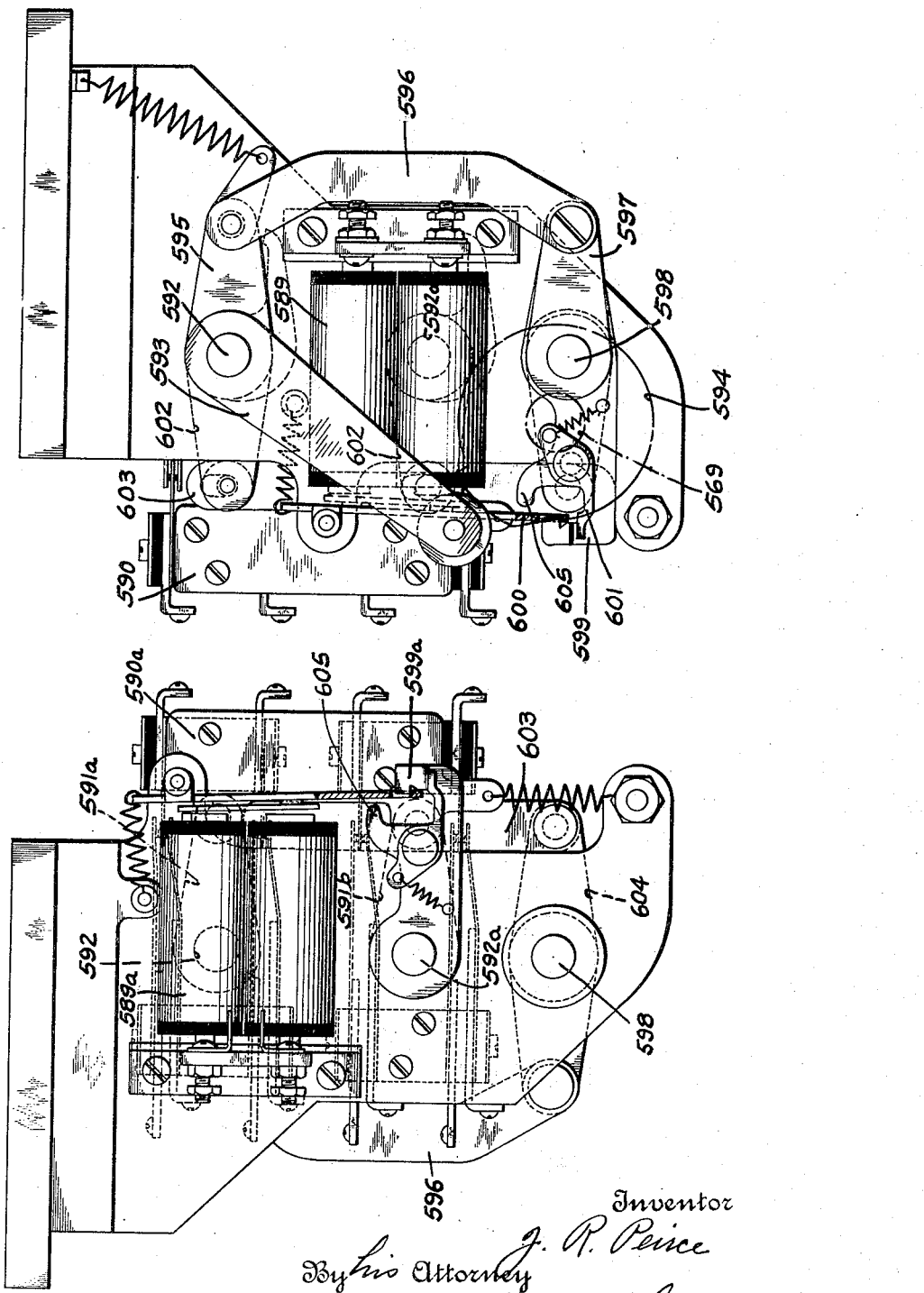

Jan. 23, 1934. J. R. PEIRCE 1,944,667
TABULATING MACHINE
Filed May 24, 1930 32 Sheets-Sheet 24

Inventor
J. R. Peirce
By his Attorney
W. M. Wilson

Jan. 23, 1934.   J. R. PEIRCE   1,944,667
TABULATING MACHINE
Filed May 24, 1930   32 Sheets-Sheet 25
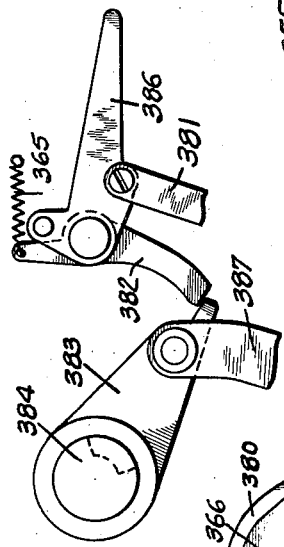
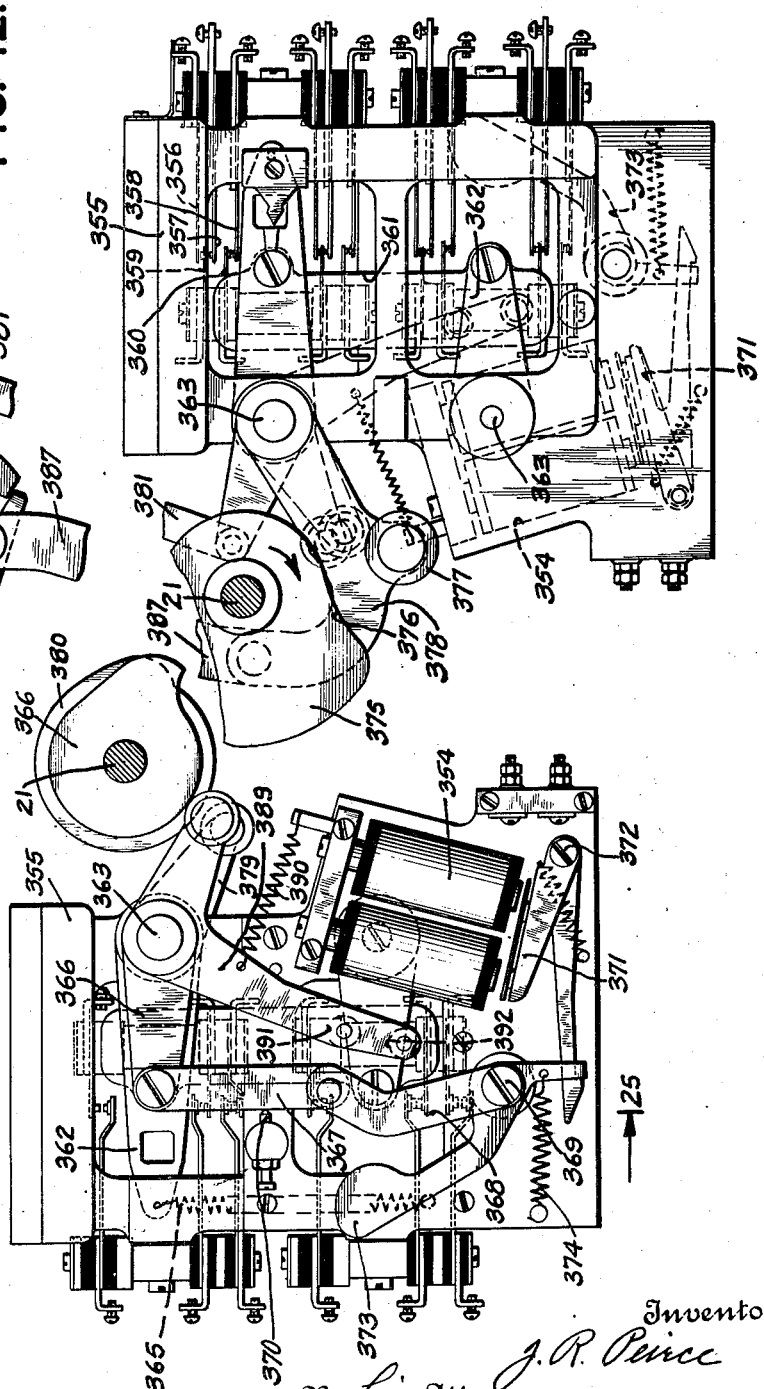
Inventor
J. R. Peirce
By his Attorney
W. N. Wilson Jan. 23, 1934.    J. R. PEIRCE    1,944,667
TABULATING MACHINE
Filed May 24, 1930    32 Sheets-Sheet 26

Inventor
J. R. Peirce
By his Attorney
W. M. Wilson

Jan. 23, 1934.   J. R. PEIRCE   1,944,667
TABULATING MACHINE
Filed May 24, 1930   32 Sheets-Sheet 27
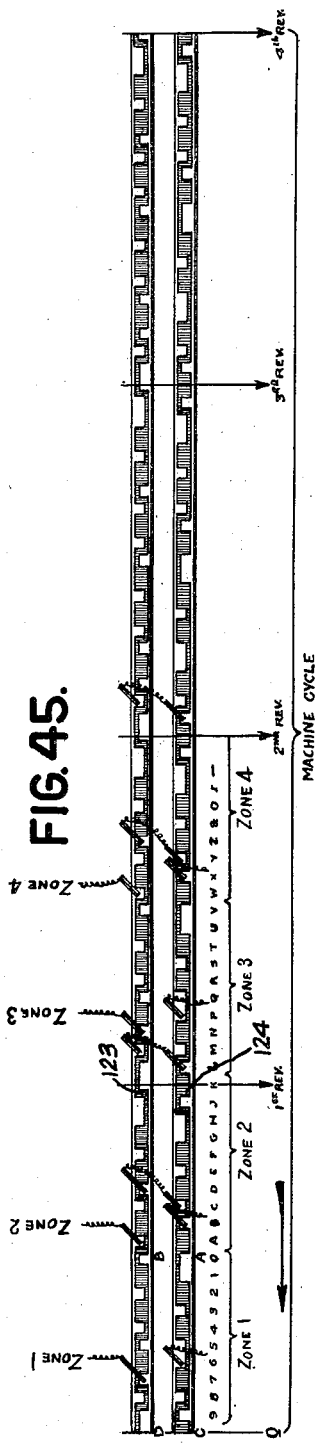
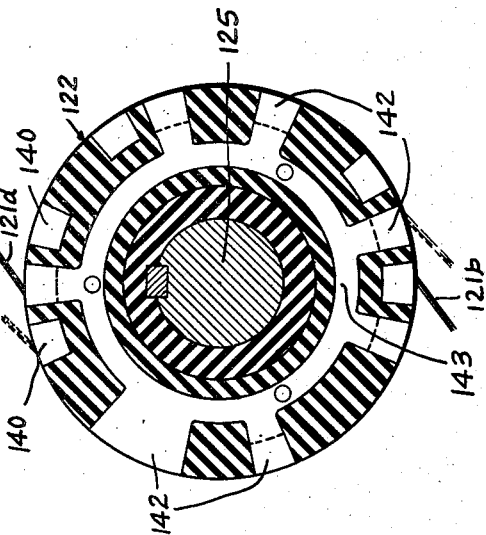
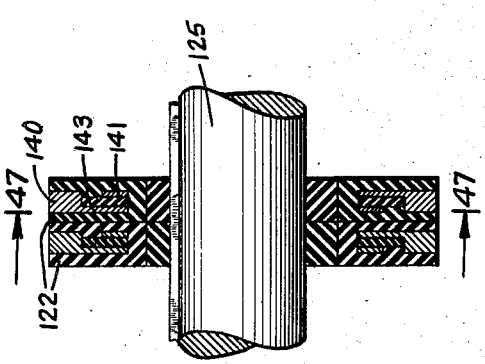
Inventor
J. R. Peirce
By his Attorney
W. M. Wilson

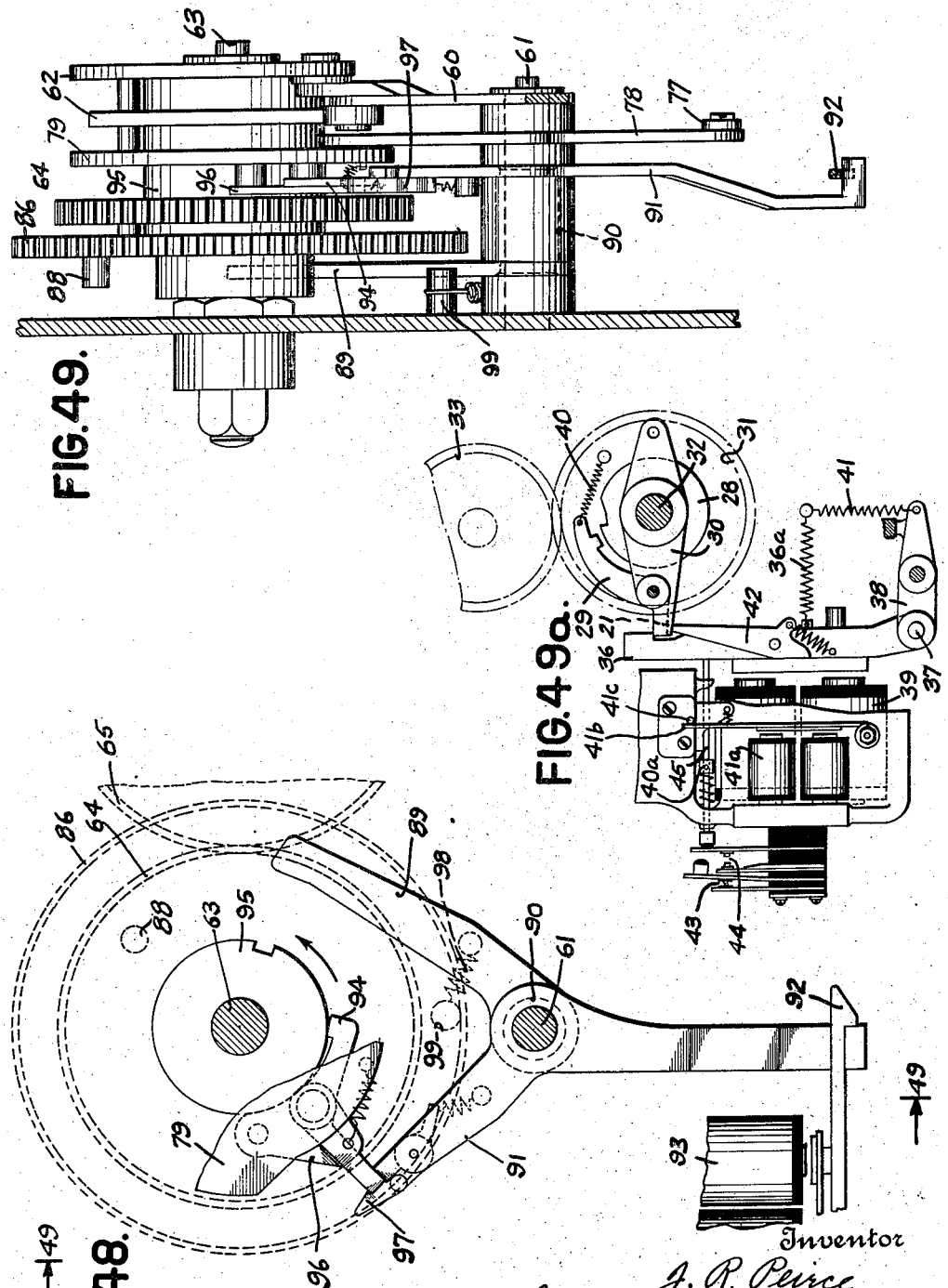

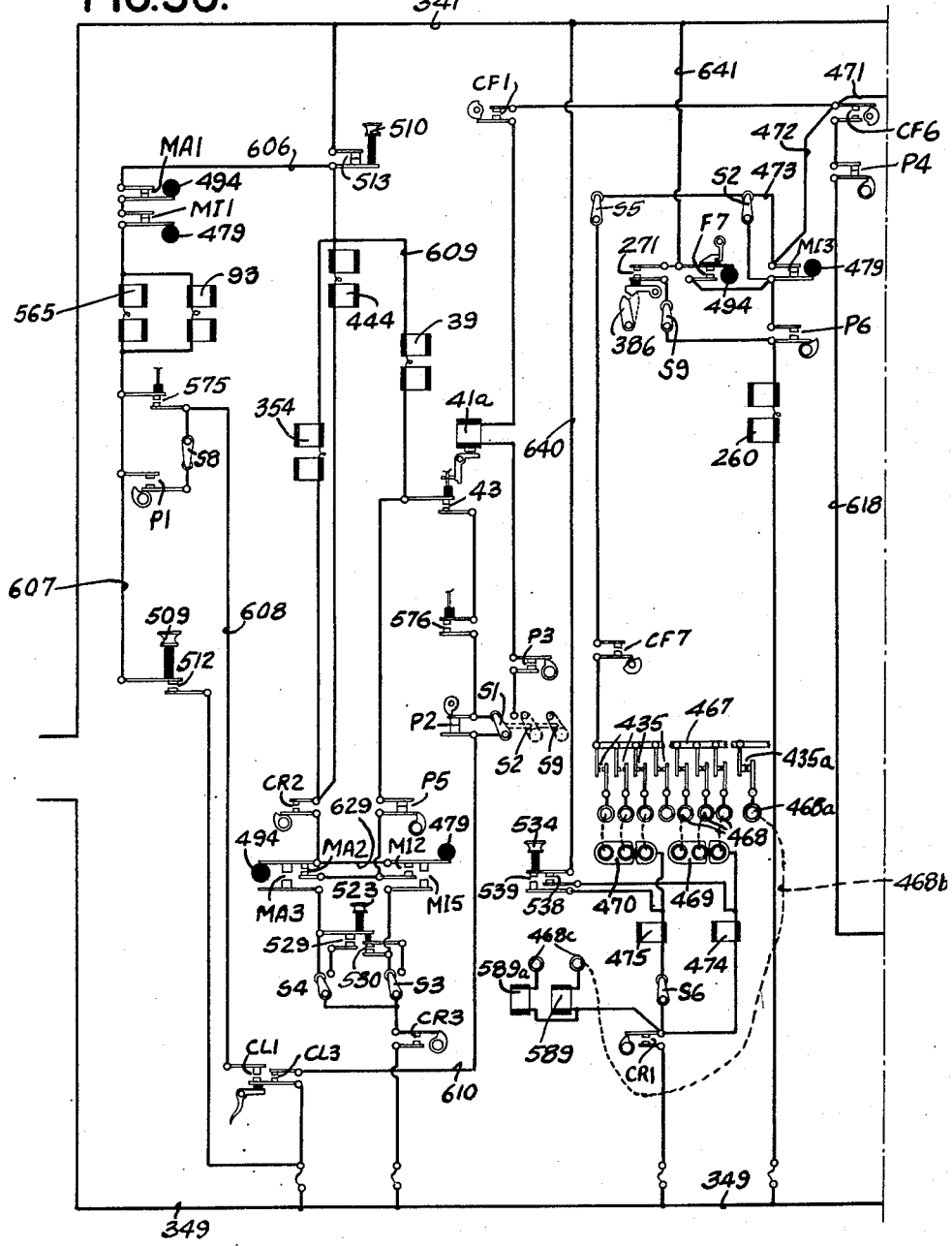

Jan. 23, 1934.  J. R. PEIRCE  1,944,667
TABULATING MACHINE
Filed May 24, 1930  32 Sheets-Sheet 30

Inventor
J. R. Peirce
By his Attorney
W. M. Wilson

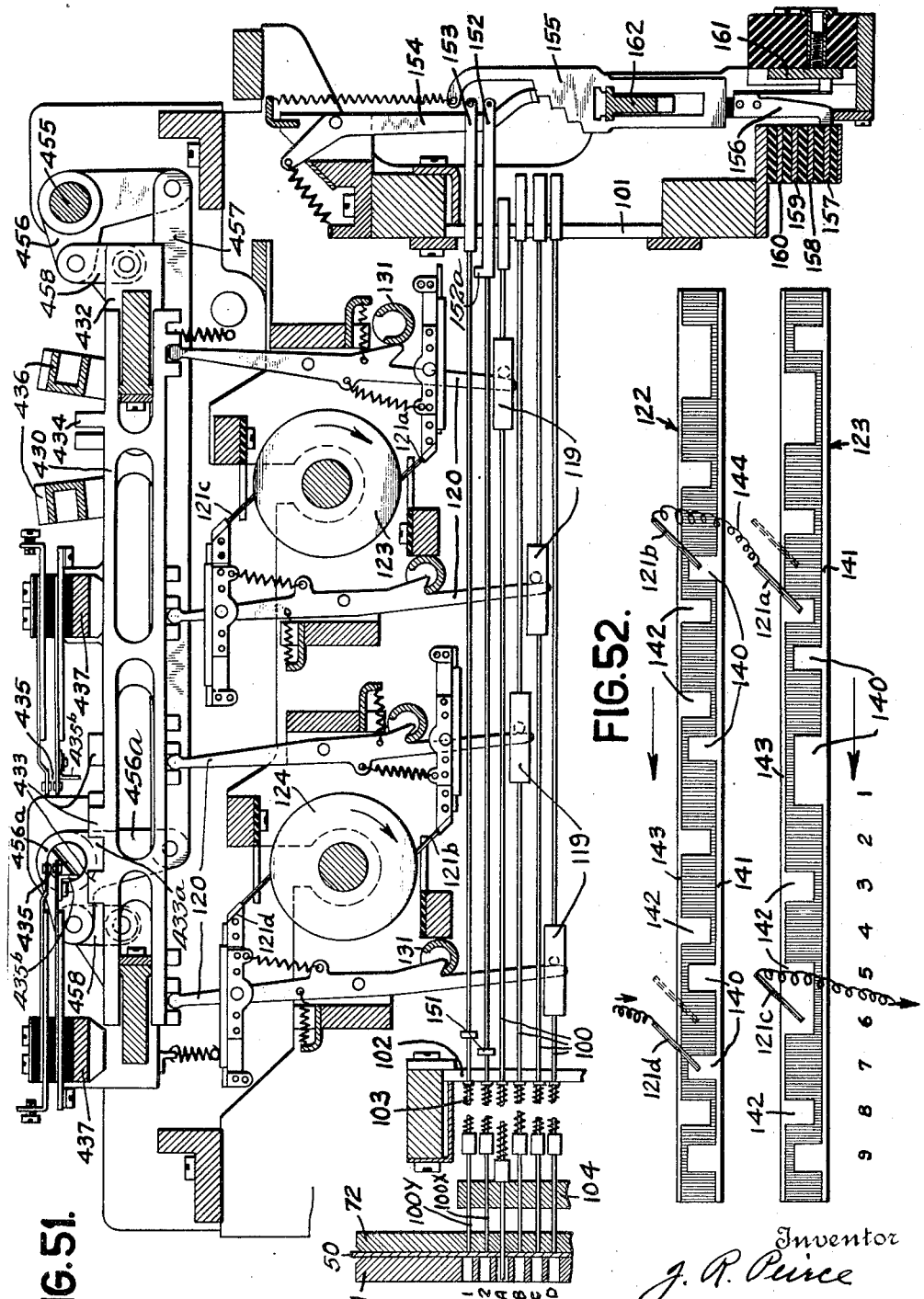

Jan. 23, 1934.  J. R. PEIRCE  1,944,667
TABULATING MACHINE
Filed May 24, 1930  32 Sheets-Sheet 32
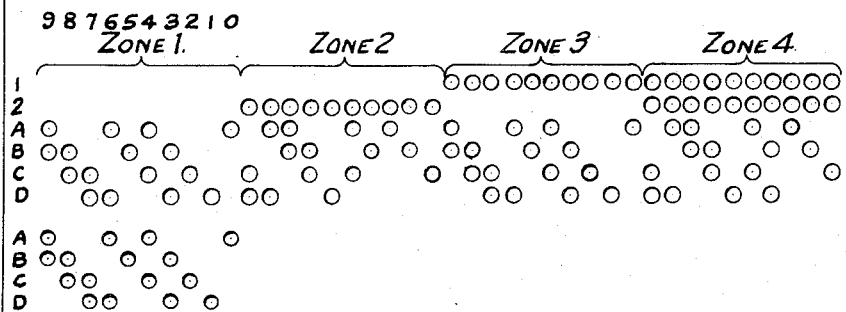
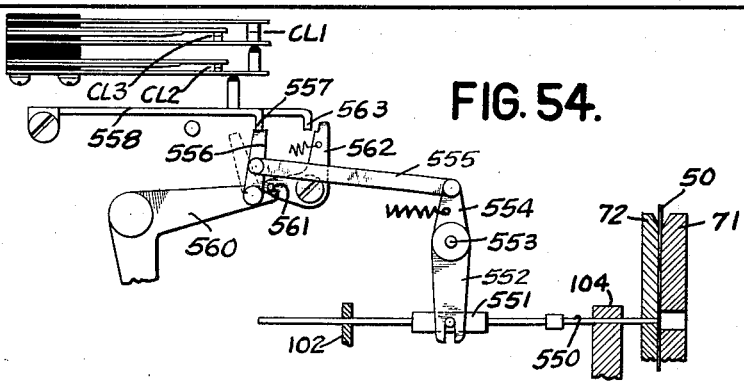
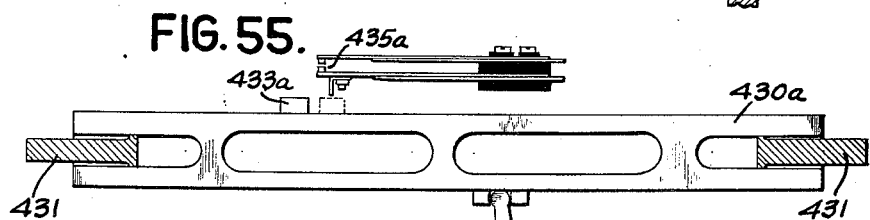
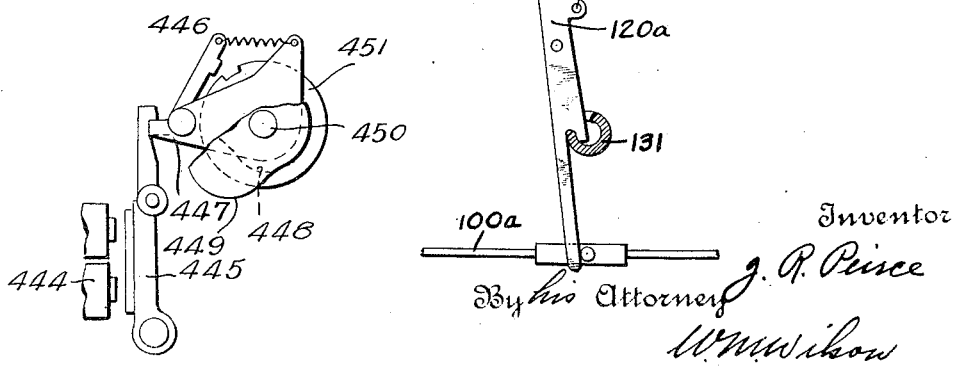

Patented Jan. 23, 1934

1,944,667

UNITED STATES PATENT OFFICE 1,944,667

TABULATING MACHINE

John Royden Peirce, New York, N. Y., assignor, by mesne assignments, to International Business Machines Corporation, New York, N. Y., a corporation of New York Application May 24, 1930. Serial No. 455,279

15 Claims. (Cl. 235—92)

This invention concerns accounting machines and more particularly accounting machines of the record controlled type.

The principal object of the invention is to provide a tabulating machine of improved selectivity of operation and of increased utility together with simplification and improvement of the wiring and switching arrangements and improvement of the mechanical structure with a view to imparting additional operating features as well as improvement in and increased efficiency and utility of the features previously found in such machines.

The record cards are perforated according to the well known Peirce combinational hole system and the machine is adapted to sense the cards by means of pins and translate this combinational hole pin reading into timed electrical impulses for controlling the positioning of type bars and accumulating mechanism operating in synchronism with the translating mechanism.

Another object of the invention is to provide electrical instrumentalities for suppressing the operation of type bars which are not in active use, thereby rendering the machine quieter in action and less subject to shocks incident to reciprocating the greater number of type bars.

Another object of the machine is to provide novel key locking mechanisms so that manual initiation of operations are prevented during automatic functioning of the machine.

A still further object is to provide means for setting up a common designation of a group of cards and comparing such set up with cards subsequently fed through the machine.

A still further object is to provide automatic controlling mechanism comprising a series of contacts wired in multiple and adapted to be arranged in groups so that closure of one or more contacts in one group will initiate total taking operations to print a minor total and closure of one or more contacts of another group will initiate printing of a major total.

Various other objects and advantages of my invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 2a is a detail section taken on line 2a—2a of Fig. 2.

Fig. 2b is a detail view of certain contact latching mechanism.

Fig. 3a is a detail of a total cycle initiating key taken on line 3a—3a of Fig. 1.

Fig. 13 is a section taken on line 13—13 of Fig. 9, showing a key and associated contact for initiating totaling operations.

Fig. 14 is a detail of certain circuit changing switches. This is a view on the line 14—14 of Fig. 35.

Fig. 15 is a view taken on line 15—15 of Fig. 3.

Fig. 16 is a plan section taken on line 16—16 of Fig. 12.

Fig. 17 is a section of total controlling mechanism, the section being taken on line 17—17 of Fig. 16.

Fig. 17a is a detail of contacts shown in Fig. 17 in another position.

Fig. 17b shows the contacts of Fig. 17 in a still further position.

Fig. 18 is a detail of a contact shown in Fig. 16, the section being taken on line 18—18 of Fig. 16.

Fig. 18a is a position view of the contacts of Fig. 18.

Fig. 18b is a further view of the contacts of Fig. 18.

Fig. 19 is a detail of the paper spacing mechanism shown in Fig. 4.

Fig. 20 is a detail of the hammer operating control mechanism.

Fig. 21 is a plan detail of the type hammer and ribbon feeding mechanism.

Fig. 22 is a front elevational view of Fig. 21.

Fig. 23 is a view looking at the right side of Fig. 21.

Fig. 28 is an enlarged detail of an accumulator section.

Fig. 29 is a section taken on line 29—29 of Fig. 28.

Fig. 30 is a section taken on line 30—30 of Fig. 28.

Fig. 31 is a position view of the parts shown in Fig. 28, the mechanism being prepared for total printing under control of the accumulator.

Fig. 37 is a side elevation of Fig. 35 looking in the direction of line 37—37.

Fig. 38 is a view looking at the other side of the mechanism of Fig. 35.

Fig. 41 is a detail of total circuit controlling contact mechanism.

Fig. 42 is a detail of the mechanism looking from the opposite direction.

Fig. 45 is a development diagram of card analyzing commutators.

Fig. 46 is a detail of several commutators taken on line 46—46 of Fig. 7.

Fig. 47 is a further commutator detail taken on the line 47—47 of Fig. 46.

Fig. 48 is a detail of the card feed clutch shown in Fig. 6.

Fig. 49 is a side elevation of the card feed clutch mechanism shown in Fig. 48.

Fig. 49a is a detail of a clutch for controlling the operation of the printing mechanism.

Figure 50A:
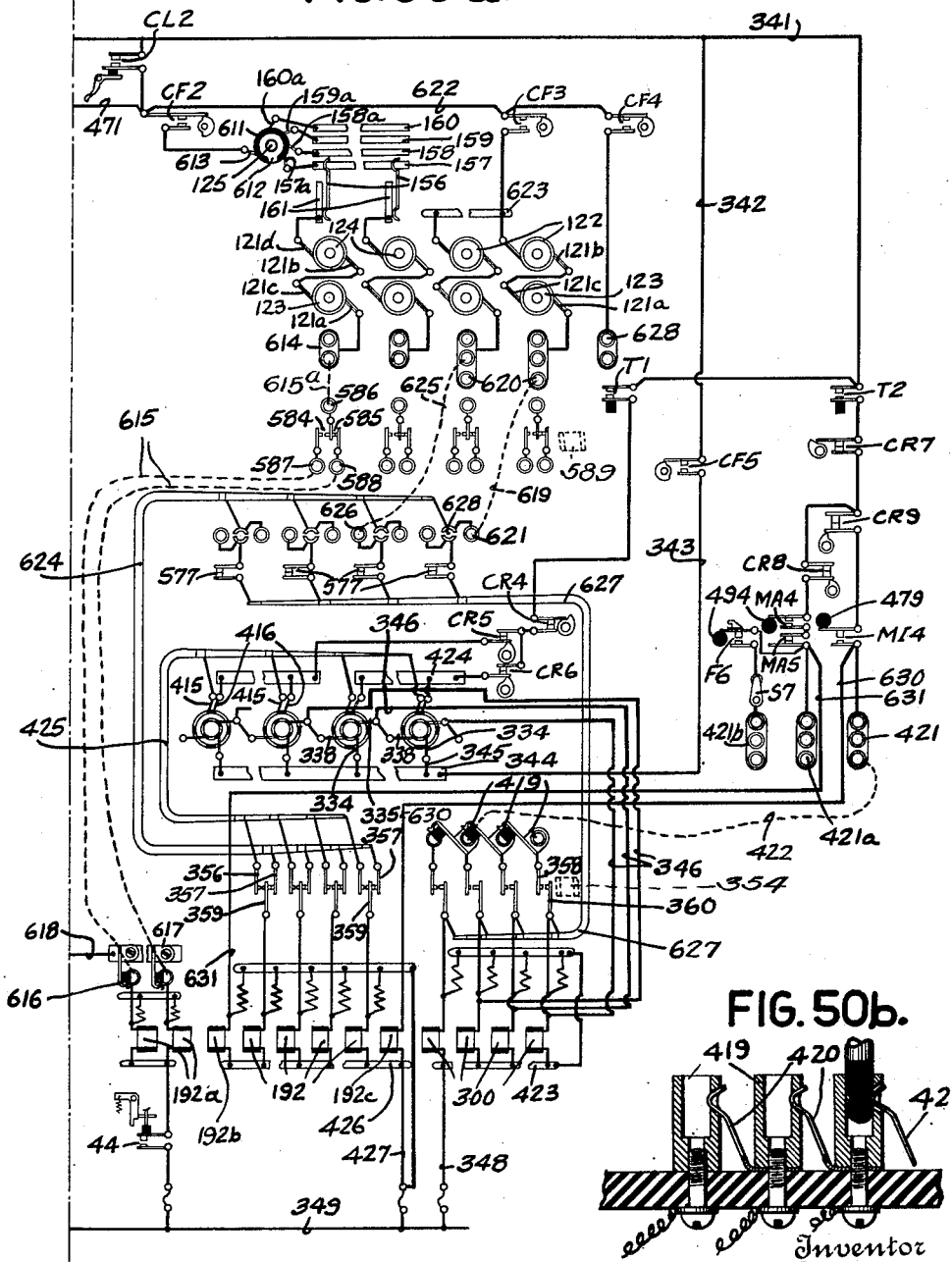

Figs. 50 and 50a, placed side by side, form a complete wiring diagram of the electric circuit of the machine.

Figure 50B:
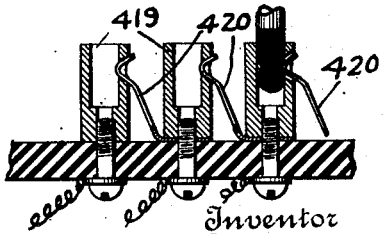

Fig. 50b is a detail of jacks 419 shown in Fig. 50a.

Figure 7:
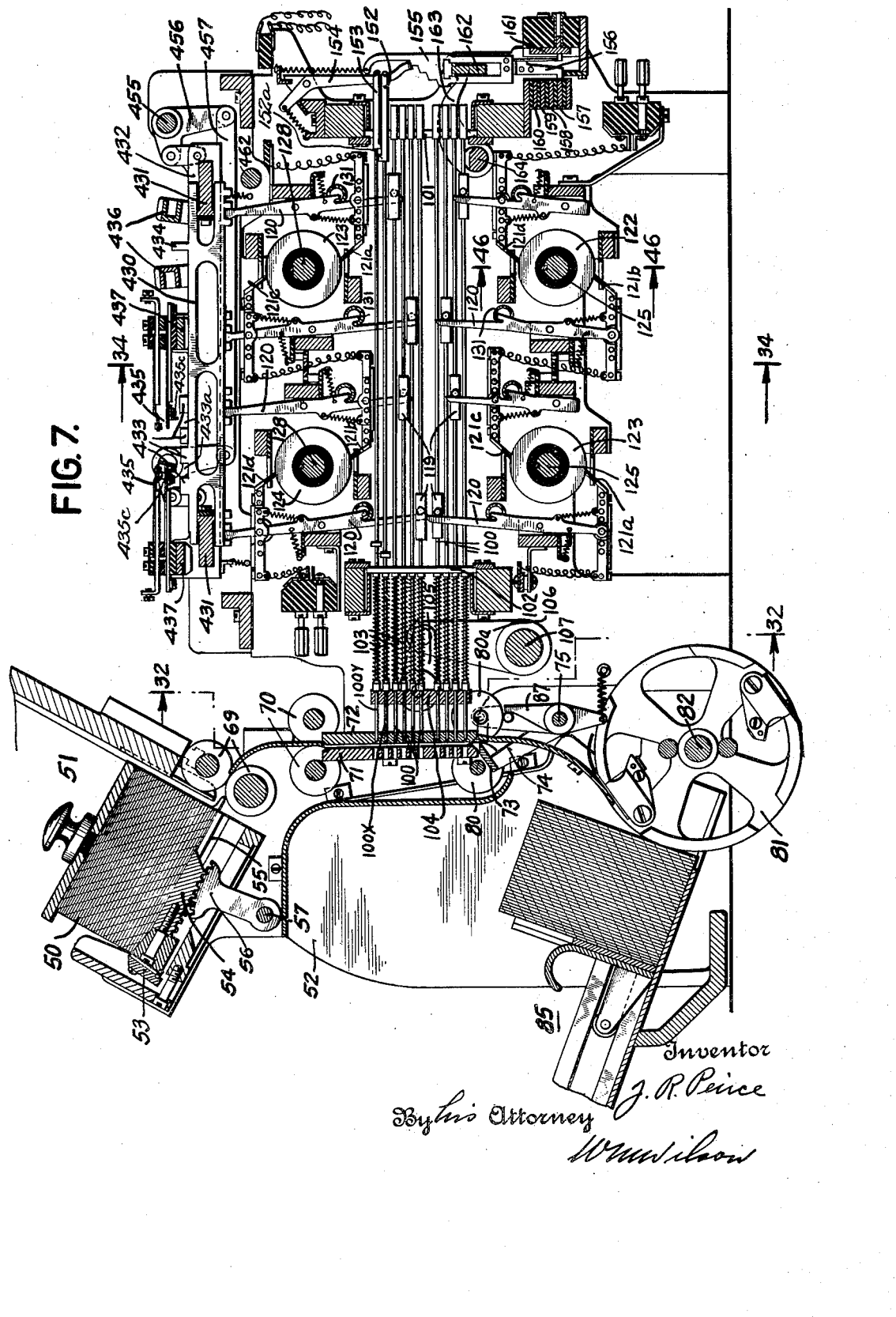
Fig. 7 is a central section of the card analyzing mechanism taken on line 7—7 of Fig. 1.

Fig. 51 is an enlarged position view of parts shown in Fig. 7 in moved position, showing the card reading pins and their related translating commutators and brushes.

Fig. 52 is a diagrammatic development of a pair of commutators which cooperate with the lower group of pins of Fig. 7.

Fig. 53 is a detail of the card showing the arrangement of the various combinational hole perforations.

Fig. 54 is a detail position view of card lever contacts.

Fig. 55 is a detail showing the manner of operating a class selection controlling contact.

Figure 6:
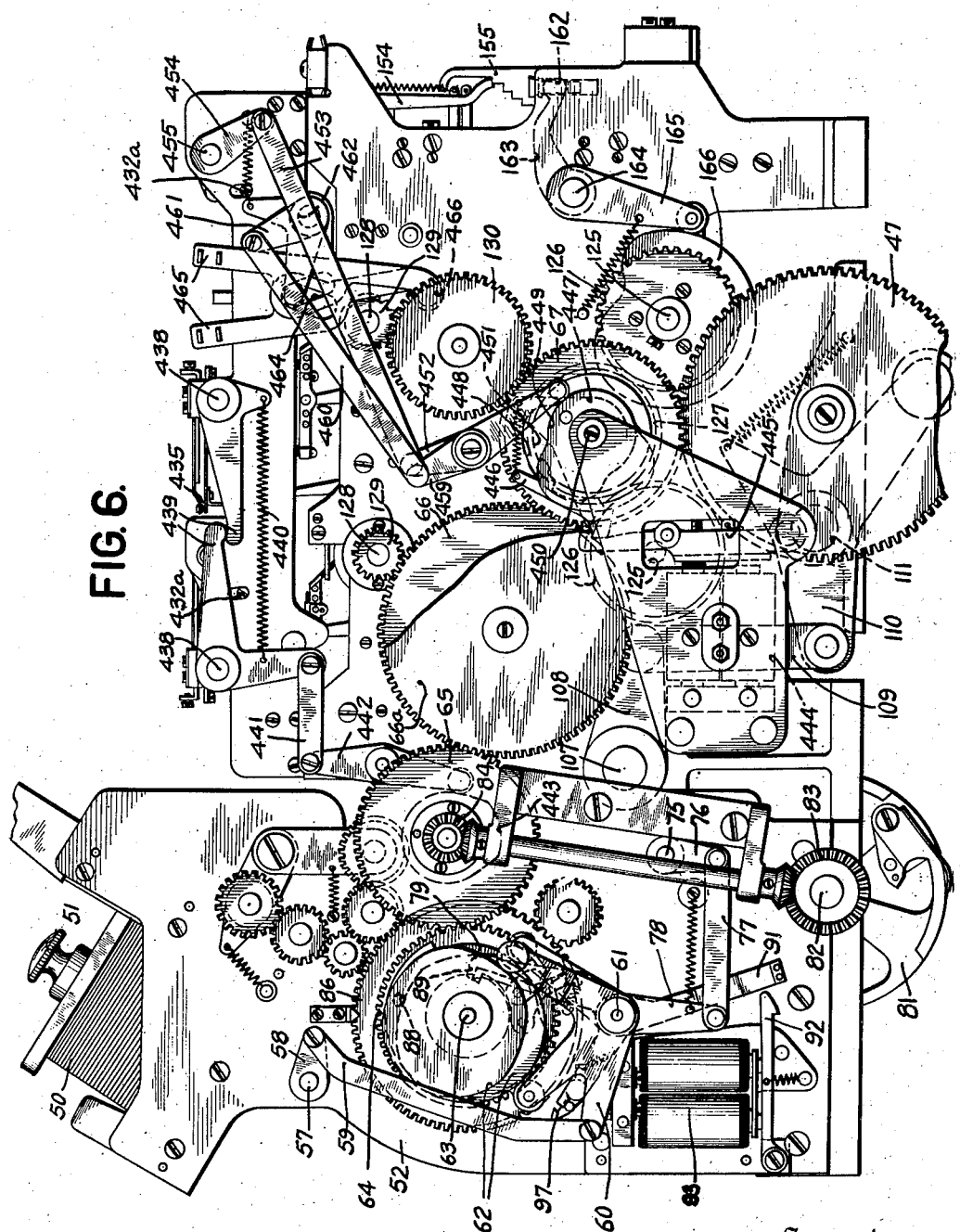
Fig. 6 is an outside view of the card analyzing section of the machine taken on line 6—6 of Fig. 1.

Fig. 56 is a detail of a clutch shown in Fig. 6.

*Main drive*

Figure 4:
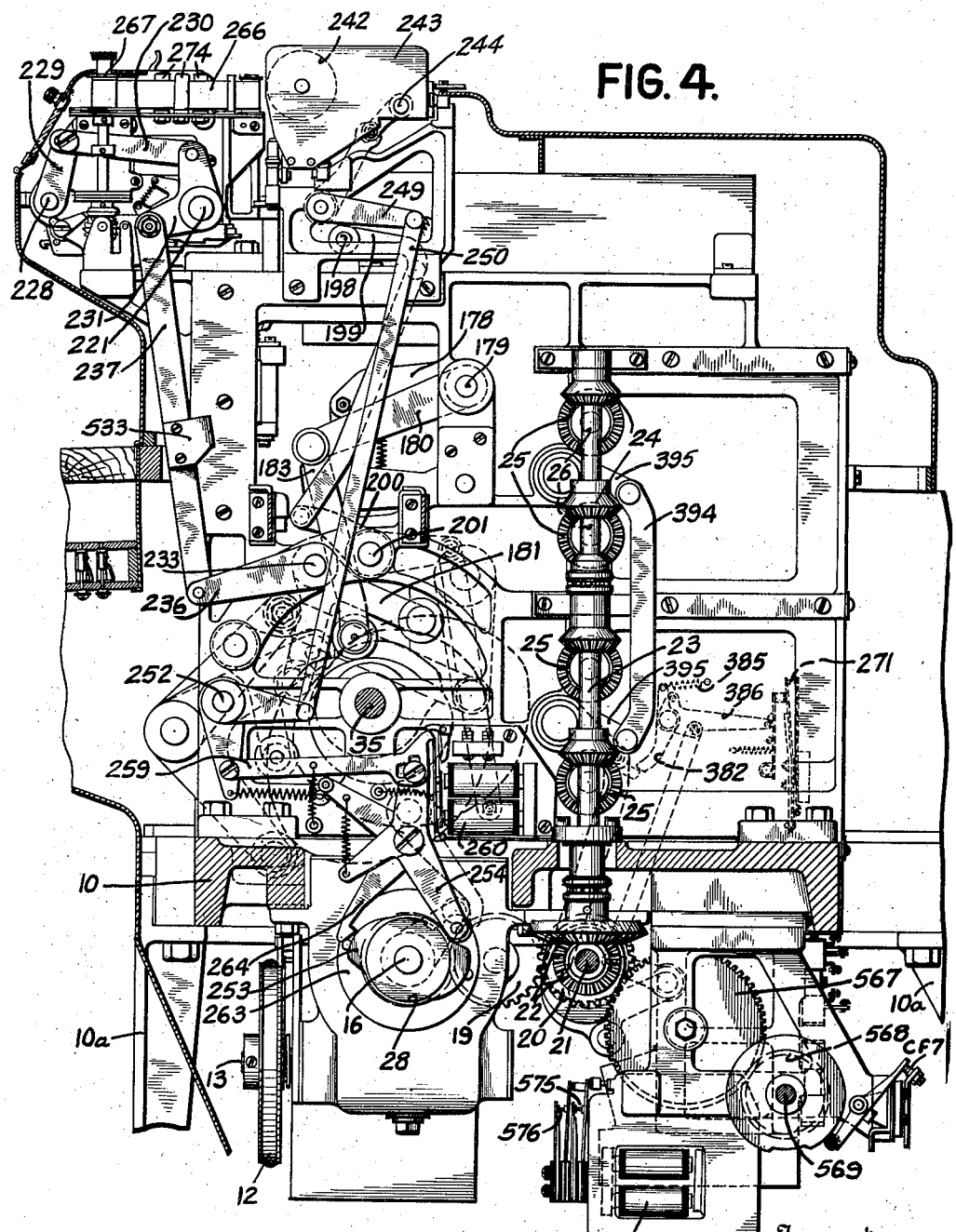
Fig. 4 is a sectional elevation of the machine taken on line 4—4 of Fig. 1.

The various devices comprising the machine are mounted upon a base 10 (Fig. 1) which may be suitably supported upon legs 10a (Fig. 4). Motor 11 attached to the under side of base 10 (see also Fig. 2) has belt and pulley connection 12 with a worm shaft 13. The worm 14 mounted thereon (Fig. 5) drives worm wheel 15 fixed upon a shaft 16 so that said shaft continues running as long as the motor receives current. At one extremity of shaft 16 is a clutch device adapted upon actuation to form a driving connection to the printing type mechanism. A gear 18 (Figs. 2 and 5) mounted at the other end of shaft 16, through gears 19 and 20 drives a shaft 21 which in turn through bevel gears 22 causes vertical shaft 23 to rotate (see Fig. 4). Upon this upright shaft are fixed several bevel gears 24 meshing with bevel gears 25 on parallel horizontal shafts 26. Thus through this train of gearing shafts 26 are seen to be in constant rotation so that gears 27 (Fig. 5) mounted thereon will in turn keep in constant rotation the actuating elements of the accumulating units with which they are related and which will be hereinafter more fully explained.

The shaft 16 (Figs. 2, 3, 4 and 49) carries at the end opposite that on which gear 18 is carried, a notched disk 28 adapted to be engaged by a dog 29 pivotally mounted upon an arm 30 integral with a gear 31. Gear 31 is carried by a stub shaft 32 in axial alinement with shaft 16 and through idler gear 33 drives gear 34 mounted upon cam shaft 35. An armature latch 36 pivoted at 37 upon an arm 38 normally holds dog 29 out of engagement with the driving disk 28 in the position shown in Fig. 49. A magnet 39 upon energization draws armature latch 36 to the left, as viewed in this figure, releasing dog 29 so that its spring 40 may rock it into engagement with driving disk 28. Upon deenergization of magnet 39, armature 36 will be moved by its spring 36a into the path of a projecting toe of dog 29 to throw the dog out of engagement with disk 28. Arm 30 will be similarly engaged by armature 36 to prevent further movement of gear 31 in a clockwise direction. Arm 38 is pivoted near its mid point and provided at one end with a stout spring 41 to absorb the shock of stopping gear 31 and the train of connected mechanism. The usual rebound latch 42 is also provided to cooperate with arm 30. A pair of contacts 43 and 44 are mounted adjacent to magnet 39 and are adapted to be operated by a spring pressed plunger 45 mounted in the framework of the magnet housing. Energization of magnet 39 will cause the armature 36 to move plunger 45 to the left (as viewed in Fig. 49a) to close the contacts 43 and 44.

Referring to Fig. 2b, plunger 45 has pinned thereto a collar 40a adapted to be engaged by a bell crank latch 40b to hold contacts 43 and 44 closed. Mounted on the side of the housing of magnet 39 in Fig. 49a is a magnet 41a and a cooperating armature 41b held away from the magnet by its spring against a stop pin 41c. The free end of armature 41b coacts with a pivoted lever 42b to rock the same in a clockwise direction as viewed in Fig. 2b so that it strikes a pin 42c in spring pressed bell crank 40b thereby releasing rod 45 to open contacts 43, 44. The functions of these contacts will be explained in connection with the circuit diagram of the machine.

The constantly running shaft 21 (Figs. 2 and 2a) carries a gear 46 which meshes with a gear 47 mounted on the card analyzing mechanism (see Fig. 6).

Card feeding mechanism

The card feeding mechanism, about to be described, is driven through the gear 47 from the continually running shaft 21. In Fig. 7 the cards 50 are shown stacked in a magazine 51 mounted between the supporting plates 52. The usual weight presses the cards down in the magazine. A micrometer slot in the bottom of the magazine is adapted to permit but one card to pass through the machine at a time. A picker 53 is adapted to grip the lowermost card of the stack and advance it through the slot. The picker is mounted on sliding member 54 carried in the grooves 55 in the frame of the machine. The sliding member 54 is provided with rack teeth meshing with a segmental gear 56 mounted on a shaft 57 and adapted to oscillate to move the picker back and forth. The shaft 57 has fixed thereon outside of the supporting plates (Fig. 6) an arm 58 connected by a link 59 to a bell crank 60 pivoted at 61 and provided with cam follower rollers cooperating with a pair of complementary cams 62 pivoted on a stud 63. The cams 62 are clutch connected as will presently be described, to a gear 64 meshing with a gear 65 which in turn meshes with a gear 66a. Gear 66a is integral with a gear 66 which in turn through gear 67 is driven by the constantly running gear 47. One complete cycle of cams 62 causes the card picker to move once to the right to feed the card through the slot and back to the left, as in Fig. 7. When the card is advanced from the bottom of the stack it is gripped between feed rollers 69 and fed by these rollers to the next set of feed rollers 70 which in turn feed it between the plates 71, 72. The card is fed downwardly until it is stopped by a gate 73 mounted on arms 74 secured to shaft 75. Fixed on shaft 75, as shown in Fig. 6, is an arm 76 connected by a link 77 to a cam follower arm 78 having a cam follower roller cooperating with a cam 79 integral with the cams 62. A suitable spring is provided to hold the follower against its cam.

The cam 79 is adapted to cause the gate 73 to move into the path of the card to stop it between the plates 71 and 72 and to rock counterclockwise to permit the card to pass out from between the plates later in the cycle. At such time feed rollers 80 and 80a (Fig. 7) will feed the card from between the plates 71 and 72. A curved guide plate will guide the leading edge of the card into cooperation with the clips of a rotary card stacker 81 mounted on a shaft 82. This stacker is well known in the art and need not be described in detail. The stacker is actuated by a bevel pinion 83 (Fig. 6) on shaft 82 which has bevel gear connection, as shown in this figure, to a bevel gear 84 integral with the gear 65. The timing of the stacker is such that the clips are open to receive the card as it feeds downwardly over the guide plate. The clips then grip the card and pull it into the discharge pocket 85. Turning of the feed rollers is effected by gear 86 which is fast to gear 64 and meshes with pinion gears connected to the various feed roller shafts, as shown in Fig. 6. The inner feed rollers 80a are not positively driven but are driven by being pressed against the card and in turn pressing the card against the outer rollers 80 which are positively driven. The former rollers are carried on arms which are loose on shaft 75 and which are provided with pins engaged by arms 87 which are fixed on shaft 75.

Suitable springs attached to the lower ends of the roler arms tend to rock the rollers 80a against the card lightly. When the shaft 75 rocks to move the gate 73 to permit the card to be fed out, the arms 87 engage the arms carrying rollers 80a and press them firmly against the card to insure feeding thereof. In Figs. 6, 48 and 49, the gear 64 rotates constantly and carries with it the gear 86 integral therewith. A pin 88 riveted in gear 86 is adapted during its rotation to strike an arm 89 secured to a collar 90, the other end of which is fast to a clutch arm 91 and is pivoted upon the stud 61. The normal position of the clutch arm is as shown in Fig. 48, wherein it is held in position by an armature latch 92 adapted to be rocked out of engagement with arm 91 by the magnet 93.

The arm 91 is adapted to engage a spring pressed clutch dog 94 pivoted upon the cam 79 to hold the dog out of engagement with its driving disk 95 which is secured to the constantly running gear 64. The arm 91 also engages a member 96 secured to cam 79 to positively interrupt the counterclockwise rotation of cam 79. The usual rebound latch 97 prevents clockwise movement of the parts. The cams 62 and 79 (Fig. 49) are secured together and mounted loosely upon the stud 63 and are adapted when the magnet 93 is energized to be clutched to the constantly running clutch element 95 to cause feeding of the cards to the continually running feed rollers. The magnet 93 is energized to attract its armature 92 at a time when the pin 88 is in engagement with the arm 89 rocking the arm slightly clockwise to relieve the pressure against the latch 92 so it may be more readily attracted by its magnet. When the pin 88 passes the extremity of arm 89, the spring 98 will rock the arms 89, 91 out of cooperation with the clutch dog 95 and against a fixed stop pin 99. The driving connection thus formed between the member 95 and the cams 62, 79 will be maintained as long as magnet 93 remains energized. Once each revolution of the mechanism pin 88 will engage the arm 89 and rock it from the position of Fig. 6 to that of Fig. 48 and again release it before the dog 94 has approached the extremity of arm 91. If, however, while the arms are rocked in their clockwise position the magnet 93 is de-energized, the latch 92 will be drawn downwardly by its spring to hold the arms in such position where arm 91 will engage the dog 94 to disconnect it from the driving element 95, thus causing interruption in the feeding of the cards.

Description of the perforated card

A brief description will be given of the arrangement of perforations in the record card before considering the mechanism for analyzing the record. The card 50 (Fig. 53) is perforated in accordance with the well known Peirce system of combinational hole perforations wherein the card is divided into a lower and an upper field, the lower field having four index point positions labelled A, B, C, D, and the upper field positions being labelled 1, 2, A, B, C, D. The lower field is used to record numerical information where only digits are involved and a perforation in accordance with the combination shown is accompanied by its typewritten interpretation along the upper portion of the card and in the same column in which the perforation occurs. Inspection of the upper perforated field of the card will show that the perforations in the positions A, B, C, D, have been repeated four times, a particular combination occurring once in each of the four zones included within the brackets. In zones 2, 3 and 4, the four hole combination perforations are accompanied by additional control perforations in the positions 1 and 2. In this manner sufficient combinational arrangements are available to include all the digits and characters of the alphabet. The analyzing mechanism of the machine is adapted to determine from the perforations in the first and second positions the zone to which a particular character has been alotted, and further analyzing mechanism cooperating with the positions A, B, C, D, will determine the identity of the particular character in that zone.

Card analyzing mechanism

After the card 50 has been fed to the sensing position between the plates 71, 72 and stopped by the gate 73, it is pin-boxed by sensing pins 100 (Fig. 7) cooperating with the index positions A, B, C, D, on the card and pins 100x, 100y cooperating with the index points 1, 2 of the card. A set of pins 100, 100x, 100y, is provided for each column of the card. The sensing pins are supported at their forward ends in plate 72 and at their rear ends in plate 101 and also by an intermediate plate 102, (see also Fig. 51).

Figure 8:
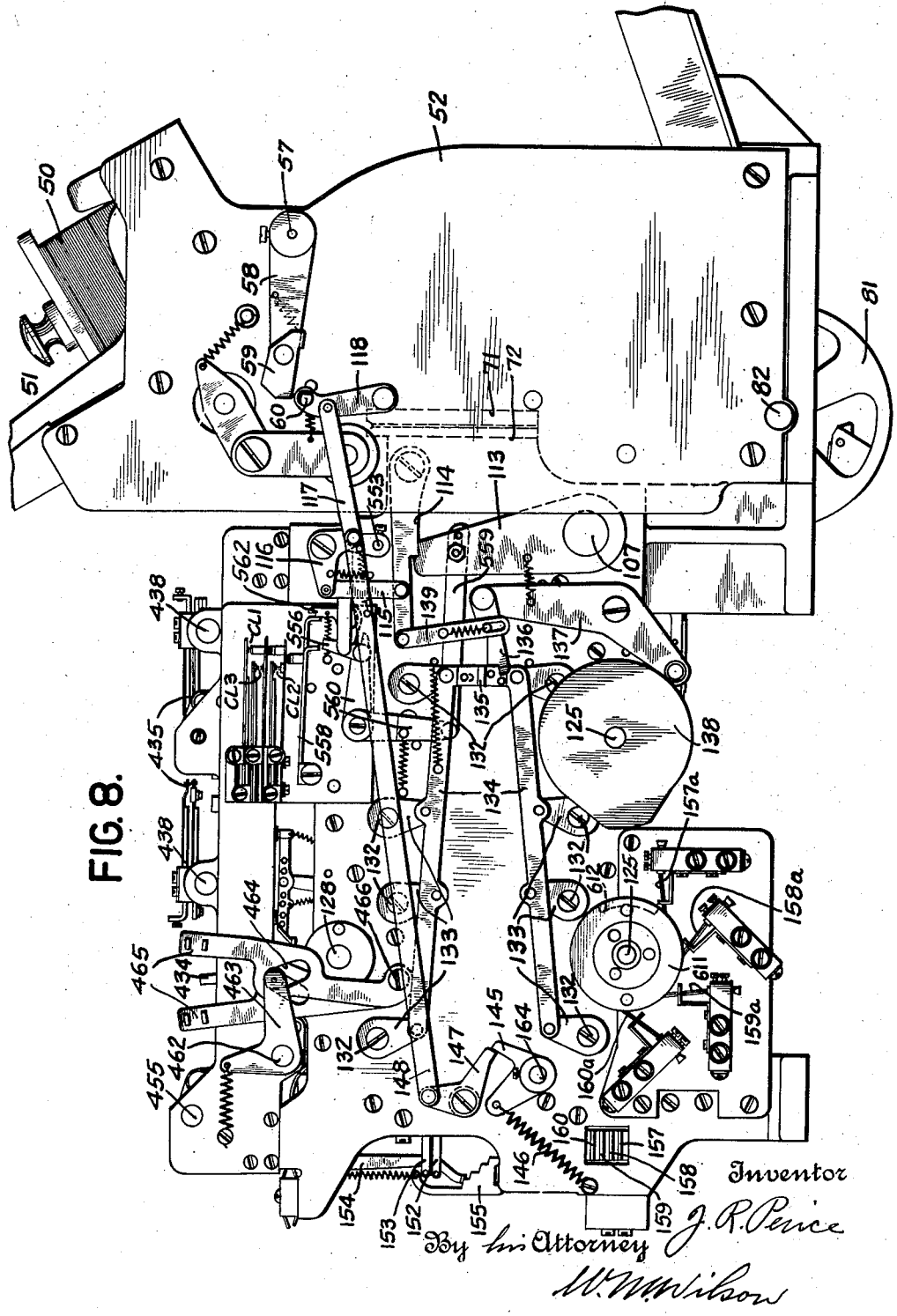
Fig. 8 is an outside view of the left side of the card analyzing mechanism, the section looking in the direction of line 8—8 of Fig. 1.
Figure 32:
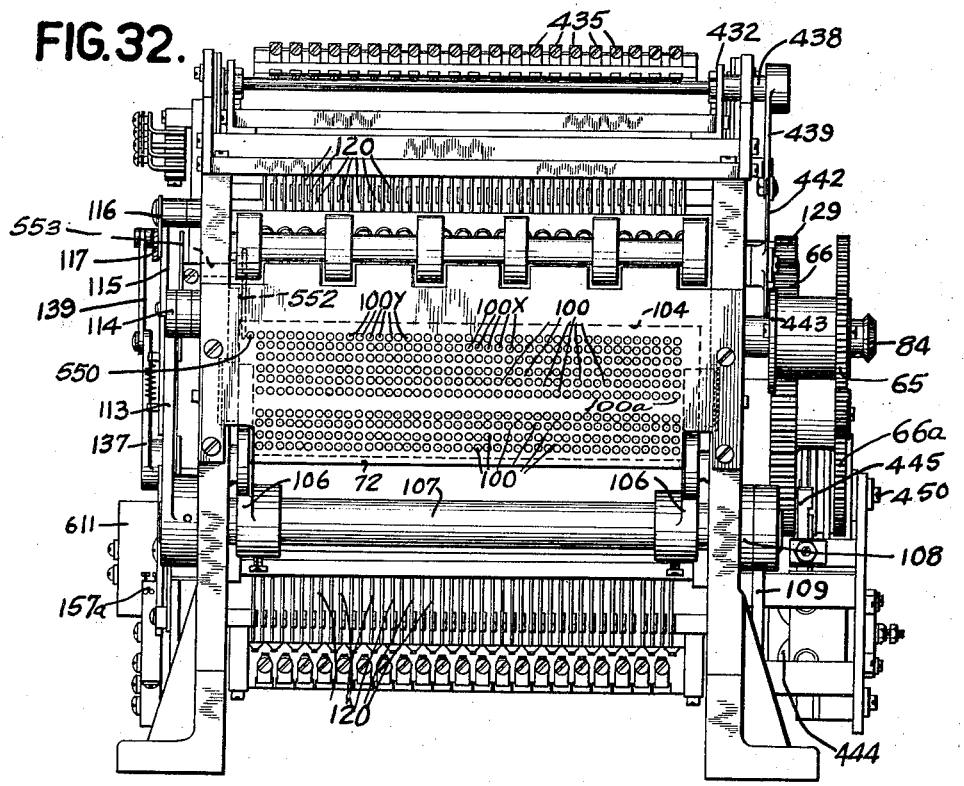
Fig. 32 is a section of the card analyzing mechanism taken on line 32—32 of Fig. 7.

Each pin is provided with a spring 103 resting at one end against a collar secured upon the pin and resting at the other end against the plate 102. The spring thus tends to press the pin against the card or through the card if there is a perforation therein that position. A restoring plate 104 resting against the collars fixed to the pins is adapted to restore the pins to non-reading position as in Fig. 7 and to be moved to the left to permit the pins to take a reading from the card. The restoring plate 104 is connected by links 105 to arms 106 fixed on the shaft 107 (see also Fig. 32). In Fig. 6 the shaft 107 has connected thereto an arm 108 connected by a link 109 to a lever 110 pivoted at 111 and having a cam follower roller cooperating with a cam 112 secured to continually running shaft 21 (see also Figs. 2a and 34). A suitable spring is provided to press the follower roller into engagement with the cam 112. The cam 112 positively restores the plate 104 to the position of Fig. 7 removing the pins from reading position. In Figs. 8 and 32, the shaft 107 has secured thereto an arm 113 adapted to be engaged at its upper end by a latch 114 which when in the position of Fig. 8 will prevent the rocking of shaft 107 and the consequent analyzing of the card by the sensing pins. The latch 114 is connected by a link 115 to a spring pressed pivoted bell crank 116 which has its other arm connected by a link 117 to a pivoted arm 118. The picker shaft 57 carries an arm 58 upon the free end of which is pivoted a spring pressed by-pass 59. The operation is such that as the shaft 57 rocks counterclockwise in Fig. 8 to feed the first card from the bottom of the stack, the latch 59 will by-pass a stud 60 secured in the arm 108 with which it cooperates and this first card will be advanced to the sensing station. Upon the return movement of latch 59 it will engage the stud 60 rocking the arm 118 about its pivot and through link 117, bell crank 116, and link 115, rock the latch 114 in a clockwise direction to release the arm 113 so that the sensing pins may be permitted to analyze the card. The upper end of arm 113 cooperates with the lower arcuate edge of latch 114 to hold the latch in its clockwise position for a purpose which will be explained later.

When the card feed clutch magnet 93 of Fig. 6 is deenergized during a total taking cycle, as will be more particularly pointed out in connection with total taking, the operation of the picker shaft 57 is interrupted and the operation of the sensing pins is consequently interrupted as has been explained.

Translating mechanism

The mechanism about to be described is adapted to translate the combinational hole readings obtained by the sensing pins from the card into timed electric impulses which may be used to control the position of type bars for printing the combination corresponding to the perforations on the card or to control the operation of accumulating mechanisms adapted to receive these timed electric impulses. Each of the pins 100 corresponding to the index positions A, B, C, D, in both the upper and lower fields of the card 50 have secured thereto blocks 119 (see Figs. 7 and 51) which carry pins projecting laterally therefrom which cooperate with spring pressed pivoted arms 120. The arms 120 cooperating with the lower field of pins 100 carry brushes 121d and 121b cooperating with a commutator 122 and brushes 121c and 121a cooperating with a commutator 123. The arms 120 cooperating with the positions A, B, C, D, in the upper field, carry similarly corresponding brushes 121a, 121b, 121c, 121d, of which the brushes 121a and 121c cooperate with a commutator 123 and the brushes 121b and 121d cooperate with the commutator 124. When the sensing pins 100 are released to return the card, those that find perforations project through the card and rock their respective arms 120. In Fig. 51, the pin corresponding with the A position in the upper field of the card as passed through a perforation and has rocked its arm 120 thereby advancing its brush 121a along the periphery of the commutator 123 from the dotted line position to the full line position. The remaining pins have not found perforations in the card and have been stopped thereby, thus not changing the positions of their brushes with respect to the commutators.

Figure 34:
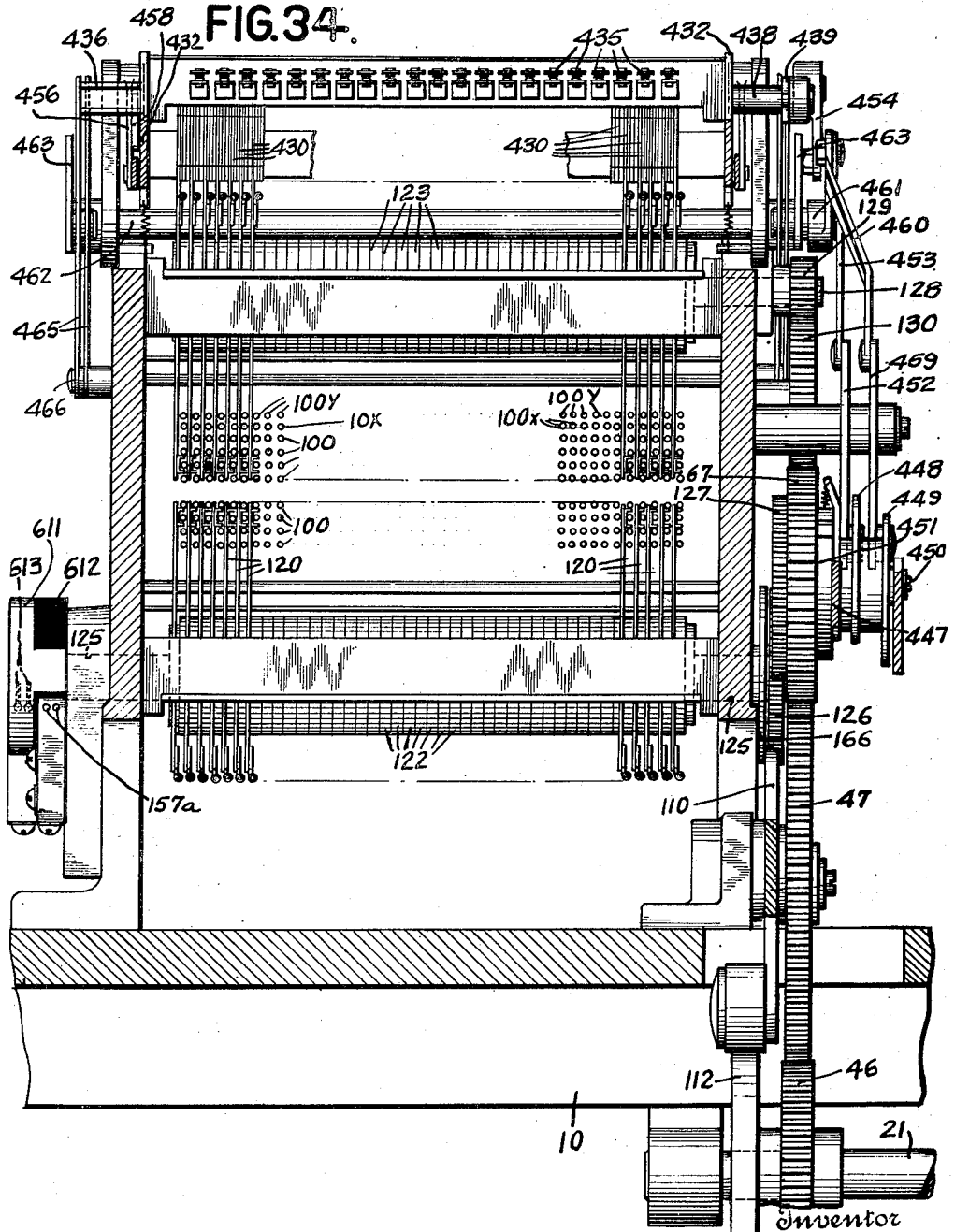
Fig. 34 is a section similar to Fig. 32, being taken on line 34—34 of Fig. 7.

In Fig. 7 the lower set of commutators 122 and 123 which cooperate with the pins of the lower field of the card are keyed to shafts 125 which in Figs. 6 and 34 carry gears 126 meshing with a gear 127 integral with the gear 67. The gear ratio is such that the shafts 125 make one revolution for each revolution of the machine. The commutators 123 and 124 associated with the upper field of the card are mounted upon shafts 128 which in Figs. 6 and 34 carry pinions 129 driven by the constantly running gear 67, one through idler 66 and the other through an idler 130. The ratio of the gearing is such that shafts 1:0

128 make four revolutions during one revolution of the machine for a purpose to be explained in connection with the controlling of the alphabet printing type bars. Associated with each of the brush carrying arms 120 are circular latching members 131 (Figs. 7 and 51) pivoted at 132 (Fig. 8). Arms 133 connected to the latch members 131 are connected to a pair of common links 134 which have a common projection 135 adapted to cooperate with an actuating latch 136 pivoted to bell crank follower arm 137 which cooperates with a cam 138 mounted upon one of the shafts 125. A suitable spring is provided to keep the follower roller of arm 137 in cooperation with its cam. After the sensing pins 100 have taken their readings the cam 138 through the latch 136 engaging the projection 135 will rock the latching members 131 slightly to release all of the arms 120 so that they may shift under control of the perforations in the card. Immediately after this shifting the latches 131 can return to their operative position wherein they will latch all of the arms 120 that have moved in such moved position, as shown in Fig. 51. In this manner the associated brush may be retained in shifted position while the pins 100 are retracted from the card. In Fig. 8 the latch 136 is resiliently connected by a link 139 to the free end of latch 114 and the manner of operation is such that after latch 114 has been rocked clockwise in a manner already described, it will raise the latch 136 into active cooperation with the projection 135 through the link 139.

The timing of the operation is such that the cam 138 does not actuate the latch 136 until after the setting pins have advanced to read the card. During such advance the latch 136 is maintained in its upper active position by the cooperation of the upper end of arm 113 with the lower arcuate edge of the latch 114. It will thus be seen that if the feeding of the cards is interrupted and the arm 113 is latched to prevent advance of the sensing pins, the setting of the brushes effected under control of the last card sensed will not be disturbed due to the interruption in the operation of the circular locking latches 131.

After the card has been analyzed and the branches have been positioned in accordance with the reading obtained, this reading is analyzed by the commutators 122, 123, 124. These commutators are constantly rotating but the flow of current therethrough is controlled by contact devices to be pointed out later on, which permit circuits to be effected through the commutators only during type bar and accumulator positioning portions of the operation of the machine.

In Fig. 52 is shown a development of a pair of commutators 122 and 123 corresponding to one column of perforations in the lower field of the card. The shaded areas represent insulating material and the white areas represent conductor segments and sections between the segments (see also Fig. 47 wherein is shown a detail sectional elevation of one of the commutators 123). All of the segments 140 of the commutators are connected by a common circumferential strip 141 while all of the segments 142 are connected by a common strip 143. As shown in Fig. 52, the brushes 121a, 121b are connected to each other by a wire 144. The commutators rotate in synchronism with the rising of type bars past the printing position and the rotation of accumulating register wheels. The brushes are set in accordance with the perforations corresponding to the numeral 6 and as shown diagrammatically in Fig. 52, the brushes 121a and 121d have been shifted from their dotted to their full line positions.

When the commutators have turned through the 9, 8, and 7 positions to the 6 position, the parts will be in the relative positions as shown and the synchronously operating type bars will have their 6 type position on the printing line and the accumulator wheels will be in position to record a 6. In the diagram, presuming that current is entering through the brush 121d, it will pass into segment 140 to commutator 122 along the strip 141 to the segment 140 which is now in connection with the brush 121b. From here the current passes through wire 144 to brush 121a, thence along the connecting member 143 to brush 121c which is in a contact with a segment 142. Thus after the brushes have been set in accordance with the combination of numeral 6 and the commutators 122, 123 continue to rotate; when they reach the 6 position, current will pass through the commutator brushes to complete a circuit through the printing magnet or the adding magnet as the case may be to interrupt the type bar in the 6 position or to cause a 6 to be added into the accumulating mechanism. In this manner for each different arrangement of perforations in the positions A, B, C, D, of the card, timed electric impulses will be permitted to pass through the commutators at a time depending upon the value of the character.

*Zone selecting mechanism*

In Fig. 53 the arrangement of the perforations is such that for each combination of the positions A, B, C, D, there are alotted four characters, one for each of the zones. For instance, in zone 1, the numeral 6 is represented by a perforation at A and D; in zone 2 the letter B is also represented by a perforation at A and D; in zone 3, the letter P is similarly represented; and again in zone 4, the letter X. Thus it will be seen that for each of the combinational arrangements of these four index point positions, the brushes will be shifted in the same relative manner for four different characters.

Figure 27:
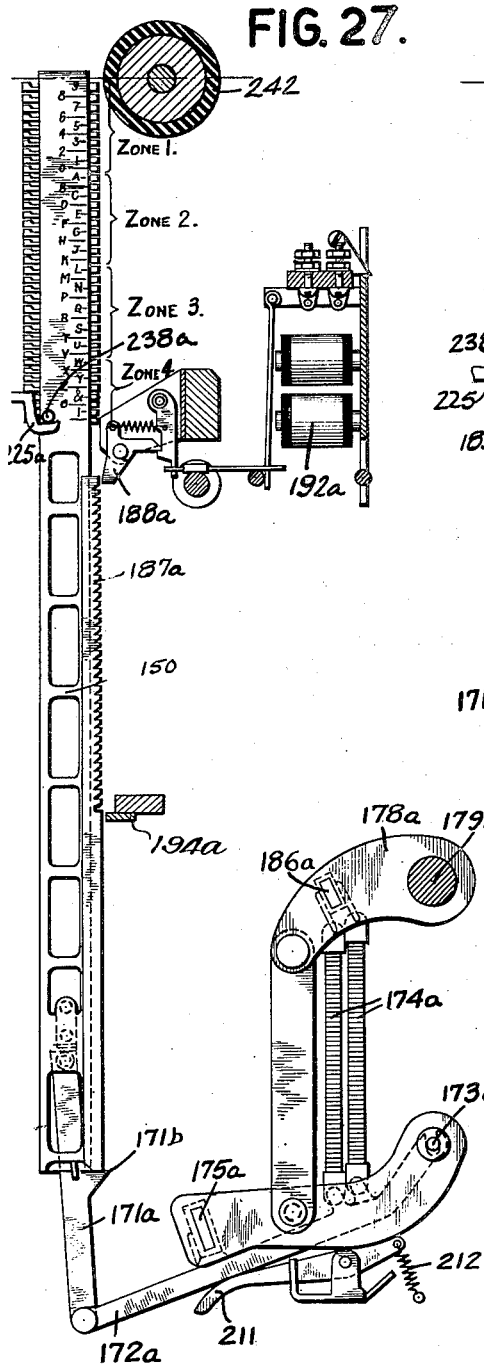
Fig. 27 is a similar detail of alphabet printing type bar.

In Fig. 51, the commutators 123, 124 which function under control of the upper field of the card are similar in structure to the commutators 122, 123 corresponding to the lower field of the card, and in Fig. 45 is shown a repeated development of the four revolutions of these commutators which take place during one revolution of the lower pair of commutators 122, 123. In Fig. 27 is shown the type bar 150 which is adapted to be controlled by the circuits established through the commutators 123, 124. The relationship is such that as the type bar 150 rises in synchronism with the rotation of the commutators, the characters included in zone 1 cooperate with the printing position during the first half revolution of the commutators. The characters in zone 2 cooperate with the printing line during the second half revolution of the commutators. Similarly, during the second revolution, the commutators for zones 3 and 4 successively present their elements to the printing line. On the development diagram of the commutators are shown the brushes under control of the perforations in the positions A and D of the card. The various positions in which circuits may be completed have been shown and an inspection of Fig. 45 will disclose that when the numeral 6 in zone 1 is on the printing line, the circuit will be established as described in connection with Fig. 52. Continued rotation of the commutator will bring the segments into such relation with the brushes that a circuit will be established in zone 2 in the B position. During the second revolution of the commutators these two circuits will be repeated in the P position of zone 3 and the X position of zone 4.

Which of these circuits is to be effective to position the type bar is determined by the two uppermost sensing pins 100x and 100y which sense the index positions 1, 2 of the card (see Fig. 51). The pin 100x is provided with a stop collar 151 secured thereto which cooperates with frame 102 to limit the movement of the pin. At its rear end it carries a block 152 having a vertical projection 152a disposed in the path of a block 153 secured to the end of the pin 100y.

The pins in the extremities of the blocks 152 and 153 cooperate with a spring pressed latch 154 which cooperates with the stops of a zone selector 155 which is spring biased upwardly. The selector 155 carries a slider 156 cooperating on one side with conductor bars 157, 158, 159, 160, and with an individual strip 161. The members 155 are controlled by a bar 162 connected at its ends to arms 163 (see also Fig. 7) secured to a shaft 164 which in Fig. 6 carries at its outer end a spring pressed arm 165 having a roller thereon cooperating with a cam 166 mounted upon shaft 125. The operation is such that after the pins 100x, 100y have advanced to take a reading from the card, the bar 162 is positively elevated to release the members 155 so that they may take a position according to the arrangement of perforations in the index positions 1 and 2 of the card. If neither of the pins advance, member 155 will remain in the position of Fig. 51, wherein the slider 156 lies adjacent to bar 157. If the pin 100x alone advances, it will move a distance limited by the cooperation of block 151 with the frame 102 and will rock the latch 154 into a position where it will intercept the member 155 on its second step in which position the slider 156 lies adjacent to bar 158. The advancement of pin 100y alone will permit the pin to advance until its block 153 engages the upward projection on block 152. This movement will be sufficient to displace the latch 154 so that it will engage the member 155 on its third step and slider 156 will cooperate with the bar 159. If both pins advance, the slider 156 will be permitted to move into cooperation with the bar 160. A zone set up having thus been effected by the pins 100x and 100y the pins may be returned together with the pins 100 without disturbing the setting of the sliders 156. The manner in which the bars 157, 158, 159 and 160 select a particular zone in the type bar 150 for printing will be more fully explained in connection with the electric circuit of the machine.

In Fig. 8, shaft 164 carries a bell crank 145 to one arm of which is attached a spring 146 and the other arm cooperates with a latch 147. A link 148 connects the latch to bell crank 116 at its point of connection with link 117. As the picker shaft 57 is rocked to feed a card latch 147 will be tilted to release bell crank 145 so that shaft 164 may be operated under control of cam 166 (Fig. 6) to restore the zone selecting members 155. Upon interruption of card feeding, as during a total cycle of operations, bell crank 145 will remain latched thus holding bar 162 elevated and the members 155 in zone-selecting position.

It has already been explained how the brushes are held in shifted position upon interruption of card feeding. This together with the retention of the zone-selection set-up will hold the reading in the translating mechanism to be read out in a subsequent cycle of operations.

*Operation of the numerical type bars*

The type bars are raised by the action of the machine, their upward travel being arrested at various points as the result of an electric impulse actuating a latching device, as will be described.

Figure 5:
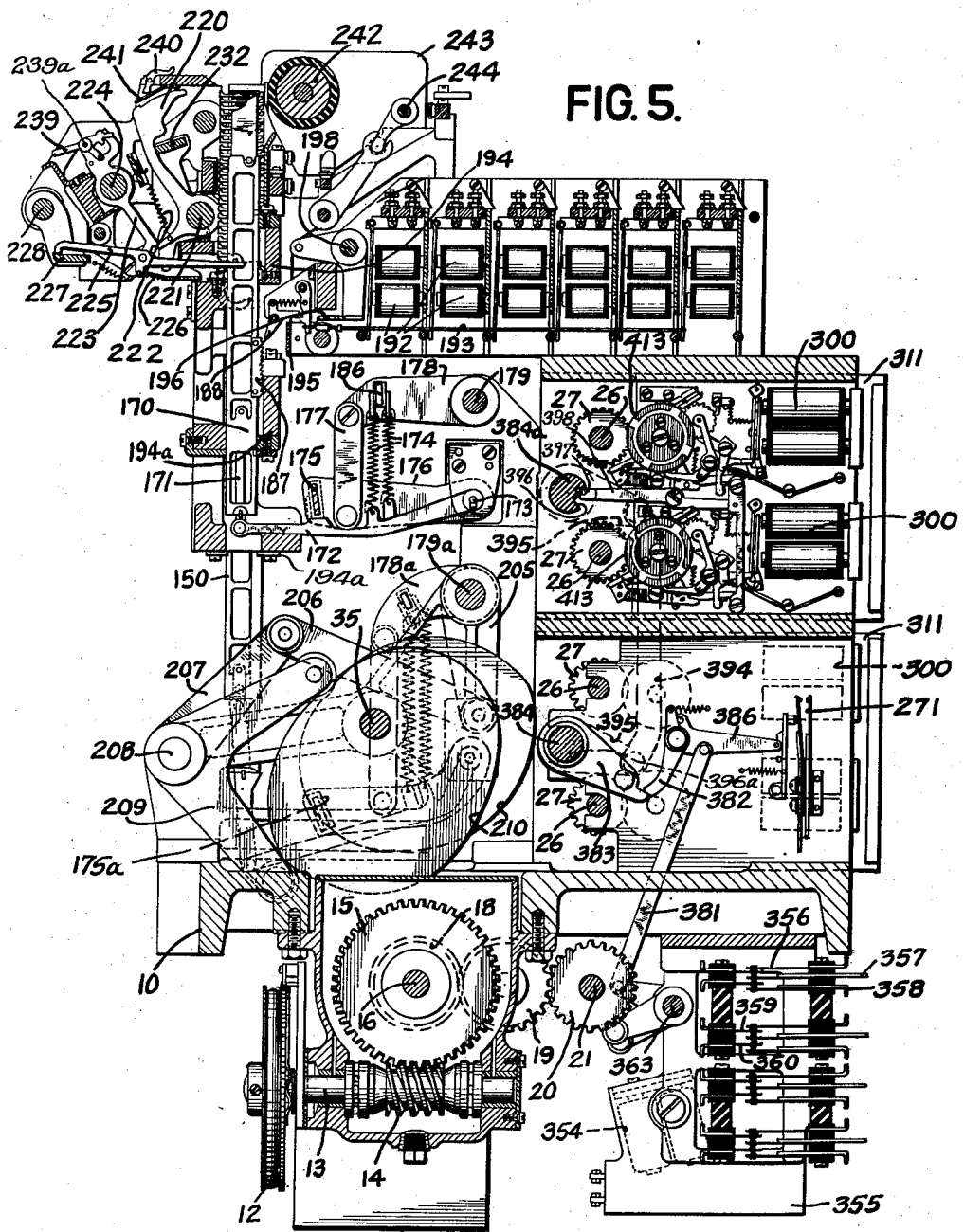
Fig. 5 is a section similar to Fig. 4 taken on line 5—5 of Fig. 1.
Figure 26:
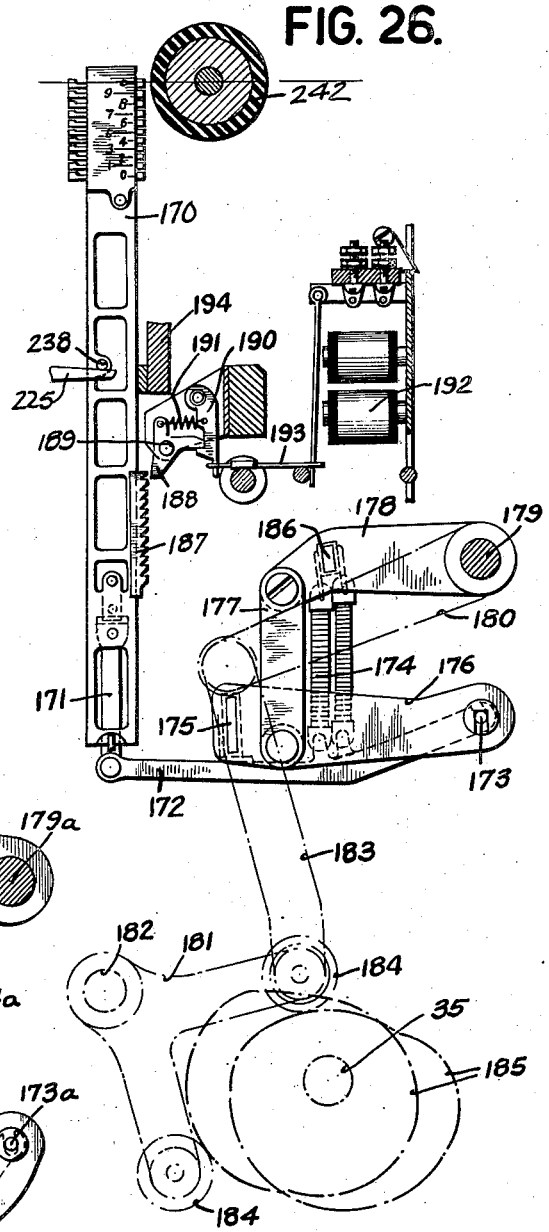
Fig. 26 is a detail of a digit printing type bar and its controlling mechanism.

Referring to Figs. 5 and 26, the numerical type bars are shown at 170. Each bar is supported at its lower end through a link 171 by an arm 172 slotted at its right end to engage a rod 173. A spring 174 attached near the mid point of arm 172 urges said arm against rod 173 on one side of the spring connection and against a restoring member 175 on the other, which member normally holds the type bars in depressed position. The restoring member 175 is carried at each end by an arm 176 having an axis in line with the center of rod 173. Through links 177 these arms 176 are connected to arms 178 fixed to shaft 179 which has secured at one end an arm 180. A double armed lever 181 pivoted at 172 is connected to arm 180 by a link 183 and has cam follower rollers 184 cooperating with complementary cams 185 mounted on shaft 35. For each revolution of shaft 35, restoring member 175 is oscillated once causing the type bars 170 to move upward in synchronism with the rotation of the commutators 122, 123 of Fig. 7 which cooperate with the lower or numerical field of the card.

Springs 174 are connected between arms 172 and a bar 186 carried between arms 178 so that as this bar is rocked, the type bars follow through the action of the springs. If the type bar 170 is stopped at an intermediate position while the restoring bar 186 continues to rise, the spring 174 will, of course, stretch.

Figure 24:
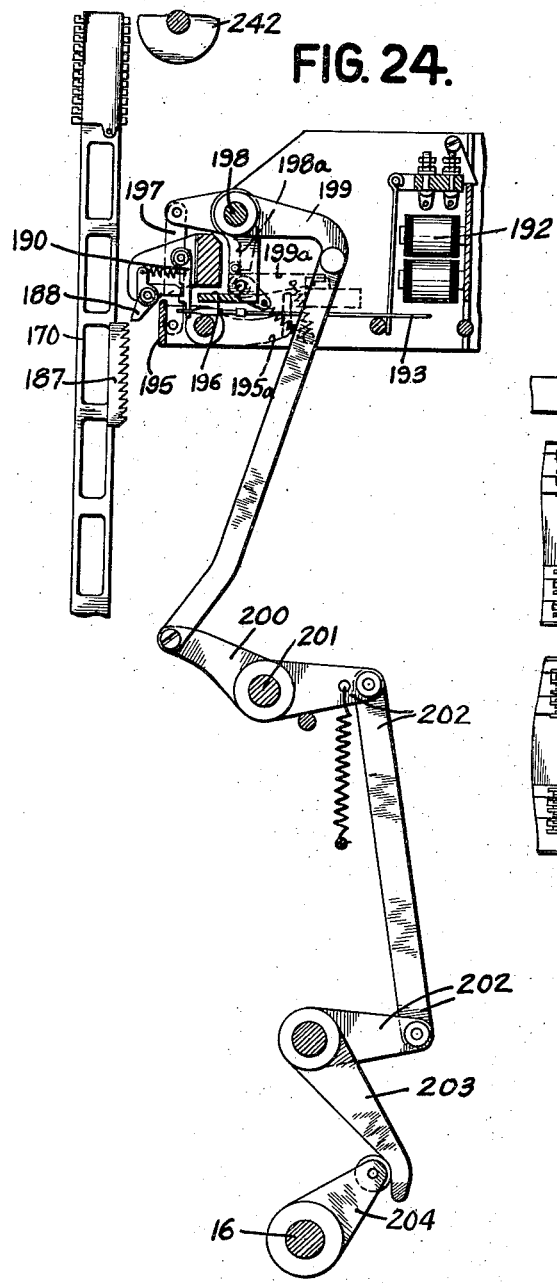
Fig. 24 is a detail of the type bar pawl restoring mechanism.
Figure 25:
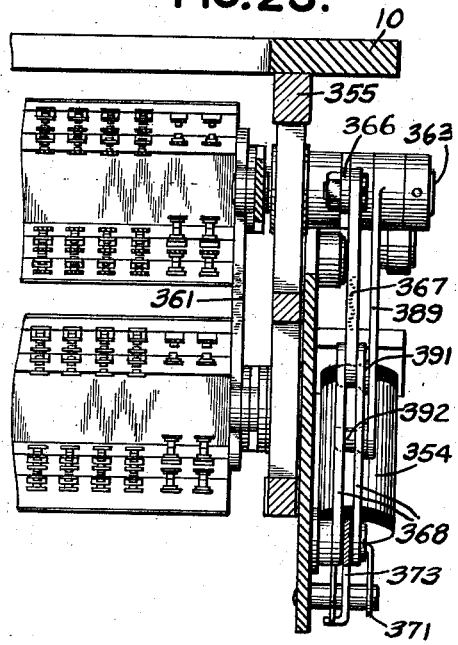
Fig. 25 is a detail of certain total circuit controlling contacts.

In Fig. 26 is shown a toothed member 187 secured to the type bar 170. The member 187 is adapted to cooperate with a bell crank stop 188 pivoted at 189 and held in normal position by a latch 190. A spring 191 holds the parts in restored relationship. A magnet 192 is adapted through its armature to actuate a call wire 193 to release stop 188 permitting it to engage member 187. It may here be stated that while the commutators 122, 123 whose brushes are controlled by the sensing pins of the lower field of the card make one revolution the type bars 170 will be moved up and returned again. As the type bar moves up presenting the type elements thereon in succession to the printing line the closure of an electric circuit through the commutators, as heretofore explained, will cause energization of magnet 192 to stop the type bar in position to print the proper character. In the absence of any circuit due to the fact that there are no perforations in that particular column, no circuits will be established and the type bar will rise until member 187 contacts with bar 194 in which position the lowermost type element is presented to the printing line. This element is adapted when actuated to print the character 0. Positive restoration of stops 188 and latches 190 is obtained by bails 195 and 196 (see Fig. 24). Bail 195 is connected by a link 197 to an arm secured upon a shaft 98 upon which bail 196 is freely pivoted. Shaft 198 carries an arm 199 which has link connection to an arm 200 to a short shaft 201 which in turn through link and arm connection 202 is connected to a lever 203.

A cam roller arm 204 secured to one end of continually rotating shaft 16 (see also Fig. 2) is adapted each revolution thereof to contact lever 203 and through the linkage traced rock both shaft 198 in a clockwise direction.

Shaft 198 has secured thereto an arm 198a which cooperates with a pin in one arm of bail 196 to restore the latches 190 after the stops 188 have been restored. A latch 199a pivoted to bail 196 is permitted to be drawn downwardly by its spring into cooperation with a fixed block to latch bail 196 in its restoring position where it remains until an arm 195a integral with bail 195 raises latch 199a upon return of bail 195. The purpose of latching bail 196 to the left until bail 195 has returned is to insure that stops 188 are firmly cooperating with latches 190.

Operation of the alphabetical type bars

In Fig. 27 is shown an alphabetical printing type bar 150. The manner of raising and lowering this type bar is similar to the manner in which the numerical type bars are operated. Each type bar is connected by link 171a to a lever 172a pivoted at 173a. The members 172a are connected by the springs 174a to a bar 186a which is carried by the arms 178a which are secured upon the shaft 179a. A restoring bar 175a is also provided to restore the levers 172a in a familiar manner. In Fig. 5 the shaft 179a carries a depending arm 205 which is connected through a link 206 to an arm 207 secured on a rod 208. Also fixed to the rod is a cam follower member 206 and follower rollers cooperating with a pair of complementary cams 210 carried by the shaft 35. The type bar 150 has a toothed member 187a which cooperates with a stop 188a which is tripped by magnet 192a. The type elements on type bar 150 include all the characters shown in the upper field of the card in Fig. 53. These characters are arranged in zones as indicated. Included in zone 1 are the digits; in zone 2, the first ten letters of the alphabet; in zone 3, the next ten; and in zone 4, the remaining characters and other symbols. The movement of the type bars 150 to printing position is coordinated with the rotation of commutators 123, 124 of Fig. 7 which have brushes under control of the upper field of the card. The time relationship is such that the commutators make a half revolution during the passage of the type elements in zone 1 past the printing line.

During the second half revolution of the commutators the elements in zone 2 are passing the printing line. During the first half of the next revolution, the type elements in zone 3 are presented for selection, and during the second half of the second revolution, the type elements of zone 4 are presented. As has already been explained, during each of these active portions of the commutator revolutions, electric circuits may be established therethrough in accordance with the particular character set up by the brushes and under control of the zone selecting mechanism already described, a circuit will be selected to cause printing from the zone to which the particular character belongs.

In Fig. 27 a lever 211 is shown contacting the underside of arm 172a when the latter is in its depressed position thereby stretching a spring 212 which thus helps to overcome the inertia of the descending type bar and assists the bar on its upward stroke until arm 172a passes out of contact with lever 211. If during the rise of type bar 150 no circuit is completed through the magnet 192a, the bar will rise to its extreme position wherein no type element is on the printing line. It is stopped in this position by the cooperation of a projection 171b of the link 171a with a fixed bar 194a.

Type hammer control

In Fig. 5, the hammers 220 for actuating the type elements are loosely mounted on a shaft 221 and pressed by springs 222, connected at one end to said hammers and at the other to a fixed plate, during printing action. The hammers are normally locked against such action by latches 223 engaging the lower projection of the hammers. The latches 223 are loosely mounted on a rod 224 and carry pivotally mounted levers 225. Springs 226 normally hold the latches in operative position. The hooked left end of lever 225 is adapted to be depressed to engage the bevelled edge of bail 227 fixed on a shaft 228. In Figs. 4 and 20, shaft 228 has affixed thereto an arm 229 with pin and slot connection to a link 230 attached to a bell crank 231 which is secured to shaft 221.

A shaft 233 carries a double armed lever 234 having cam follower rollers cooperating with a pair of complementary cams 235 mounted upon the shaft 35. These cams through shaft 233, arm 236 and link 237 actuate bell crank 231. Shaft 221 (Fig. 5) carries a restoring bail 232 to restore the hammers to latched position after they have been tripped. As bail 232 approaches its right hand position, link 230 causes clockwise rotation of shaft 228 to move bail 227 to the left so that if the hooked end of lever 225 is in cooperation with such bail the latch 223 will be moved to the left to unlatch the hammer whereupon the latter will be actuated by its spring 222 to impel the type for printing. A pin 238 (see Fig. 26) carried by type bar 170 normally engages one end of lever 225 and holds the hooked end out of cooperation with bail 227. Should the type bar rise beyond the upper zero printing position the pin 238 will release lever 225 sufficiently to permit the same to cooperate with the bail 227. In Fig. 27 the type bar 150 is also provided with a pin 238a which cooperates with the end of a lever 225a similar to the lever 225 which cooperates with the numerical type bar.

Figure 1:
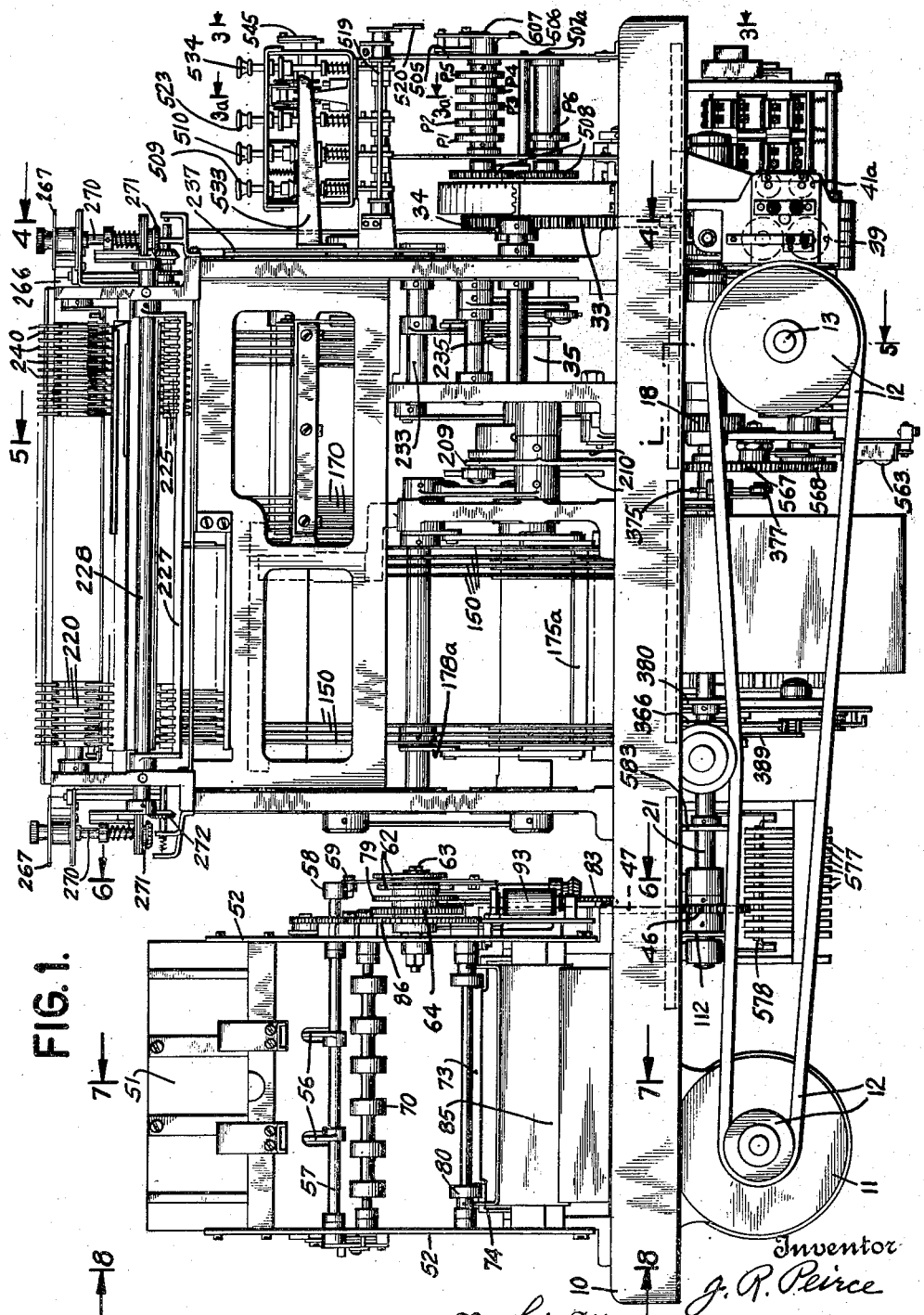
Fig. 1 is a front elevational view of the assembled machine showing the location of the card feeding devices, the printing mechanisms, and the various control keys.
Figure 2:
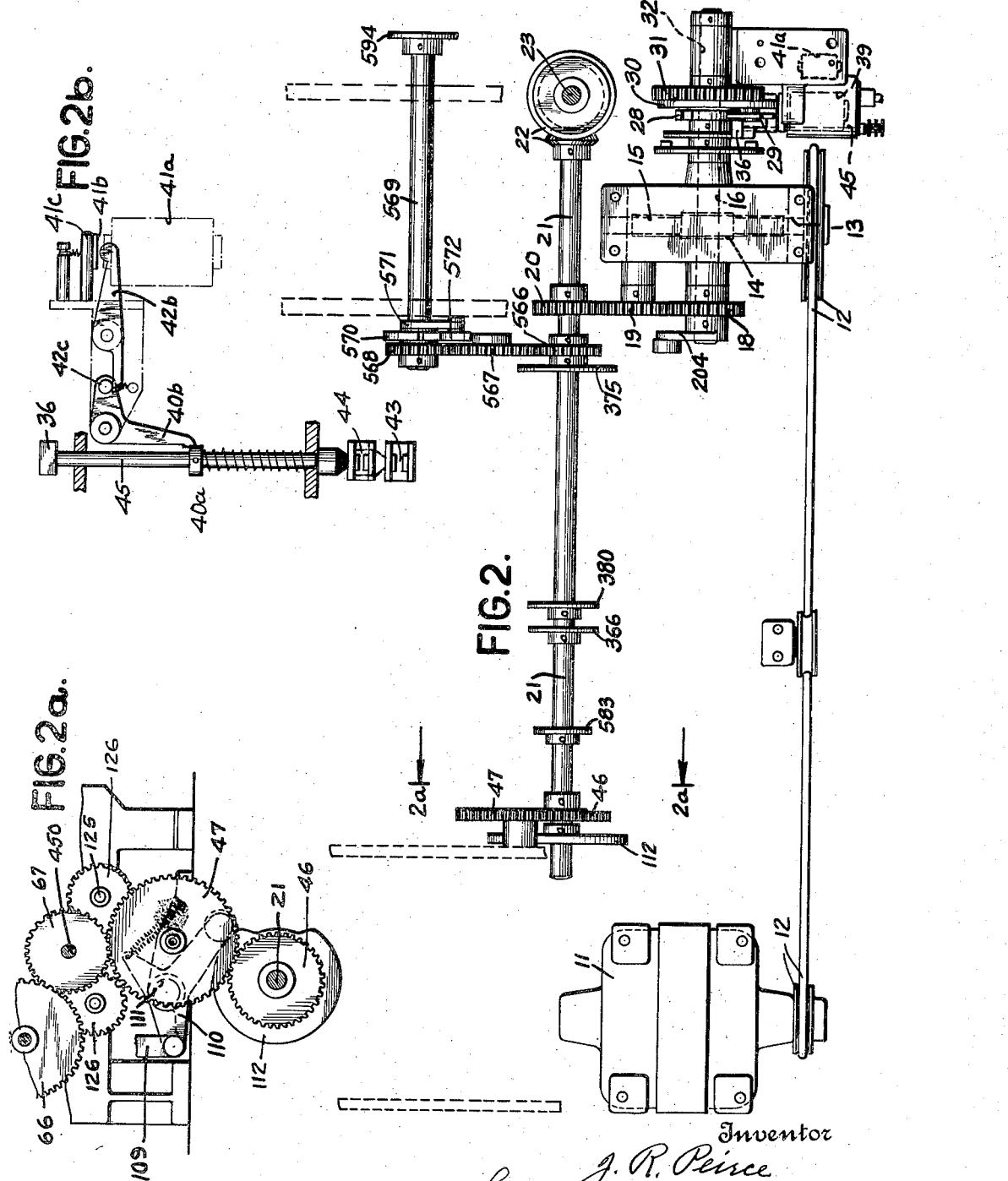
Fig. 2 is a view of the main driving mechanism, looking from above.

In Fig. 1 the machine is shown as being provided with a plurality of type bars substantially half of which are alphabetical type bars 150 grouped to the left of the printing section and the balance of the bars are numercial type bars 170. The alphabetical bars 150 are adapted to be positioned to print the various characters under control of the perforations in the upper field of the card and will register on the printed record only such information as appears on the card. The numerical type bars 170, however, are adapted to be positioned either under control of the perforations in the lower field of the record card or under control of accumulators to print amounts contained therein. These bars are arranged, as is customary in tabulating machines, to print zeros only under control of a significant figure to the left and to this end the commutators 122, 123 of Fig. 52 are arranged so that no electric circuit will be established to the type bar magnets when the brushes are set in accordance with the zero perforation on the card.

The type bars 170 are adapted in their normal restored position to have the upper type element representing zero normally in position to print on the record. In order that all zeros to the right of a significant figure may be printed, means are provided for tripping the hammers of such type. This means is well known in the art as shown in Patent No. 1,780,685, issued November 4, 1930 to J. R. Peirce and will be but briefly outlined. It comprises a lever 239 which is pivotally mounted on each hammer latch 223 and is adapted to engage a projection on the next latch on the right thereof so that any latch 223 which is actuated by bail 227 will in turn cause actuation of the latch to its right. In order to split the zero control, the lever 239 may be manually rocked clockwise about its pivot 239a out of engagement with the projection of the adjacent hammer latch. In order to lock any one or more of the printing hammers against operation, a series of levers 240 are provided which when rocked in a counterclockwise direction from the position of Fig. 5 will bear down upon spring blades 241 so that the blades engage projections on hammers 220 preventing any clockwise rotation of the same. Levers 240 have their engaging ends flattened to serve as a detent against accidental displacement. With the lever 240 in the position of Fig. 5 the spring blades 241 swing out of engagement with hammers 220.

Paper line-spacing

Referring to Figs. 4 and 5, the report sheet is carried by the platen 242 supported by the paper carriage frame 243 in the usual manner. Spacing of the platen is effected by the usual pawl and ratchet (not shown) operated from shaft 244 journalled in frame 243. Fixed to shaft 244 (see also Fig. 19) are arms 245 carrying a rod 246 cooperating with a bifurcated lever 247 mounted on stud 248. To this stud is secured an arm 249 connected through link 250 with an arm 251 on a shaft 252.

The constantly running worm wheel shaft 16 has affixed thereto a double cam 253 engaging the roller of lever 254 which is urged by a spring 255 into contact with the cam. An upward extending arm 256 of lever 254 carries a stud 257 which moves in an L slot 258 of a link 259. A projecting nose of link 259 rests upon the free end of the armature of magnet 260 which is adapted to be energized at a time when the follower roller of lever 254 is on the low portion of cam 253 and stud 256 is to the right in the slot 258. This will permit link 259 to be drawn down into operating relationship with stud 257 so that as lever 254 is rocked counterclockwise shaft 252 will be actuated to cause spacing of the platen 242. A spring 261 restores shaft 252 and connected linkage. Following such paper spacing a pin 262 carried by a disk 263 secured upon shaft 16 coacts with a bell crank 264 to positively raise link 259 out of active engagement with stud 257 and will latch it on the armature of magnet 260. A pivoted bell crank lever 265 is provided which acts to positively force link 259 downward when the armature is actuated and in reverse order when link 259 is restored to positively restore the armature. The double rise on cam 253 permits a second paper spacing actuation of the aforedescribed instrumentalities. Thus when totaling, after the sum has been printed, magnet 260 is energized to obtain a second spacing. Cam 253 is timed to normally effect paper spacing before an item is printed and in the case of total printing, also after the item is printed. The circuit through magnet 260 is completed during the total cycle to effect this second spacing operation.

Ribbon feed

Referring to Figs. 4, 21, 22 and 23, the printing ribbon 266 is carried by spools 267, and passes around guide spindles 268 and through guide members 269. The ribbon spools are detachably mounted on rods 270. These rods carry bevel gears 271 adapted to be engaged by similar gears 272 on a shaft 273. This shaft is actuated by pawl and ratchet (not shown) in the usual manner when the hammer restoring shaft 221 is operated.

The guide members 269 are adapted to be engaged by a clip or the like near the end of the ribbon so that feeding of the ribbon will move members 269 to cause lateral shifting of shaft 273 to reverse the feeding of the ribbon in a manner well known in the art. Interposed between the ribbon spools 267 and guide members 269 are several pins 274 about which the ribbon 266 is guided. The additional frictional resistance caused by these pins aids in keeping the ribbon taut and lessens any tendency to sag.

Accumulator

In the present Peirce system, the digits which have been set up in the commutators 122, 123 under control of the pins which cooperate with the lower field of the card are adapted to be emitted, as has already been explained in detail, in synchronism with the operation of the adding mechanism to produce the proper differential action in these devices. Whenever an electrical impulse is sent through the commutators to any printer magnet associated with a numerical type bar 170, an impulse may also be sent to the corresponding counter magnet 300 (see Figs. 5 and 28). Energization of magnet 300 attracts armature 301 moving it to the right in these figures, thereby unlatching arm 302 of an assembly mounted for oscillation on stud 303, which assembly is normally urged counterclockwise by a spring 304. Therefore when armature 301 releases arm 302, the assembly is rotated slightly counterclockwise. This assembly includes a pair of upwardly extending parallel arms 305 and 306 in the upper ends of which is fixed a horizontal rod 307. On rod 307 is mounted for rotation a sleeve 308 on which are fast the pinions 309, 310.

In Fig. 28 two complete adding units are shown mounted on a common plate 311. The lower unit is similar in structure to the upper unit and has been illustrated with several parts removed to more readily explain the operation of the device.

Pinion 310 is constantly in mesh with gear 312 loose on stud 313. Pinion 310 and gear 312 are provided with long teeth to permit movement of pinion 310 away from the gear without disengagement therefrom. Pinion 309 is aligned to mesh with gear 314 whenever the assembly on which the pinion is carried is oscillated to the left. Gear 314 is fast on sleeve 315 on stud 313 (see also Figs. 29 and 30). Alongside of gear 314 and rotating with it is gear 316 in mesh with gear 27 which is in constant rotation being mounted as we have seen on constantly running shaft 26.

With the above construction in mind the differential action of the accumulator may be understood. When magnet 300 is energized, armature 301 releases arm 302 permitting it to rock until arm 305 rests against stop 317. This movement engages pinion 309 with gear 314 and causes the pinion to rotate in synchronism with gear 316 thereby causing pinion 310 and gear 312 to also rotate in synchronism therewith. This rotation continues until a hump 318 on cam 319 passes under finger 320 projecting from the upper end of arm 305 thereby, by rocking the pinion assembly clockwise, disengaging pinion 309 from gear 314 and permitting armature 301 to latch against arm 302. At the same time a detent 321 enters between teeth of gear 312 to retain it against inadvertent movement from the position to which it has been moved. Pinion 310 is also provided with a detent 322 to engage the same when its companion pinion 309 is out of engagement with gear 314. To positively restore armature 301 a member 323 is provided having a lateral projection 324 abutting the right side of armature 301, so that when arm 302 is restored the member 323 will be rocked counterclockwise to draw the armature away from magnet 300 if its spring has not already done so.

Both pinion 309 and gear 314 are formed with teeth resembling ratchets. The sides of the teeth which enter into driving engagement with each other are cut with a minimum pressure angle so that as the pinion 309 is rocked into engagement with gear 314 the tendency to throw the pinion out of engagement again is not present, as would be the case if gears having involute teeth were employed.

The teeth of pinion 310 and gear 313 are similarly undercut for the same reason to obtain the same certainty of continued engagement.

The accumulator begins to rotate at different times in the cycle depending upon when the impulse is received from the translating commutators and the rotation of the accumulator is interrupted at a fixed point in the cycle by cam 319, thereby rotating the accumulator an amount proportional to the value of the digit represented by the card perforations.

Electric transfer

In the operating cycle of the machine, after rotation of the accumulator has been stopped by cam 319, an opportunity is provided for transfer operations to take place if any are required. The transfer operations are effected electrically in much the same manner as in Patent No. 1,372,965, issued March 29, 1921, C. D. Lake for Electric transfer device.

After the adding portion of the machine cycle has been completed there may still remain a transfer or carry operation to be performed. That is to say, if any accumulator wheel has been turned to (or through) zero during the adding portion of the cycle, it is necessary to advance one or more adjoining wheels at the left one step in order to show a correct result. If the next adjoining wheel or wheels shows a digit "9" it is necessary to advance such "9" wheel one step as well as advancing the first wheel to the left of the "9" wheel.

Fast to each gear 312 is a disk 325. The gear and disk are so driven as to make only one quarter revolution for each ten digits. Associated with each disk 325 is a spring pressed pivoted lever 326 having a finger 327 biased to bear constantly on the rim of disk 325. While disk 325 is indicating the digits 1 to 8 inclusive, finger 327 rests on a concentric portion of the rim, and when the disk indicates "9" the finger drops into a notch 328. When disk 325 turns still further to indicate "10" to "0" a point 329 forces lever 326 in a clockwise direction in which position it is held by latch 330 engaging catch plate 331 on lever 326. Latch 330 is pivoted at 332 and drawn towards latching position by a spring.

Mounted on an insulating block at the left end of lever 326 is a brush 334, carrying a wire which serves to connect it to the electric circuit of the machine. Fast to the other end of lever 326 is a brush 335 insulated and also having a circuit-connecting wire.

Mounted on sleeve 315 (Fig. 29) for rotation on said stud 313 is an insulating bushing 336 carrying a metallic ring 337. This ring is grooved to receive a plate brush 338 the lower end of which is arc shaped as shown in Fig. 28, to insure good electric contact with ring 337. Brush 338 is insulated from the machine and provided with a wire to connect it to the machine circuit.

Projecting from the rim of ring 337 are four equally spaced contact humps. The two diametrically opposed humps at one side of brush 338 are arranged to contact with brush 335 while the two humps on the other side of plate brush 338 are located to contact with brush 334.

The operation of these devices may best be understood by tracing the electric circuits involved. Referring to Fig. 50a, after cam 319 has restored the counter actuating device, as above described, the continued operation of the machine causes closure of cam contact CF5 to transmit an impulse from one side of the line 341 through wire 342, contact CF5, wire 343 to common bus bar 344, wires 345 to the brushes 334 of such accumulator units as are then at 10, that is, whose index wheels have passed from 9 to 0 or beyond. This circuit then continues from the brush 335 to the ring 337, whose projecting humps are in contact with the brushes at this time, thence to the member 338, from where it will follow along a line 346 to the counter magnet 300 of the next higher order.

If such higher order is positioned at 9 the circuit will continue from the member 338 to the brush 335 of such next higher order through the ring 337, to its member 338 and then through a wire 346 to the adding magnet 300 of such successive higher order. Such energization of the magnets 300 under control of the contact CF5 will advance the associated accumulating elements one step to add 1 therein.

Total printing

When a total is to be taken of a group of items which have been accumulated, it is necesary to open certain listing circuits and close certain total printing circuits. The mechanism for effecting these circuit changes is shown in Figs. 25, 36, 41 and 42 in which a magnet 354 is adapted to be energized whenever a total is to be taken. Suspended from base 10 is a pair of brackets 355 supporting a series of contacts arranged in tiers for compactness, each of which comprises an upper blade 356, a center blade 357 and a lower blade 358. Cooperating with these fixed blades are blades 359, 360 mounted for vertical movement on end bars 361 supported by arms 362 secured to shafts 363 journalled in brackets 355. Springs 365 attached to upper arms 362 tend to urge bars 361 downwardly from their normal, or listing position, wherein the blades 356 and 359 are in contact with each other.

Near one end of shaft 363 an arm 366 carries a link 367 which forms a toggle connection with a link 368 pivoted at 369. This toggle connection is held with its common connecting point slightly to the left of dead center, as shown in Fig. 41, by the action of springs 365. An adjustable stop 370 limits the movement of the parts to the left. Energization of magnet 354 attracts its armature 371 rocking it about its pivot 372 to unlatch a hammer 373, which under action of spring 374 strikes the toggle at its connecting point and moves it sufficiently to the right of dead center to allow spring 365 to further move the parts to total position. A lever 379 secured to shaft 363 and having a roller 381a is moved to engage its cam 380 on continually running shaft 21 immediately upon breakage of toggle 367, 368 permitting a link 381 pivoted on an arm fast to shaft 363 to rock a bell crank 386 and through a pin in one arm thereof to rock a latch 382 against spring 385 and out of engagement with the toe of an arm 383 fast to a rock shaft 384, (see also Fig. 4). Link 381 also, through bell crank 386 effects closure of a contact 271 to cause additional paper spacing as has already been described by establishing a circuit through magnet 260. The aforementioned hammer tripping takes place at a time when cam 375 secured to continually running shaft 21 is about to present its descending portion 376 to a roller 377 mounted on an arm 378 loosely pivoted on shaft 363. As roller 377 follows the periphery 376 of cam 375 it permits shaft 384 to rock counter clockwise (Fig. 42) through link 387 attached to arm 378 since latch 382 is now out of cooperation therewith. Continued rotation of shaft 21 causes cam 366 to cooperate with a bell crank lever 389 loose upon shaft 363 and held against cam 388 by spring 390. At such time cam 380 will have restored shaft 363 to almost normal position from which position roller 391 carried by lever 389 moves toggle 367, 368 across dead center and against stop 370. A roller 392 strikes finger 393 integral with hammer 373 to restore the same.

In Fig. 5 shaft 384 has connection to a similar shaft 384a through link 394 and arms 395 so that both shafts operate together. These shafts extend across the accumulating section of the machine and each has a groove 396 or 396a cooperating with the ends 397 of levers 398 (see Figs. 5 and 28) pivoted on the adding unit plates 311.

At the right end of lever 398 is a link 399 having pin and slot connection 400 with the lever. With the parts in the position shown in Fig. 28, link 399 is held in its raised position. But during totaling with shaft 384a rocked the link 399 is lowered as seen in Fig. 31.

Resting in slots 401 in link 399 are pins 402 secured in the free ends of horizontal arms 403 which are pivoted at 404. Also on the free ends of arms 403 are fulcrum blocks 405 in contact with the under side of spring 304. When the parts of the accumulator are in normal position for adding as in Fig. 28, arm 403 is held in raised position by lever 398 and vertical link 399. Underneath a projection on arm 403 but normally out of contact therewith is a latch 406 on the lower end of arm 407 pivoted at 408. Arm 407 is upwardly extending, having its free end in the path of cams 410 fast to gear 312 (see Fig. 29).

While arm 403 is in the above normal position the free end of spring 304 is pressed upwardly by fulcrum 405 and serves, as already explained, to swing the assembly 305, 306, in counterclockwise direction to carry out the adding operation. With the parts in totaling position the arm 403 is held in raised position by the engagement of its lateral projection with latch 406, so that when arm 407 is raised by cam 410, latch 406 is withdrawn from underneath lever 403 which thereupon drops sufficiently to release pressure of fulcrum 405 on spring 304 which then follows the fulcrum downwardly and rotates the assembly 305, 306 clockwise instead of counterclockwise.

In other words, spring 304 tends to rotate the assembly in one direction when fulcrum 405 is elevated and in the other direction when the fulcrum is lowered. This by reason of the fact that with fulcrum 405 released, spring 304 bears upon arm 411 of lever 305 with greater turning effort than is exerted in the opposite direction by the end of spring 304 at point 412 where the spring fits in a slot in lever 305. This action, as will be shown, takes place to clear the counter wheel after total printing.

Commutator 413 is of insulating material with four metallic inserts 414 in its rim. The commutator is fast to transfer cam 325 and gear 312 as may be seen in Fig. 30. The commutator therefore has four zero positions. Bearing on the rim of the commutators are two brushes 415 and 416 so located so that when the commutator is in zero position both brushes 415 and 416 are on an insert 414.

If it is desired to take a total, magnet 354 is energized to rock shafts 384 and 384a and also shift the contacts described in connection with Fig. 42. Referring now to Fig. 50a contacts T2 are also closed at this time, one of their blades being fixedly mounted, and the other movable having such relationship as blades 358 and 360 already described.

Make and break cam contacts CR7, CR8 and CR9 are arranged to operate to transmit an impulse through the total taking circuit at an instant corresponding substantially one point in advance of 9 position on the commutators. These cams are mounted on a continually operating shaft 417 (Figs. 3 and 15) driven by gears 418 from continually running shaft 23.

The contact blades 358 (Fig. 50a) are connected to plug jacks 419 of which several are shown in detail in Fig. 50b, wherein the springs 420 associated with each jack normally contact with the plug socket of the adjacent jack. Insertion of a plug in any socket will break the contact connection between such socket and the cooperating spring 420 of the next jack.

With contact blades 356, 357, 358, 359, 360 shifted from the position of Fig. 50a so that contacts 358, 360, and 356, 359 close and 357, 359 open, contacts CR7 and CR9 function to send an impulse through the accumulators in advance of "9" position, current flowing from right of line 341 through contact T2 now closed, contacts CR7, CR9, contact MI4 to a triple plug 421, a plug wire 422 to a plug 420 which causes the current to mushroom to all connected plugs 420 to the left, thence through contacts 358, 360 now closed, magnets 300, bus wire 423 and back to line 349 through wire 348.

This energization of magnets 300 engages all the counter wheels for rotation which were not already standing at zero position. For it is to be observed that with commutator 413 at "0" the parts are positioned as shown in Fig. 31 with arm 403 dropped so that fulcrum 405 rests upon arm 411. Obviously when magnet 300 is now energized arm 302 will not turn counterclockwise to engage the register wheel for rotation.

During the rotation of the counter wheels the type bars 170 are rising in synchronism with the movement of the register wheels, which in this case may be considered to be the commutators 413. The motion of each type bar is arrested by an impulse through its printer magnet 192, through a circuit from right side of line 341 (Fig. 50a) to contact T1 now closed, cam contacts CR4, CR5, CR6, bus line 424, brush 416, commutator insert 414, (Fig. 31) brush 415, to cable 425. Thence through contact blade 356, now in contact with blade 359, to printer magnet 192, bus bar 426, wire 427 to opposite side of line 349.

Thus, such counter wheels which represent a significant figure will rotate with one of their inserts 414 approaching brushes 415, 416 to send an impulse exactly as a circuit through the translator commutators closes a circuit to a printer magnet. Simultaneous with the arrival of insert 414 at zero position, cam 410 rocks arm 409 clockwise to throw the counter driving elements out of operative engagement, leaving the counter wheel in a reset or zero position, in a manner already described in connection with Fig. 31.

It is desirable that the type bars associated with such counter elements as are standing at zero, do not reciprocate through their full stroke. This is accomplished as shown in Fig. 26 by providing a printing element at the upper extremity of type bar 170 in advance of "9". Such counters as stand at zero will be in the position of Fig. 31 when a total is taken so that when the aforedescribed starting impulse is sent through all magnets 300 such counters will not be affected.

Inserts 414 will immediately permit current to flow through brushes 415, 416 to interrupt the type bar 170 at this upper zero position from which the zero may be printed under control of a significant figure to the left.

In Fig. 50a, triple plugs 421a and 421b are shown which are similar to the plug connection 421 and which may be similarly connected to jacks 419 by plug wire connections 422. The plug 421a is connected to the contact CR8 through a pair of contacts MA4, MA5 and the plug 421b is connected to the contact CR8 through a switch S7, the contact F6 and contacts MA4 and MA5. It may here be stated that the machine is adapted to perform three types of total operations, minor, major, and final total operations. The manner of their accomplishment will be more particularly explained hereinafter. Tabulating cards may be arranged according to group classifications in which a general group may be called a "major" group and a subdivision of this group may be called a "minor" group and the machine is adapted upon sensing a change in either classification to effect a corresponding series of operations. A final total operation is a manually initiated series of totaling operations which will clear the machine, resetting all counters to zero. If a minor total is to be taken the contact MI4 is closed to complete a circuit from line 341 to the plug 421 in a manner already traced. If a major total is to be taken, the circuit is completed from line 341 to the plug 421a through the contacts MA4 and MA5, and if a final total is to be taken, the circuit is completed from line 341 to the plug 421b through the contacts MA4, MA5, F6 and the switch S7. These circuits to the plugs are completed to commence the rotation of the accumulator elements from which total printing is to be effected and the plug connections 422 may be so arranged that during a minor total taking operation only those accumulator elements will be actuated which have been accumulating a minor total.

This is done by inserting the end of plug wire 422 in the jack 419 corresponding to the furthest position to the right of a selected member of accumulator elements. This, as has been pointed out, will energize the magnets 300 of all the elements to the left. By inserting a dummy plug, that is, a plug having no wire 422 attached thereto, in the position adjacent to the last position of a plurality of columns set aside for minor totals, this circuit will effect only the magnets included therein, the dummy plugging having the effect of holding the spring 420 of the last position out of contact with the plug socket 419 adjoining it on the left. In this manner each of the plug sockets 421, 421a and 421b may be connected to direct a total initiating circuit to selected groups of accumulators.

*Automatic control contacts*

In a tabulating machine of this type, it is customary to arrange the cards being fed through the machine in groups and sub-groups and to accumulate the information contained thereon as totals of such groups and sub-groups. Automatic means are provided to detect when all of the cards of a particular group have been sensed by the card analyzing instrumentalities and to automatically initiate totaling operations during which a total of such group may be printed upon the record sheet. To this end the cards are usually perforated with a code number or other common symbol which appears on each card of a particular classification and the machine is adapted to sense this code number from the first card of each group and set it up in a suitable storage device with which each succeeding card is compared. As long as the cards compare with the set up the machine will continue to accumulate. Upon sensing a change in the group number the machine will be controlled to either stop or perform total taking operations. In the present invention these group indicating or group controlling perforations may be punched in the upper field of the card of Fig. 53 in a position to represent some numerical code number.

Figure 33:
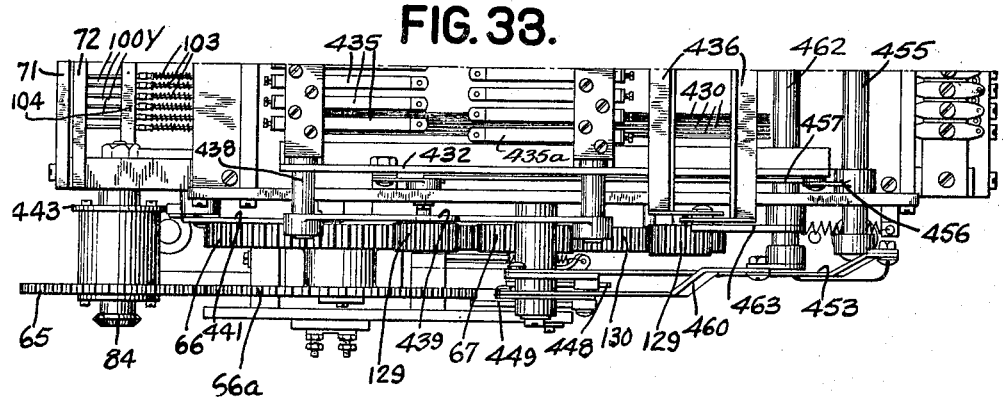
Fig. 33 is a partial plan view of the card analyzing mechanism.

Referring now to Figs. 7, 34 and 51, each of the arms 120 of the upper field of pins 100 has its upper extremity rounded to cooperate with a slidable comb 430. Thus for each card column there are four such combs, one for each of the arms 120 of a column. The combs 430 are adapted to be slidable horizontally on cross bars 431 which are mounted in a frame 432 which may be reciprocated in a vertical direction and is spring biased downwardly. Each comb is provided with a pair of projections 433 and an aligning projection 434. The contact 435 is provided (see also Fig. 33) which cooperates with each set of four combs 430. That is, for each column of pins 100, there is a corresponding contact 435. A scissors device comprising bars 436 is provided which when the bars are moved towards each other cooperate with the projections 434 to move them into alinement. During the last previous totaling operation the frame 432 is moved vertically upward raising the combs 430 out of cooperation with the arms 120 and at the same time the bars 436 are actuated to move the combs 430 into alinement. In such alined position the notches as 433a formed by projections 433 of each comb 430 are in cooperation with an angle 435b attached to the lower blade of the contact 435, the relationship being as shown in Fig. 7. While the combs 430 are in their upper position the pins 100 are permitted to sense the perforations in the card and shift the arms 120 in accordance with the arrangement of the perforations and the arms 120 are locked in such position by the latches 131. The frame 432 is thereafter lowered to again bring the combs 430 into cooperation with the arms 120 in which lowered position they remain during succeeding card reading cycles and until a total cycle is again performed. It will be noted in Fig. 51 that the lower edge of each column is provided with two notches either of which may cooperate with the extremity of arm 120 depending upon whether the arm is in one or the other of its positions. Toward the end of the cycle of operations the arms 120 are released by the latches 131 and those arms which are moved by their pins 100 will be permitted to restore under the influence of their springs and by reason of their connection with the combs 430 will move their corresponding combs to the left.

During the next card cycle after a new card has been advanced to sensing position the pins 100 will advance to read the perforations and in doing so will rock the arms 120, and such pins as are permitted to advance will cause movement to the right of their corresponding combs 430. If the same pins advance which went forward during the preceding cycle, the combs 430 which were moved to the left during the restoration of the arms 120 will be moved and the combs will again be in alinement.

Following such setting of the combs, the contacts 435 which are mounted on bars 437 and pivoted at 438 (see Fig. 6) are tilted so that the angle plates thereon move down into the notches between projections 433 and contacts 435 remain open. If, however, the perforations on this succeeding card are not identical with those of the card which effected the comb set-up, a different combination of arms 120 will be rocked by the pins 100 and either a comb 430 which was previously moved to the left will fail to return, or another comb will be moved farther to the right. In either case, a projection 433 will either fail to move out of cooperation with an angle plate of a contact 435 or a projection is moved into cooperation with such angle plate. The subsequent tilting of the contacts 435 will find a group of combs 430 out of alinement as in Fig. 51 so that the angle plate is intercepted by a projection 433 and continued rocking of the bar 437 will cause closure of a contact 435. Closure of the contact 435, as will be more particularly pointed out in connection with the description of the electric circuit of the machine control the further operation of the machine to either stop or enter upon a total cycle. In Fig. 6 the pivots 438 carry contacting bell cranks 439 connected by a spring 440. One of said bell cranks is connected by a link 441 to a cam follower arm 442 having a roller cooperating with a cam 443 integral with continually running gear 65 so that during each cycle of the machine the pivots 438 are rocked in opposite directions to permit the contacts 435 to analyze the position of combs 430.

A magnet 444 is adapted to be energized during a total cycle to attract its armature 445 to release a clutch dog 446 pivoted on an arm 447 to which is secured a pair of cams 448, 449 (see also Fig. 34). These cams and arm are freely mounted upon a stud 450 which also serves as a bearing for the continually running gear 67 which carries a clutch element 451. Release of the clutch dog 446 by armature 445 permits its cooperation with the clutch element 451 to drive the cams 448, 449. Cooperating with the cam 448 is a follower lever 452 connected by a link 453 to an arm 454 secured upon a shaft 455. In Fig. 51 shaft 455 carries a bell crank 456 connected by a link 457 to a similar bell crank 456a. The bell cranks are connected by short links 458 to the comb frame 432 to raise and lower the frame during a revolution of the cam 448. Frame 432 has pins 432a (Fig. 6) extending into slots in the fixed frame to guide the frame vertically. Cam 449 cooperates with a follower lever 459 (Fig. 34) which is connected by a link 460 to an arm 461 secured upon a shaft 462 to rock the shaft in a counterclockwise direction as viewed in Fig. 6. Secured upon shaft 462 on either side of the translating mechanism (see also Fig. 8) are spring pressed bell cranks 463 which have rollers in their free ends cooperating with slots 464 in scissors arms 465 which arms support the bars 436 and are pivoted at their lower extremities on studs 466. Clockwise rotation of bell crank 463 (as viewed in Fig. 8) will move its roller downwardly in slots 464 to rock the arms 465 together on their pivot 466 to aline the projections 434 on the combs 430.

In Fig. 50 the control contacts 435 are diagrammatically represented as having one of their blades connected to a common connector 467 and their other blades to plugs 468. These plugs may be connected by suitable plug wires to groups of plugs 469 or 470. At the proper time in the cycle when the setting of the combs 430 is tested to determine whether there has been a change in the group number, if one of the contacts 435 within said group closes due to such change it will complete a circuit as follows: from the line 341 of Fig. 50a, through contact CL2, to wire 471 (see also Fig. 50) wire 472, wire 473, switch S5, contacts CF7, to the common connector 467, thence through the contacts 435 which have closed, to one of the plug connections 469 or 470, depending upon which of these the particular contact 435 has been connected to, thence through either of the magnets 474 or 475, to contact CR1 and back to line 349.

In this circuit the contact CL2 is a card lever contact whose function will be explained in further detail later.

The contact CF7 is a card feed contact operating only during card feeding operations and closed at the time in question. The contact CR1 is a continually running contact being mounted on a shaft which rotates continuously. If a group of contacts 435 are connected by the plug wires to the common plug 469, a change in the group number being controlled by these contacts will cause the machine to enter totaling operations to record a minor total. If the controlling circuit is closed through the common plug 470, it will cause initiation of a major total which involves two cycles of the machine during which the minor total is first automatically recorded and this followed by the recording of a major total. The contact CR1 is timed to close for an instance after the contacts 435 have been tilted to sense the position of the combs 430. At this time the contacts CF7 and the card lever contacts CL2 are closed so that if there is a disagreement in the group number, a circuit will be closed through either of the contacts 474 or 475.

*Major and minor control*

Referring now to Figs. 16 and 17, the magnet 474 is shown as having the free end of its spring pressed pivoted armature 476 in cooperation with a tooth of a member 477 spring pressed in a clockwise direction and mounted upon a cross rod 478. The member 477 carries a bail 479 normally positioned, as shown, above a plurality of contacts which will hereinafter be designated with the prefix MI. The member 477 is provided with a notched plate 480 riveted thereto with which a spring pressed pawl 481 mounted upon an arm 482 cooperates. This arm is secured to a shaft 483 which in Fig. 3 carries an arm 484 on its outer end which in turn is connected by a link to a bell crank cam follower 485, the free arm of which rides upon the periphery of a cam 486 (see also Fig. 15) wherein the shaft 487 on which the cam 486 is mounted has secured to its other end a gear 488 driven from the continually running shaft 23 as shown. Upon this shaft are also mounted continually running cams, such cams being designated by the prefix CR.

At the time when the contact CR1 closes to test the automatic control circuit, the cam 486 has rocked its follower 485 clockwise and through the connecting links and arms likewise rocked the shaft 483 so that the pawl 481 moving upwardly cooperates with the notched plate 480 to tilt the member 477 slightly counterclockwise against the tension of its spring. This relieves the pressure against the armature 476 so that if a non-comparison is found in the group of contacts plugged to control the magnet 474 and the magnet is thereby energized, the armature 476 may freely rock to release the member 477 allowing it, upon return of pawl 481 to its lower position to turn in a clockwise direction. This causes shifting of the various MI contacts under control of the bail 479. The functions of these various contacts which are controlled in this manner will be more fully explained in connection with the electric circuit.

Figure 12:
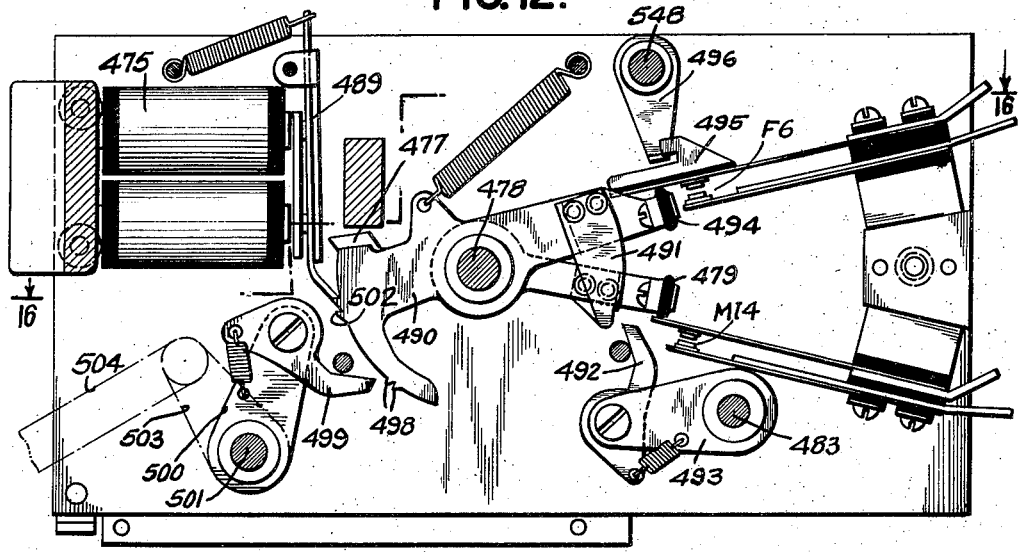
Fig. 12 is a sectional view of certain circuit controlling switches operative during total taking. This view is taken on the line 12—12 of Fig. 15.
Figure 11:
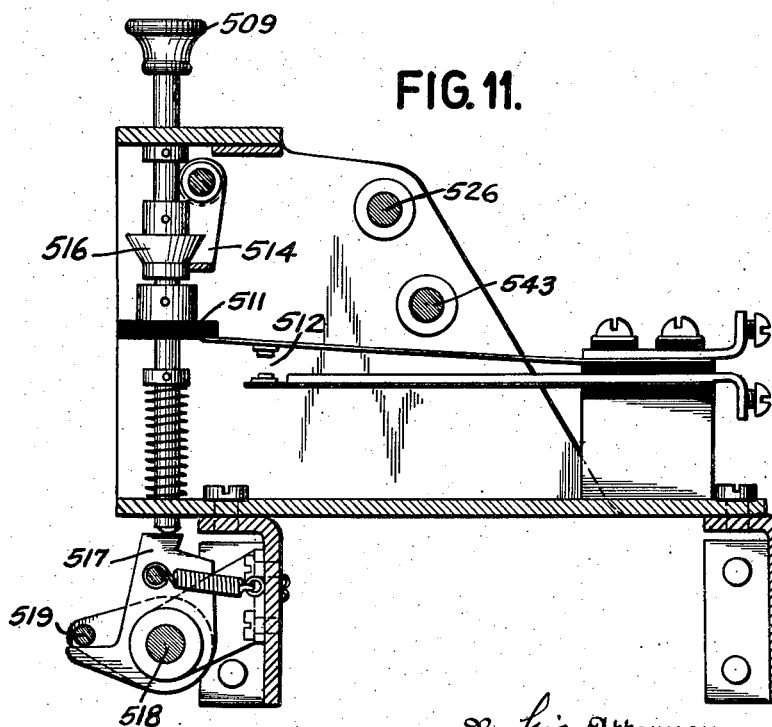
Fig. 11 is a section taken on line 11—11 of Fig. 9, showing the start key.

In Fig. 12 the magnet 475 is shown as having an armature 489 cooperating with a member 490 also pivoted upon the rod 478 and also having a notched plate 491 with which a pawl 492 mounted on an arm 493 cooperates. In a manner similar to that described in connection with energization of the magnet 474, at the time when a circuit may be completed through the magnet 475, the turning of shaft 483 will cause the pawl 492 to engage plate 491 so as to rock the member 490 slightly counterclockwise thereby relieving the pressure against the lower end of the armature 489. Energization of the magnet will actuate its armature so that the member 490 may swing in a clockwise direction and its bail 494 permit the shifting of contacts generally prefixed MA and F. The two contacts F6 and F7, as seen also in Fig. 16, are provided with hook shaped plates 495 which are in engagement with lateral extensions of fingers 496 so that shifting of the bail 495 will not affect these contacts.

In Figs. 15 and 16 the armatures 476 and 489 cooperate with an intermediate member 497 suspended from and pivoted on rod 497a (Fig. 15) independently of armatures 476 and 489 in the manner shown so that attraction of the armature 489 by its magnet will cause similar movement of the armature 476 through the intervention of member 497. Thus when a circuit is established through the major magnet 475, it will also cause operation of the armature 476 as though the minor magnet 474 were also energized. It will be observed that energization of the magnet 474 will not affect the armature 489, however.

In Figs. 17 and 18 are shown the normal position of sets of contacts MA2, MA3 and MA4, MA5, wherein the bail 494 is in its uppermost position holding the contacts in the relationship shown. Tripping of the armature 489 will cause the bail 494 to be lowered as has been described, and it will occupy a position in relation to these contacts as shown in Figs. 17b and 18b. The circuits are established at this time to cause the machine to record a minor total during which the printing mechanism is caused to operate. During such operation in a manner presently to be described, the bail 494 is raised to an intermediate position wherein the contacts assume a position as in Figs. 17a and 18a.

The member 490 in Fig. 12 is provided with teeth 498 adapted to be engaged by a spring pressed pawl 499 mounted upon an arm 500 which in turn is secured to a shaft 501. This shaft in Fig. 17 carries a second arm 500a having a spring pressed pawl 499a cooperating with the tooth 498a of the member 477. During the minor total cycle of operations the shaft 501 is rocked clockwise and the pawls 499, 499a engage the teeth 498, 498a to rock the corresponding members 490, 477 in a counterclockwise direction. This causes the member 477 to be latched by its armature 476 and the member 490 will be latched in its intermediate position due to engaging of its armature 489 with tooth 502 of the member. During the remaining total taking operations which involve a second cycle of printing operations, the shaft 501 is again rocked and the member 490 is rocked forward in a counterclockwise direction to return it to the position of Fig. 12 wherein the bail 494 is again in its uppermost position.

Figure 3:
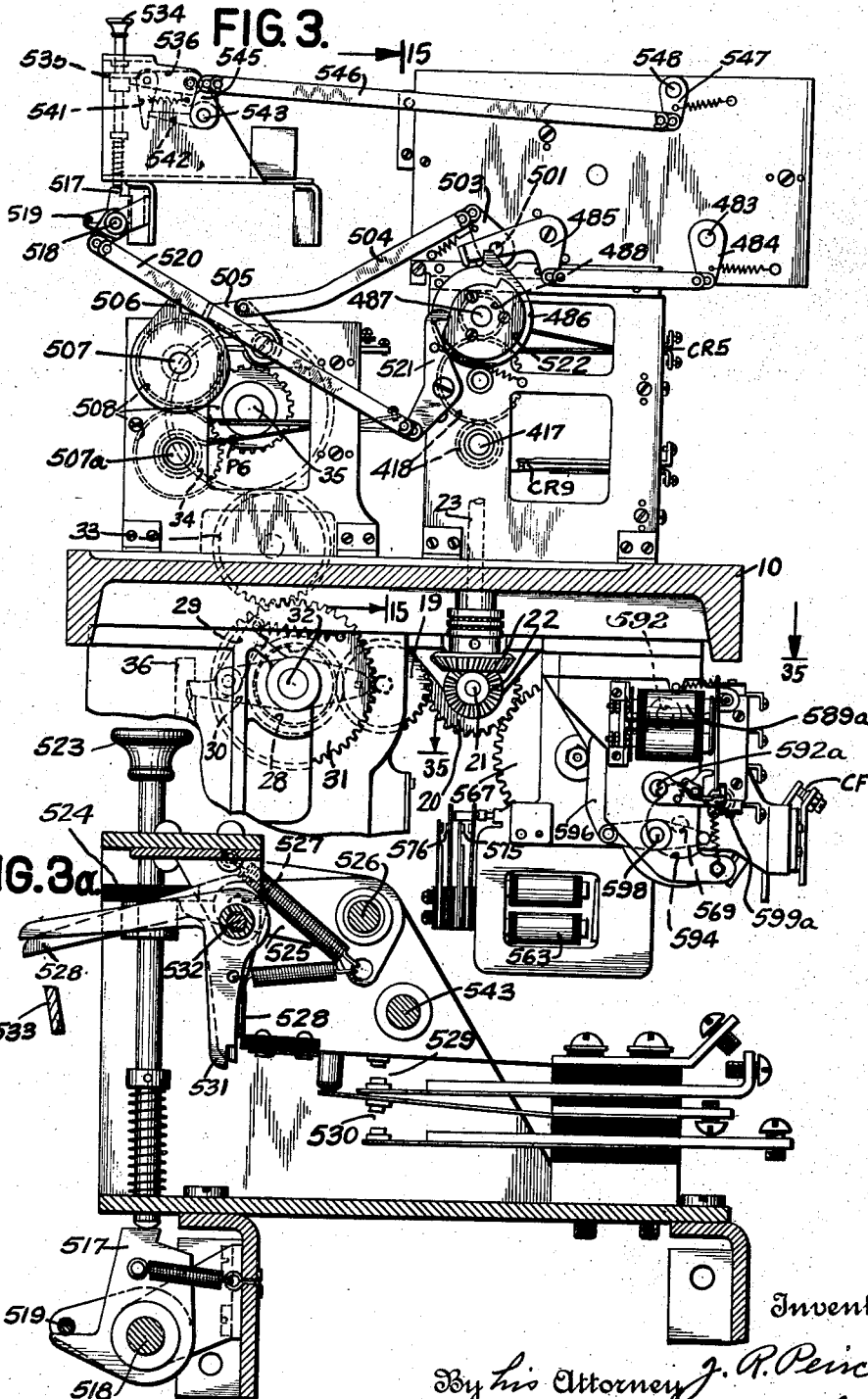
Fig. 3 is a view of the right side of the machine, looking in the direction of lines 3—3 of Fig. 1.

In Fig. 3 shaft 501 carries an arm 503 connected by a link 504 to a cam follower 505 cooperating with a cam 506 which is mounted upon a shaft 507. The shaft 507 is driven through gearing generally designated 508 from the print shaft 35. A companion shaft 507a is also driven in a similar manner (see also Fig. 1). These two shafts carry cams which are generally designated with the prefix P and which control their contacts in a manner to be explained in connection with the electric circuit of the machine. As seen in Fig. 3 the rotation of cam 506 is adapted through the follower 505, line 504 and arm 503 to rock the shaft 501 to actuate the members 477, 490 in the manner explained.

*Start and stop keys*

In Figs. 1, 9, 10 and 11 the start and stop keys are shown respectively at 509, 510. Each key is provided with a flanged collar 511 to control its contact, the start key closing contact 512 and the stop key opening contact 513. A spring pressed bail 514 is provided which cooperates with a conical collar 515 pinned to the key shank of the stop key 510 so that upon depression of the key the bail 514 will drop over the cone 515 to hold the stop key depressed and consequently hold the contact 513 open. The start key shank is provided with a conical collar 516 which also abuts the bail 514 and upon depression of the key 509 the cone 516 is adapted to rock the bail 514 outwardly but the cone does not descend sufficiently to latch itself beneath the bail. The start key in this manner unlatches the stop key if it has been previously locked by the bail. A spring pressed bell crank 517 is located beneath each key and when in the position shown in Figs. 10 and 11 will prevent depression of either key. The shaft 518 has secured thereto a bail 519 which at a particular time in the cycle of operations is rocked in a counterclockwise direction to rock the members 517 out of locking engagement with the keys. This locking device is provided to control the time of operation of the keys.

In Fig. 3 the shaft 518 is connected by a link 520 to a spring pressed follower arm 521 cooperating with cam 522 mounted upon continually running shaft 487. During the portion of the revolution of cam 522 when the follower 521 cooperates with the periphery of greater radius of the cam, the shaft 518 will be held in its clockwise position and the keys are free to be depressed.

Hand total key

Figure 9:
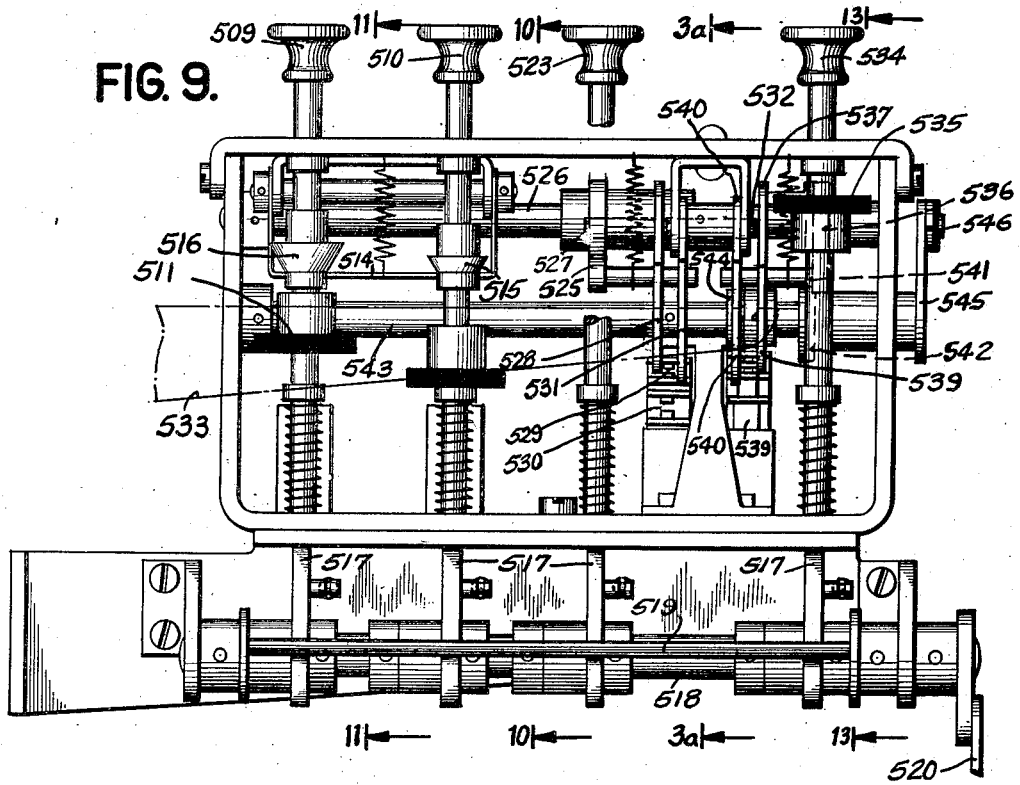
Fig. 9 is an enlarged view of the control keys shown in Fig. 1.
Figure 10:
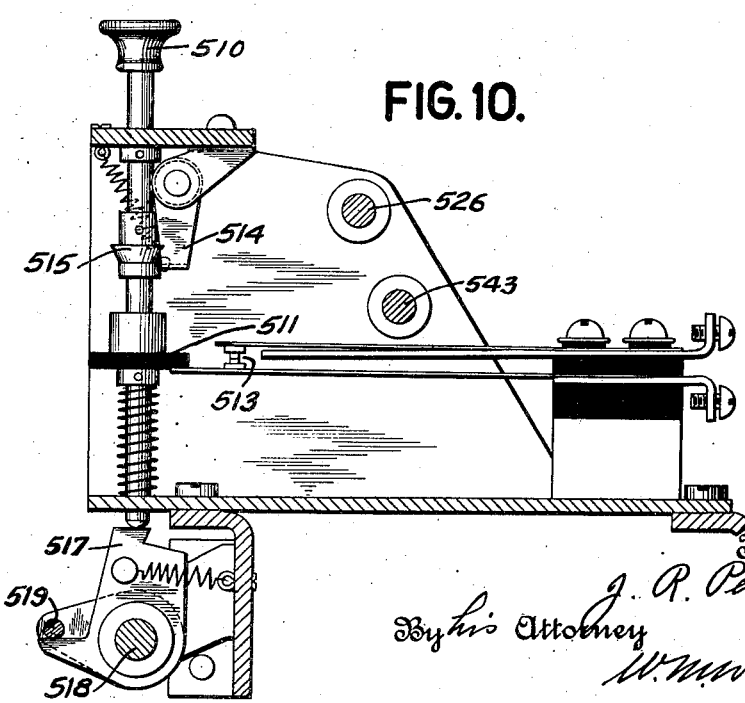
Fig. 10 is a section taken on line 10—10 of Fig. 9, showing the stop key.

In Figs. 1, 3a and 9, a hand total key 523 is provided which when depressed will initiate total taking operations to print either minor or major totals according to the setting of the machine. This key is also controlled in the timing of its operation by a bell crank stop 517 through the shaft 518. A flanged collar 524 secured to the key, upon being depressed will rock a spring pressed bell crank 525 pivoted upon a rod 526. This bell crank 525 carries pivoted thereto at 527 a spring pressed bell crank latch 528 which is in engagement with the uppermost blade of a contact 529. Depression of the key 523 will rock the bell crank 525 and therethrough the latch 528 will be moved downwardly to close the contacts 529 and 530. A bell crank shaped holding latch 531 is provided which is pivoted upon a fixed pin 532. The holding latch is adapted to snap over the contact blade after it has been depressed by the latch 528 and will hold the contacts in their displaced relationship until the latch 531 is rocked in a clockwise direction. With this construction it is only necessary to depress the key 523 momentarily, the latch 531 holding the contacts in their shifted position. The closing of the contacts 529, 530 initiates total taking operations during which the printing mechanism is actuated (see Figs. 1 and 4). The link 237 which is actuated during the operation of the printing mechanism carries a laterally extending arm 533 attached thereto which is moved upwardly with the link 237. As seen in Fig. 1 and as shown in dotted relationship in Fig. 9 and also Fig. 3a, the arm 533 lies under the horizontally extending fingers of bell crank latches 528 and 531 so that during the operation of the printing mechanism the arm will engage the latches rocking them in a clockwise direction to release the contacts.

The arm 533 holds the latch 528 out of cooperation with the contacts so that depression of the key 523 during the printing operation will be ineffective to close the contacts again.

Final total key

In Figs. 1, 9 and 13, a key 534 is provided which upon depression will initiate totaling operations which will clear the machine of any amounts stored in the accumulators. Under control of a bell crank stop 517 the depression of the key 534 through a flanged collar 535 thereon will rock a spring pressed bell crank member 536 pivoted on rod 526. Member 536 carries a contact closing latch 537 to close a pair of contacts 538, 539. A spring pressed holding latch 540 pivoted on pin 532 is also provided to hold the contacts closed after they have been so positioned by the latch 537. The arm 533 extends beneath the horizontal extensions of these two latches and causes their release in a manner similar to that explained in connection with the latches 528 and 531 of Fig. 3a. The bell crank 536 carries also a spring pressed latch 541 (see also Fig. 3) which is engaged with an arm 542 secured upon a shaft 543. Also secured upon the shaft is a second arm 544 lying in the plane of the holding latch 540 which is provided with a second notch adapted to cooperate with the arm 544 after the shaft 543 has been rocked in a counterclockwise direction to hold the shaft in such position until the latch 540 is released by the arm 533. In Fig. 3 the shaft 543 carries an arm 545 connected by a link 546 to an arm 547 secured to a shaft 548. In Fig. 12 the shaft 548 carries the arms 496 which in their normal position cooperate with the hooks 495 to maintain the contacts F6 and F7 open (see also Fig. 16). Clockwise rocking of the shaft 548 under control of the key 534 will permit the contacts F6 and F7 to operate under control of the bail 494, during the subsequent operation of the bail.

Card lever contacts

Card lever contacts CL1, CL2 and CL3 are provided which are adapted to close and remain so during the continuous feeding of cards. A special card sensing pin 550 is provided (Figs. 32 and 54) which is adapted to advance with the pins 100.

This special pin 550 is located so as to cooperate with a portion of the card in which no code perforations are to appear. It is supported at one end by the restoring bar 104 and at its other by plate 102. A block 551 attached at an intermediate point on the pin has pin and slot connection with an arm 552 secured to a rod 553 which extends to the outer side of the frame where it carries a spring pressed arm 554 which in turn through a link 555 is adapted to rock an interposer 556. If, upon advance of the bar 104 the pin 550 is stopped by the presence of a card 50, the slight movement of the pin 550 through the linkage described will permit the interposer 556 to move to the position of Fig. 54 where its free end lies under a projection 557 of a pivoted member 558.

In Fig. 8 the shaft 107 which as has heretofore been pointed out rocks in a clockwise direction upon advance of the sensing pins, carries arm 113 which has pin and slot connection to a link 559. The other end of the link is pivoted to an arm of a bell crank 560 upon whose other arm is pivoted the interposer 556. The pin and slot connection between the link 559 and arm 113 is such that during the beginning of the clockwise movement of arm 113 the pins 100 and pin 550 are permitted to advance to sense the card. If during this time the pin 550 is blocked by a card, interposer 556 is positioned beneath the projection 557. Toward the end of the clockwise movement of arm 113, it will cause movement of link 559 and therethrough rock the bell crank 560 in a counterclockwise direction to the position of Fig. 54 wherein the interposer 556 has been moved upwardly to close the contacts CL1, CL2 and CL3.

Had there been no card in sensing position between the plates 71 and 72, the further advance of pin 550 through plate 71 would have located the interposer in its dotted line position of Fig. 54 and the subsequent rocking of bell crank 560 would not have affected the contacts. The bell crank 560 cooperates with a pin 561 on a spring pressed latch 562 in such manner that as the bell crank returns to its normal position by moving in a clockwise direction the latch 562 will move beneath a projection 563 of the arm 558 to latch the contacts in a closed position. With the above construction the successive presentation of cards to the sensing pins will permit the continued closure of the contacts. Upon failure of a card to register with the pin 550, the latch 562 will be tripped by bell crank 560 and the contacts will open before the commutator reading devices have operated and no circuits will be established to the type bar magnets.

Card feed contacts

Included in the electric circuit of the machine are several contacts bearing the designating prefix CF, the operating cams of which are under the control of a clutch magnet 565 (see Fig. 50) wherein the magnet is shown as being wired in parallel with the card feed clutch magnet 93 so that whenever a circuit is completed through magnet 93 it will also energize the magnet 565. Referring now to Figs. 2, 4, 39 and 40, the continually running shaft 21 has secured thereto a gear 566 meshing with an idler 567 which in turn drives a gear 568 loosely mounted upon the shaft 569 and having integral therewith a notched clutch element 570. An arm 571 secured to the shaft 569 carries a spring pressed dog 572 which is normally held in the position of Fig. 40 by the armature latch 573 which latch also engages the arm 571. Energization of the magnet 565 will move the latch 573 to the right as viewed in this figure releasing the arm 571 and dog 572 so that the shaft 569 may rotate with the gear 568. Upon the shaft 569 are located a plurality of contact cams which cooperate with contacts CF1—CF7 open and close these contacts at predetermined points in the cycle of the machine.

The functions of these various contacts will be explained in connection with the electric circuit of the machine. Shifting of the armature latch 573 under the influence of magnet 563 will through a plunger 574 cause closure of pairs of contacts 575 and 576 whose function will be explained later.

Plug board circuit breaking contacts

Figure 43:
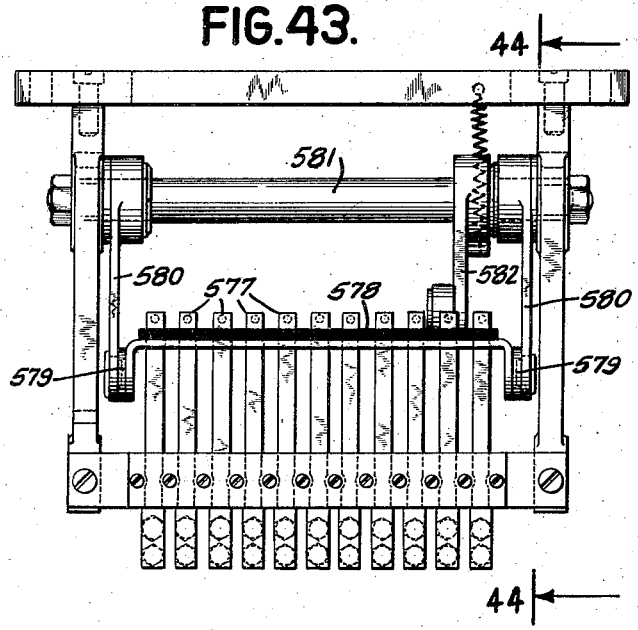
Fig. 43 is a detail of further circuit switching mechanism.
Figure 44:
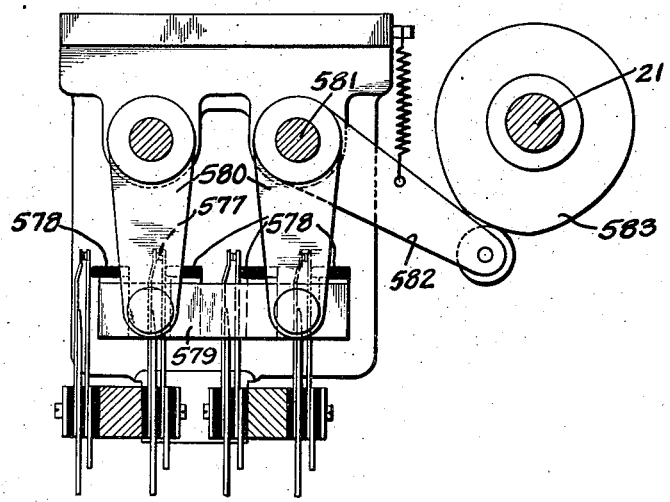
Fig. 44 is a section taken on line 44—44 of Fig. 43.

In Fig. 50a a plurality of contacts 577 are shown which are normally closed and adapted to be opened during transferring portions of the adding cycle of the machine to prevent back circuits. These contacts are shown in Figs. 43 and 44 as being arranged in four columns for compactness, there being one contact for each column of adding devices. Insulating bails 578 extend across each column of contacts to hold them in their normally closed position as shown. The bails are secured at their extremities to cross bars 579 which are suspended from arms 580. The rod 581 upon which a pair of said arms is secured carries also a cam follower arm 582 having a follower roller in cooperation with a cam 583 mounted upon the continually running shaft 21. The contour of the cam is such that it holds the contacts 577 closed during adding portions of the cycle of the machine and permits them to open when transferring operations are taking place.

Class selecting contact device

In the diagram of Fig. 50a a plurality of contact devices are shown which comprise contacts 584 and 585 and have a common blade connected to a plug socket 586 and which have individual connections to sockets 587 and 588. The sockets 586 may be connected to the card reading devices through connections 615a and the sockets 587 may be connected to a group of type bars or a group of accumulators and the sockets 588 may be connected to other groups of type bars or accumulators through connections 615.

A special perforation in the card is adapted to control the mechanism about to be described, to shift the contacts 584, 585 to direct the circuits entering plug 586 to either the sockets 587 or 588 so that the information contained on the card in which this special designating perforation appears will be directed to one or the other of the groups of recording devices to which the plugs are connected.

A special comb 430a is provided (see Fig. 55) which cooperates with an arm 120a controlled by a pin 100a (see also Fig. 32). The arm 120a is similar to the arms 120 except that it has no brush mounted thereon and is adapted to cooperate with the latch 131 to be held in shifted position when moved by the pin 100a. The pin 100a is located to cooperate with a special class designating column of the card set aside to receive a single perforation in the index point position corresponding to the pin 100a so that occurrence of a perforation in such position will permit the pin 100a to advance thus shifting the arm 120a which will be latched by the latch 130 while the pin 100a is restored. At its upper end the arm 120a cooperates with the slider 430a to shift it so that a projection 433a moves to its dotted line position, as shown, beneath the angular plate on the lower blade of contact 435a. When the contact 435a is tilted together with the contacts 435 it will close thereby setting up a circuit which will cause the shifting of the contacts 584, 585 of Fig. 50a. In Fig. 50 the contact 435a is connected to a plug 468a which by means of a plug wire 468b may be connected to a plug 468c so that if the special designation appears in a card, a circuit will be made through the contact 435a to either of the magnets 589, 589a, and thence through contacts CR1 to the line 349. One of the magnets 589 controls the shifting of certain of the contacts 584, 585 while the other magnet controls the shifting of the rest of such contacts. In Fig. 14 the contacts 584, 585 are shown as having their center blades mounted upon cross bars carried by side plates 590 which in turn are carried by arms 591 of which the upper arm is secured to a shaft 592 while the lower arm is free upon a shaft 592.

Figure 35:
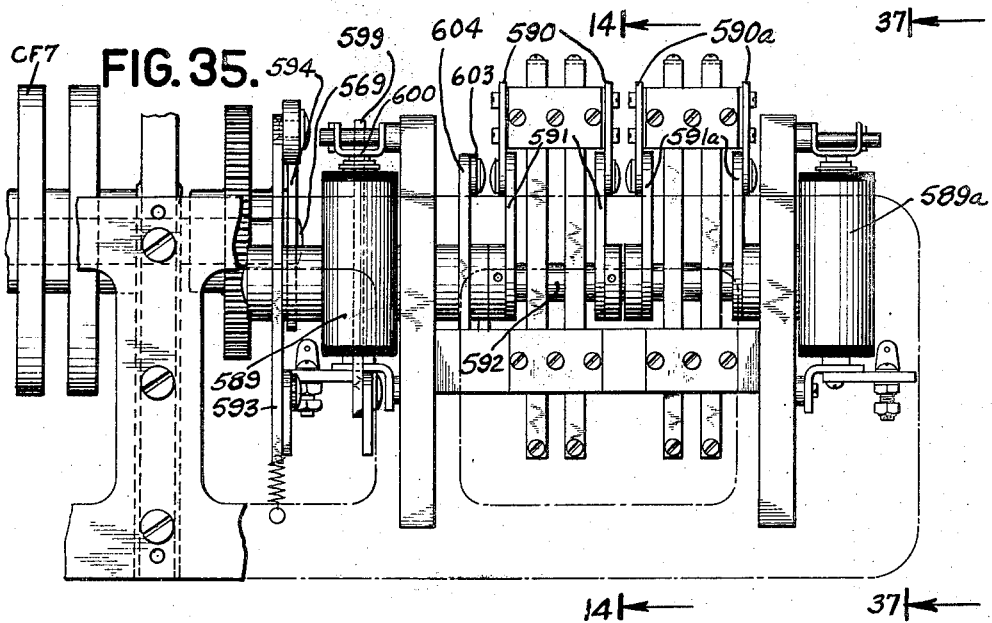
Fig. 35 is a detail of certain class selection contacts taken on the line 35—35 of Fig. 3.
Figure 36:
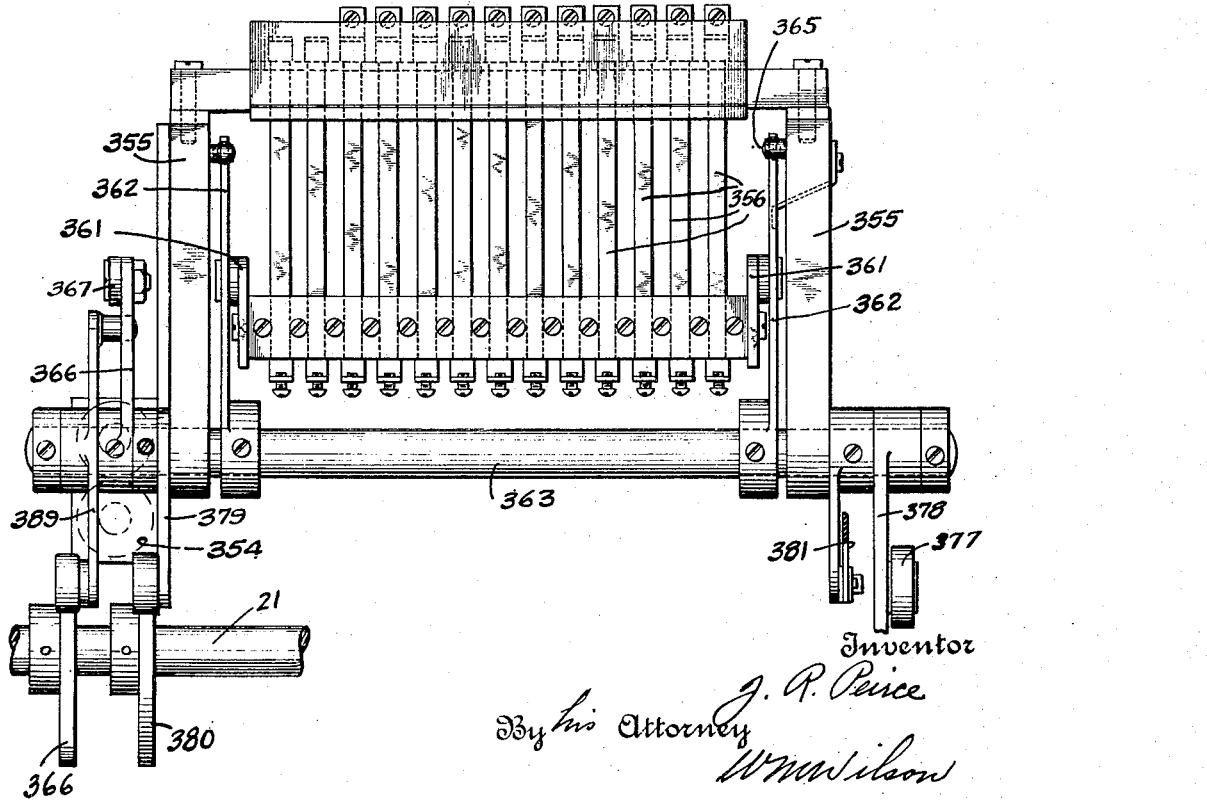
Fig. 36 is a detail of total circuit controlling contacts.
Figure 39:
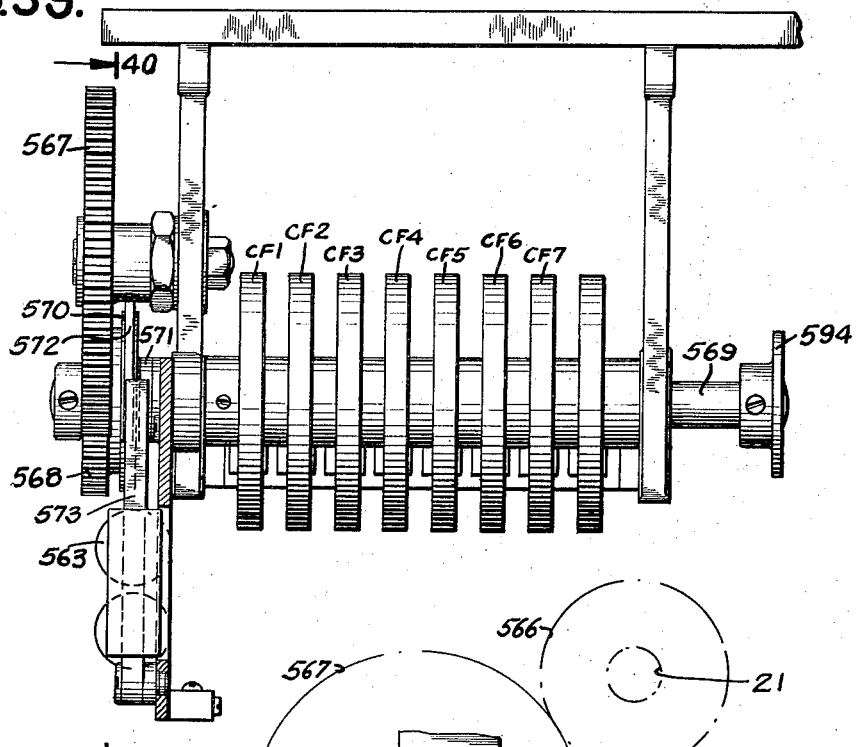
Fig. 39 is a detail of certain card feed circuit controlling contacts.
Figure 40:
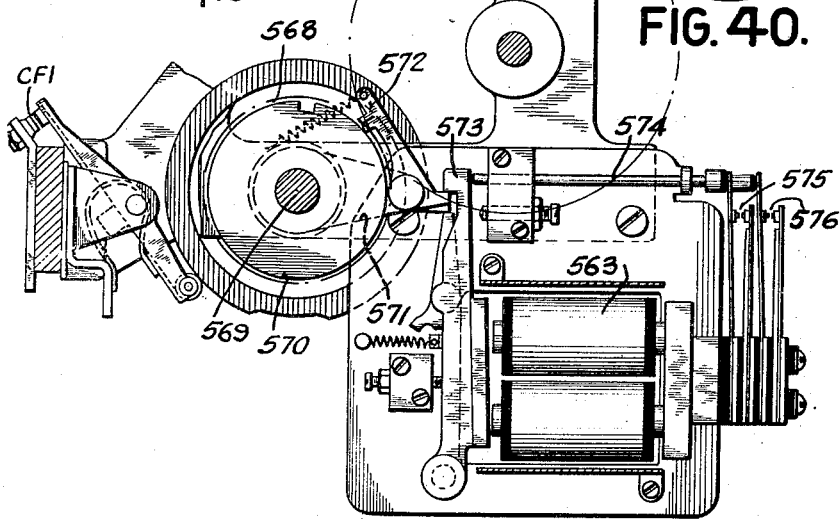
Fig. 40 is a section on the line 40—40 of Fig. 39.

In Fig. 38 which is a view looking in the opposite direction of Fig. 14, the shaft 592 carries a cam follower arm 593 having a roller cooperating with a cam 594 mounted upon the shaft 569 (see also Fig. 35). A spring pressed arm 595 secured to the shaft 592 tends to keep the follower roller in cooperation with the cam 594. The arm 595 is connected by a link 596 to an arm 597 secured upon a shaft 598 which shaft also carries an arm 599 normally held in the position of Fig. 38 by the cooperation of its hooked end with a notch in the spring pressed pivoted armature 600 of the magnet 589. At the time when magnet 589 is energized the follower arm 593 is being held in its clockwise position as viewed in Fig. 38 by the rise on cam 594 which through the linkage to shaft 598 will rock the arm 599 slightly clockwise to remove the frictional strain of its hooked end from the armature 600. At this time a spring pressed pivoted latch 601 pivoted upon the arm 599 will bear against the free end of the armature so that when the magnet is energized and the armature drawn to the right, the latch 601 will snap over its left side to prevent its accidental return to locking engagement with the hooked end of arm 599. Thereafter the continued rotation of cam 594 will permit the shaft 598 to turn in a counterclockwise direction through the connecting linkage. In Fig. 14 the resultant clockwise turning of the shaft 592 permits the contacts 584, 585 to shift to their alternate positions wherein contacts 584 are closed and 585 are open.

In Fig. 37 is shown the magnet 589a which when energized attracts its armature and permits the rocking of its arm 599a which is secured to the shaft 592a. Controlled from the shaft 592a are plates 590a (see also Fig. 35) carried by a pair of arms 591a which are loose on the shaft 592 and by arms 591b fixed to the shaft 592a. With this construction the energization of magnet 589a will cause rocking of the shaft 592a and shifting of the plates 590a controlled thereby.

Energization of the magnet 589a will cause rocking of the shaft 592a and the shifting of the plates 590a controlled by this shaft. Both shafts 592 and 592a have an arm 602 secured thereto which have pin and slot connection at their free ends with a link 603 which at its lower end is connected to an arm 604 secured upon the shaft 598 so that when the shaft is rocked under control of the cam 594 both shaft 592 and shaft 592a will be rocked to relieve the pressure on their respective armatures. Both of the armature latch arms 599 and 599a are provided with extensions 605 which engage their respective armatures when the arms rock to positively move the armatures away from their magnets.

Manual switches

In the circuit diagram of Figs. 50 and 50a there are shown a number of switches prefixed S. A brief description will now be given of the purpose of each of these several switches. The switches S1, S2 and S9 are connected together as shown diagrammatically in Fig. 50, so that operation of one will affect the position of the other two. When listing, these switches are set in the position as shown, wherein the switch S1 short circuits a pair of contacts P2 and the switch S9 completes a circuit from the contact 271 to the magnet 260 and the switch S2 short circuits the contact MI3.

Switch S3 when in the position shown, permits the machine to automatically perform total taking operations to print minor totals. When set in its other position it permits the hand or key initiation of such totals.

The switch S4 when set as shown, permits the automatic taking of major totals and in its alternate position brings the operation under key control. The switch S5 when opened cuts out the automatic control contacts 435 on the machine and thereby prevents the automatic initiation of total taking operations when a group number changes.

Switch S6 is in series with the major total control magnet 475 and when thrown to its open position renders this magnet inoperative and will prevent the machine from being controlled by major group designations. The switch S7 prevents the clearing of the accumulators containing the final totals when this switch is in open position. With the switch closed the depression of the final total key will clear the machine of all entries.

The switch S8 when closed, as shown, permits the automatic restarting of the card feeding devices of the machine after a total has been taken.

Wiring diagram

To facilitate the description and explanation of the various circuits, related contacts have been given identifying prefixes, as for instance, those contacts bearing the prefix CR in Figs. 50 and 50a are under control of contact cams mounted upon the continually running shafts 417 and 487 of Fig. 3. Contacts prefixed CF are mounted upon the shaft 569 of Figs. 39 and 40 which operate only while cards are being fed through the machine. Contacts prefixed P are mounted upon the shafts 507, 507a of Figs. 1 and 3 and function only when the printing mechanism is being operated. Contacts prefixed MI are shifted and positioned when the machine is taking a minor total and contacts labelled MA shift when a major total is being taken; and card lever contacts prefixed CL are closed as long as the cards feed through in succession.

To start the machine the main line switch to the motor 11 of Fig. 1 is closed and the continually running shafts of the machine commence turning.

Key starting circuit

Presuming several groups of cards to be in the machine, the feeding of the cards and the sensing of the data contained thereon may be started in the following manner. The operator depresses the start key 509 closing contacts 512. This sets up a circuit from line 341 (Fig. 50) to the closed stop key contacts 513, thence through wire 606 to the closed contacts MA1, MI1, to magnets 93 and 565 which are in parallel, thence to wire 607, start key contacts 512, back to line 349. The energization of the card feed clutch magnet 93 releases the card feed clutch for operation and the feeding of the cards commences immediately. Likewise, energization of the magnet 565 permits the CF contacts to function under control of their cams. The contacts 575 are closed by the action of magnet 565. A holding circuit is established through magnets 93 and 565 through the contact 575, wire 608 to the contact CL1 which closes after the first card has been presented to the sensing pins.

Should the cards fail to feed through the machine at any time subsequent, the card lever contacts CL1 will open and the magnets 93 and 565 will be deenergized. A similar result will be obtained by depression of stop key 510 which by opening the contact 513 breaks the circuit to the line 341.

Alphabetical listing circuit

Following the closure of card lever contact CL3 a circuit will be established through the print magnet 39 from the line 341 through stop key contact 513, wire 609, magnet 39, contact 43, closed by the action of magnet 39 during a previous total cycle, contacts 576 closed by the action of magnet 565, switch S1, wire 610, contact CL3, back to line 349. This permits the printing mechanism to function thus raising the various type bars into cooperation with the printing platen in synchronism with the rotation of the constantly turning translating commutators as set out hereinbefore.

In Fig. 50a a commutator 611 which is mounted upon the continually running shaft 124 (see also Fig. 8) has a conducting segment 612 adapted during the rotation of the commutator to successively connect the brushes 157a, 158a, 159a and 160a with a common brush 613. The time relationship between the commutator segments 612 and the brushes is such that during the passage of the type elements included in the first zone of the type bar past the printing position of the platen, the brush 157a is in electrical connection with the brush 613. During the passage of the second zone of type elements past the printing line, the brush 158a is in electrical connection with the brush 613, and during the passage of the next two zones the brushes 159a and 160 will successively be in electrical connection with the brush 613.

Assuming a particular card column which has been sensed by the analyzing pins and which has controlled the setting of the various translating brushes to represent a character contained in the first zone of the alphabetical type bar. In such position the slider in that particular column will be in a position as shown diagrammatically in Fig. 50a, where the slider 156 is in contact with the strip 161 and the first zone bar 157. A circuit will therefore follow for a particular brush set up from line 341, contact CL2, contact CF2, brush 613, segment 612, brush 157a, zone selecting bar 157, slider 156, strip 161 to the brush 121d. Thence through the commutators 124, 123, in a familiar manner, to a plug connection 614. The circuit then continues through a plug wire 615a to and through contacts 584 or 585 and thence through plug wire 615 to a connection 616 and thence through magnet 192a to the contact 44 and back to line 349. The circuit just traced will, of course, take place during the first half revolution of the commutators 123, 124 as has been previously explained. If the slider 156 were positioned on bar 158, the same circuit would be completed during the second half revolution of the commutators and a printing element would be selected for actuation from the group of type included in the second zone of the type bar.

The function of the contact CF2 is to supply current to control the circuits so they will be effective only while the type bars are rising to printing position. The plug sockets 616 are connected through spring blades to a common bar 617 which through a wire 618 connects to a contact P4, thence to the contact CF6 and through wire 471, contact CL2, to line 341. The insertion of a plug in any socket 616 disconnects that socket electrically from the bar 617. Those sockets which are not plugged for selecting type bar positions under control of the translating commutators remain in electrical connection with said bar so that during the operation of the printing mechanism the closure of contact P4 at a time when contacts 471 and CL2 are also closed will send an impulse to the bar 617 which is transmitted through all such magnets 192a as are not in active use. This circuit is timed to intercept the type bars in a non-printing position.

*Number listing and adding circuits*

As we have heretofore seen, the translating brushes cooperating with the commutators 122, 123 are shifted under control of the pins which read the lower field of the card. These circuits may be arranged to either select type bars for printing or accumulators for adding or both. In Fig. 50a a plug wire 619 inserted between plug socket 620 and a socket 621 will permit a circuit to be completed to a numerical type bar for printing the digit corresponding to the perforation in a column of the lower field of the card. This circuit follows from line 341 to contact CL2, wire 622, contact CF3, to a common connector 623, thence through the commutators 122, 123, in a familiar manner, to the plug socket 620, thence through wire 619, to socket 621, from which the circuit continues through cable 624 to the corresponding contact blades 357, 359 which are closed at this time, and from there to the corresponding type bar magnet 192, thence to common connector 426, wire 427 to the other side of line 349.

If it is desired to accumulate in any column, a plug wire 625 is inserted between the plug 620 and a plug 626 so that the foregoing circuit would proceed from socket 620 to the socket 626 and thence through normally closed contact 577 to cable 627 which directs the circuit to the corresponding adding magnet 300 from which it proceeds to the other side of line 349, through the common connector 343 and wire 348. If it is desired to both list and add from the same column, a plug wire connection is made between the socket 620 and a split plug connection 628 which as will be observed, branches into both the printing circuit and the adding circuit above traced.

It may here be recalled that for each cycle of operations the electric transfer devices are operative to transfer from a lower order to a higher order through circuits already explained in detail.

*Class selection circuits*

Where it is desired to either print or accumulate the information contained in a particular field of the card in either of two groups of type or adding units, the plug connections heretofore mentioned may, instead of being connected directly, be connected to the plugs 586 of the class selection contacts and other plug connections made to the elements to be controlled from either of the plugs 587 or 588. In this wise, the circuits set up under control of the card not having a special class designating hole will be completed through the contact 585 to the plugs 588 to control the banks or groups of recording devices connected to these plugs. Where the class designating hole appears in the card it causes the closure of contact 435a of Fig. 50, through the following circuit from line 341, contact CL2, wires 471, 472, 473, switch S5, contacts C7F, bar 467, contact 435a, to plug connection 468a, thence through the plug wire 468b to the plug socket 468c of one of the magnets 589 or 589a and thence through contact CR1, back to line 349. Upon energization of one of these magnets its related group of contacts is shifted to close contacts 484, and open contacts 485 so that the ensuing circuits through the various translating commutators will be directed from the sockets 587 to the groups or banks of recording devices to which they are connected.

*Card counting circuit*

A plug connection 628 is provided which is connected to a contact CF4. This plug socket 628 may be connected to an adding unit set aside to accumulate the number of cards passing through the machine. The contact CF4 is timed to close at such time so that a circuit completed through the adding unit to which the socket 628 may be connected will add one for each revolution of the card feeding devices. This circuit will be from line 341, through contact CL2, wire 622, contact CF4, plug socket 628 and from thence through a plug wire to one of the adding magnets 300 in an already familiar manner.

Automatic minor total

There has thus far been shown the operation and function of the various circuits to cause cards to be fed successively to sensing position where they are analyzed and caused to control the setting of circuits which, upon subsequent completion, position the printing devices and actuate accumulating mechanism. These operations will continue indefinitely as long as cards are being introduced. If the machine is not set for automatic control, its operation will cease either upon failure of cards to feed or upon depression of the stop key. If the machine is wired as previously explained, to take a total under control of a sub or minor group, the columns of the card positions included in such group number have their related contacts 435 connected by plug wires to the common plug socket 469 so that upon change in group number the circuit which has already been traced will be completed through magnet 474 upon closure of contact CR1. The energization of the magnet 474 will cause the shifting of all contacts which in the circuit diagram are prefixed MI.

In Fig. 50 the opening of contact MI1 will break the circuit to the card feed clutch magnet 93 and the CF contact-controlling magnet 565. The first card of the new group will not be held at the sensing position but through the mechanism already described, the information sensed therefrom will remain locked in the card sensing and translating devices so that during the totaling operations, about to be described, the control combs 430 will be set in accordance with the new group number which will be compared with the succeeding cards. The contact MI5 completes the circuit to the magnet 354 to shift the contact blades 356—360 and also close the contacts T1, T2 and this circuit may be traced as follows: from line 341, contact 513, magnet 354, contact CR2, wire 629 to the upper blade of contact MI5, thence to the lower blade of the contact to switch S3, contact CR3, back to line 349. The magnet 444 in parallel with the magnet 354 is energized simultaneously to cause the resetting of the control combs 430 and their positioning in accordance with the new group number. Closure of contacts MI2 will complete the circuit through the printing magnet 39 to permit the printing mechanism to function in synchronism with the adding mechanism. This circuit follows from line 341, contact 513, wire 609, magnet 39, contact P5, contact MI2, contact MI5, switch S3, contact CR3, back to line 349. Contact MI3 opens and contact 271 is closed under control of the magnet 354. This completes a circuit through the paper spacing magnet 260 to provide additional paper spacing. During the total cycle which has been initiated, the closure of contact MI4, as we have already seen, permits the energization of the magnets 300 of counters which have been selected to accumulate the minor total so that during their revolution the amounts contained therein will be read therefrom and printed upon the record sheet and the accumulators cleared, that is, restored to zero position. At the same time a special designating impression is made on the record sheet to indicate that a minor total has been printed. This circuit follows from line 341 (Fig. 50a) through contacts T2, CR7, CR9, MI4, wire 630, to a printing magnet 192c and wire 427 to line 349.

Energization of magnet 192c will stop its associated type bar in a position to print an asterisk in a particular column of the record sheet. Also during the total cycle the operation of the printing mechanism will through the devices explained in connection with the shifting of the MI contacts, restore these various contacts to their normal positions, and unless the machine is set for automatic resumption of card feeding operations, it will come to a stop at this point.

Automatic starting circuit

With the automatic start switch S8 as shown in the position of Fig. 50, the operation of the printing mechanism for the total cycle just described will cause closure of the contact P1 and a circuit will be established from line 341, through contacts MA1, MI1, which are now closed, magnets 93 and 565, contact P1, switch S8, wire 608 to card lever contact CL1, which is still latched in closed position, back to line 349. This permits the machine to resume feeding and sensing cards until another change occurs in the minor group classification number or if the machine is so plugged, until a change in cards in a major group classification.

Automatic major total

In a manner similar to that traced in connection with the energization of magnet 474; upon change in a major group number the magnet 475 will become energized provided the switch S6 is in its closed position. This, as we have seen, causes the shifting of all contacts prefixed MA. Contacts MA1, in a manner identical with the function of contact MI1, interrupts the circuit to the card feeding devices. The energization of magnet 475 due to the mechanical connection between its armature and the armature of magnet 474, will trip the latter so that the MI contacts will all shift as though a change had taken place in a minor group classification, and the machine will enter upon a totaling cycle to print a total of the minor group, as above described.

During this cycle the contact MA4 is closed but the contact MA5 is open so that there will be no circuit through these contacts, and since contact MA2 is closed but MA3 is open, there is also no circuit through these two contacts. However, upon the restoration of MI contacts under control of the printing mechanism, as before described, the restoring bail 494 of the MA contacts is shifted to its intermediate position in which contacts MA2 and MA3 are both closed, as are also contacts MA4 and MA5, contact MA1 remaining open at this time. The effect of this is to reenergize the magnets 354 and 444 from line 341, contact 513, magnets 354, 444, contact CR2, contacts MA2, MA3, switch S4, contact CR3, back to line 349, and the print magnet 39 is also reenergized to cause a second cycle of the printing mechanism. This circuit follows from the line 341, contact 513, wire 609, magnet 39, contact P5, lower blade of contact MA2, contact MA3, back to line 349, as before. The closure of both contacts MA4 and MA5 will permit the transmission of an impulse to all such columns of adding mechanisms as are included in the major group. During the second totaling revolution of the machine the amounts contained in the major group accumulators are printed upon the record sheet and a group designating circuit continuing from contact MA5, through wire 631, to magnet 192b, common connector 426, wire 427, to line 349, will position the type bar associated with the magnet 192b to print therefrom an asterisk in a particular column on the record sheet. The location of this asterisk upon the sheet in line with the total printed from the accumulators will indicate that this number is a major total. During this second totaling cycle the printing mechanism will shift the bail 494 to its initial position, restoring the related MA contacts to their original relationship. If the switch S8 is closed, the machine will resume feeding of cards automatically, as explained in connection with the taking of a minor total.

*Operation of the final total*

The depression of the final total key 534 of Fig. 50, is adapted to clear the machine of all amounts contained in all active accumulators. This key is usually operated at the end of a run of cards, causing the printing thereupon of the totals of the last minor and major groups and also the total of items which have been entered into another bank of accumulators not under control of the automatic totaling devices. With the machine at a stand-still, depression of key 534 will close the contacts 538 and 539 and the circuit will be completed from the line 341 to wire 640, contacts 538 and 539, to magnets 574 and 575, back to line 349, through the contact CR1.

Energization of both these magnets, as we have already seen, causes the machine to print a minor total after which the record sheet is spaced and the machine performs a second totaling operation during which major totals are printed under control of the accumulators.

It has been pointed out that with the depression of key 534, the contacts F6 and F7 are released so they may close under control of the bail 494. The closure of contact F6 will permit the total initiation impulse which is sent through the contacts MA4, MA5, to branch through the switch S7 to the plug connection 421b and from thence to the group of accumulator elements which are adding items therein, so that simultaneously with the reading of totals from the major total group, an item will also be printed from the final group on the same line of the record sheet.

*Paper spacing circuits*

When the machine is listing, that is printing a column of information or a line of information on the record sheet for each card, paper spacing is effected before each impression by energization of the magnet 260, through the following circuit: from line 341 (Fig. 50a), card lever contact CL2, wires 471, 472, 473, switch S2, contact P6, magnet 260, back to line 349.

Contact P6 is adapted to close to complete the circuit while the type bars are rising to printing position. When the machine is set for nonlisting, the switch S2 is open and since the printing devices are not in operation, P6 does not energize magnet 260, except during the totaling operation when printing elements are functioning.

When a minor total is being taken the consequent opening of contact MI3 when the machine is set for tabulating (i. e. switch S2 is open), will prevent the contact P6 from causing spacing of the paper before printing the minor total. However, closure of contacts 271 during totaling will energize magnet 260 from line 341, wire 641, contact 271, switch S9, magnet 260 to line 349. This will cause paper spacing after the total is printed. When a major total is taken, the opening of contact MI3 will again prevent spacing before printing during the first total cycle. During the second total cycle contact MI3 is closed and if contact CL2 is closed, contact P6 will close the circuit through magnet 260. In the case of a final total, the contact F7 is permitted to close and the circuit follows from line 341, through wire 641, contact F7, contact P6, to the magnet 260. When the machine is listing, the switches S2 and S9 are closed so that when a total is printed at the end of a group, the closure of contact P6 effects paper spacing as when listing. Closure of contact 271 during the totaling operations causes a circuit from line 341, wire 641, contact 271, switch S9, magnet 260, back to line 349 to effect a second paper spacing operation, thus giving a double spacing after the printing of the total.

If it is not desired to have the machine automatically enter totaling operations upon a group change or upon exhaustion of the cards from the magazine, the switches S3 and S4 are moved to their alternate positions. Where a change has occurred in a minor group, the energization of magnet 474 will cause the machine to stop, in a manner already described, and when the switch S3 is in its shifted position, the circuit will not be completed through magnets 39, 444 and 354.

Depression of the hand total key 523 by closing the contacts 530 will shunt the switch S3 so these magnets may become energized and totaling operations continue as heretofore. Similarly, if the group change has energized magnet 475, depression of the key 523 will cause the contact 529 to short circuit the switch S4 for the same purpose. Where the machine has been stopped under other conditions, for instance, as by depression of the stop key, if the switch S6 is opened, the minor total may be taken by depression of the key 534 which by energizing magnet 474 will cause the printing of a minor total if the switch S3 is in the position of Fig. 50. The circuits involved will be readily traced.

*Group indicating*

When listing only or listing and accumulating together, the group number or name may be printed beside the variable items in such group. This is accomplished by simply plugging from the columns on the card corresponding to this information. The group number is plugged to the list-only plugs 621 from either plugs 620 or by plugging from sockets 614 to plug sockets 616 of the column on the record sheet in which it is desired to have the number or name appear. When accumulating only, this group designation is similarly plugged to the desired position and the machine is caused to take a listing cycle wherein this group number is printed on the record sheet. Accumulating proceeds in the usual manner and when a total is subsequently taken, it will be printed adjacent to the previously printed group designation.

We have already seen that energization of print magnet 39 causes closure of contacts 43 and 44 which are latched in their closed position. Also, when accumulating only, the switch S1 is rocked clockwise from the position of Fig. 50 and during totaling operations, the contact CF1 is in its open position, as shown.

After a total has been printed and the record sheet spaced to the next line, magnets 93 and 565 are energized to resume the feeding of cards and the contact 576 is consequently closed. This will complete the circuit through magnet 39, from line 341, contact 513, wire 609, contacts 43, 576, P2, wire 610, contact CL3, back to line 349. This will cause the printing mechanism to operate during which the type bars will be positioned under control of the translating commutators. During this cycle of operations contact P2 will open to break the circuit to the magnet 39 and the contact P3 will be closed to complete a circuit at a time when contact CF1 is also closed from line 341, (Fig. 50a) contacts CL2, wire 471, contact CF1, magnet 41a, contact P3, switch S1, wire 610, contact CL3, back to line 349. This causes the contacts 43, 44 to be unlatched so they may open and the subsequent closure of contact P2 will not reenergize the magnet 39. Thus the printing elements operate during the first cycle of a new card group and the group designating number or name is transmitted from the translating commutators to the type bars for printing.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims:

I claim:—

1. In a machine of the class described, recording mechanism, a group number change finder comprising a settable comb, and a cooperating contact; card analyzing mechanism, means controlled thereby for causing relative movement between said comb and said contact for each card and means controlled by said contact, operative upon a change in group number for controlling the operation of said recording mechanism.

2. In a machine of the class described, card analyzing mechanism adapted to read combinational hole perforations, electrical translating mechanism including a member positionable under control of said analyzing mechanism, recording mechanism controlled by said translating mechanism and means controlled by said translating mechanism concurrently with said recording mechanism for positioning a group number change finder.

3. In a machine of the class described, card analyzing mechanism, translating mechanism and group number finder mechanism, a single means controlled by said analyzing mechanism for simultaneously positioning said translating mechanism and said group number finder.

4. In a machine of the class described, in combination a group number change finder, printing mechanism, and card analyzing devices; a single means controlled by said analyzing devices for simultaneously controlling said finder to enter a group number index and said printing mechanism to print said group number.

5. In a machine of the class described, card analyzing mechanism, translating mechanism and group number finder mechanism, means for setting said translating mechanism in accordance with group number perforations under control of said analyzing mechanism, means for simultaneously setting said finder mechanism under control of said translating mechanism, and means controlled by said finder mechanism for suppressing the operation of said translating mechanism upon change in a group number.

6. In a machine of the class described, a group number change finder, translating mechanism, means for moving said finder into cooperation with said translator, means for simultaneously setting both finder and translator in accordance with group number perforations in successive record cards and means controlled by said finder for locking said translator in set position upon a change in group number.

7. In a machine of the class described, a group number change finder, translating mechanism, means for moving said finder into cooperation with said translator, means for simultaneously setting both finder and translator in accordance with group number perforations in successively arranged record cards, means for moving said finder out of cooperation with said translating mechanism and means for restoring said finder when it is out of cooperation with said translator.

8. In a record controlled tabulator, a group number change finder, means for setting said finder in accordance with the group number of successive cards, translating mechanism adapted to receive said successive group numbers simultaneously with said finder, printing mechanism controlled by said translating mechanism, and means controlled by said finder, operative upon a change in group number for suppressing the operation of said printing mechanism.

9. In a record controlled tabulating machine, card analyzing mechanism; translating mechanism and group number change finding mechanism simultaneously settable under control of said analyzing mechanism, means for restoring said translating mechanism each operation of the machine and means for suppressing the operation of said restoring means upon change in the group number.

10. In a record controlled tabulating machine in combination, sensing pins and related contact devices, a plurality of electrically controlled entry receiving devices adapted to be controlled by said pins and contact devices to receive items from the record columns of a perforated card and electromagnetic switching mechanism controlled by a sensing pin for connecting one of said entry receiving devices with the sensing pins and contact devices for receiving items from certain records and for connecting another of said entry receiving devices with said sensing pins and contact devices to receive items from other records.

11. A group indicating system for a tabulating machine which is provided with tabulating mechanism, printing mechanism and total taking mechanism, a magnet for operating said printing mechanism when energized, a circuit for said magnet closed by said total taking mechanism, a second circuit for said magnet and means controlled by said tabulating mechanism for closing said second circuit.

12. A machine of the class described provided with card feeding mechanism, printing mechanism and total taking mechanism, a magnet for operating said printing mechanism, a circuit for said magnet closed by said total taking mechanism; a magnet for operating said card feeding mechanism, a circuit for said magnet opened by said total taking mechanism; and a second circuit to said first named magnet, means controlled by said card feeding mechanism for completing said second circuit.

13. In a group indicating system for a tabulating machine, printing mechanism, card feeding mechanism and total taking mechanism, means for suppressing the operation of said card feeding mechanism during the operation of said total taking mechanism, means for causing resumption of operation of said card feeding mechanism after the operation of said total taking mechanism, means controlled by the card feeding mechanism for causing operation of said printing mechanism and means controlled by said printing mechanism for suppressing its own further operation after one cycle of operations thereof.

14. In a record controlled tabulating machine having automatic group control mechanism and minor and major total taking mechanism operative upon a change in group number; a magnet for initiating minor total taking operations when energized and a circuit for said magnet closed by said automatic control mechanism, a magnet for initiating major total taking operations and a circuit therefor closed by said automatic control mechanism, and means effective upon operation of said second named magnet for initiating minor total taking operations simultaneously with said major total taking operations.

15. In a record controlled tabulating machine having total taking mechanism, a magnet for initiating minor total taking operations when energized, a second magnet for initiating major total taking operations when energized, a circuit connecting both magnets in parallel, a key adapted upon depression to close the circuit to said first named magnet and means for rendering said key depression effective to close the circuit to said second named magnet.

JOHN ROYDEN PEIRCE.